US012574622B2

(12) United States Patent
Vitale

(10) Patent No.: US 12,574,622 B2
(45) Date of Patent: Mar. 10, 2026

(54) IMAGE CAPTURE APPARATUS INCLUDING A MULTI-FUNCTION INTERCONNECT MECHANISM

(71) Applicant: GoPro, Inc., San Mateo, CA (US)

(72) Inventor: Nicholas Vitale, Foster City, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/606,560

(22) Filed: Mar. 15, 2024

(65) Prior Publication Data

US 2025/0294230 A1     Sep. 18, 2025

(51) Int. Cl.
H04N 23/54        (2023.01)
H04N 23/57        (2023.01)

(52) U.S. Cl.
CPC ............. H04N 23/54 (2023.01); H04N 23/57 (2023.01)

(58) Field of Classification Search
CPC .... G03B 17/561; G03B 17/00; G03B 17/566; G03B 17/04; G03B 17/563; H04N 23/54; H04N 23/50; H04N 23/51
See application file for complete search history.

(56) References Cited

U.S. PATENT DOCUMENTS 1,467,556 A      9/1923  Nagel
1,612,277 A    12/1926  Leo
(Continued)

FOREIGN PATENT DOCUMENTS

CN        3468747        8/2005
CN        1740899 A      3/2006
(Continued)

OTHER PUBLICATIONS

Screen Captures from Youtube video clip entitled "Is the new Insta360 Quick Release Mount System the Best Ever ?! ", uploaded by user "Ifti's Tech Corner!" uploaded Dec. 9, 2023 and retrieved Jul. 22, 2025 https://www.youtube.com/watch?v=O3mdH EeElyo (Year: 2023).*

(Continued)

*Primary Examiner* — Chiawei Chen
(74) *Attorney, Agent, or Firm* — Young Basile Hanlon & MacFarlane, P.C.

(57)        ABSTRACT

An image capture apparatus including a body and a multi-function interconnect mechanism connected to the body. The interconnect mechanism includes: a base plate; protrusions; and magnetic members, wherein the base plate includes: a receptacle configured to engage an accessory such that the accessory is directly connectable to the image capture apparatus via the interconnect mechanism; locating features configured to receive alignment members on an adapter to facilitate proper registration of the adapter and the interconnect mechanism; and latching features configured for engagement with latch members on the adapter to thereby connect the adapter to the interconnect mechanism. The protrusions include apertures extending therethrough and are pivotably connected to the base plate such that the interconnect mechanism is reconfigurable between collapsed and extended configurations. The magnetic members are connected to the base plate such that the magnetic members extend into the apertures when the interconnect mechanism is in the collapsed configuration.

20 Claims, 24 Drawing Sheets

(56)     References Cited

U.S. PATENT DOCUMENTS

| | | | |
|---|---|---|---|
| D118,296 S | 12/1939 | Tuomey |
| 2,651,981 A | 9/1953 | Calhoun |
| 2,890,067 A | 6/1959 | Morin |
| 2,922,609 A | 1/1960 | Collier |
| 2,962,251 A | 11/1960 | Nikolaus |
| 3,073,227 A | 1/1963 | Richard |
| 3,508,482 A | 4/1970 | Taylor |
| D219,768 S | 1/1971 | Conwill |
| 3,762,797 A | 10/1973 | Heller |
| 3,776,649 A | 12/1973 | Kemezys |
| 3,860,937 A | 1/1975 | Wolfe |
| D243,655 S | 3/1977 | Matousek |
| 4,025,930 A | 5/1977 | Wolff |
| 4,091,402 A | 5/1978 | Siegel |
| 4,208,028 A | 6/1980 | Brown |
| 4,417,796 A | 11/1983 | Sugiura |
| D272,392 S | 1/1984 | Bigelow |
| 4,573,239 A | 3/1986 | Valenti |
| 4,646,141 A | 2/1987 | Timmermans |
| 4,733,259 A | 3/1988 | Ng |
| 4,763,151 A | 8/1988 | Klinger |
| 4,837,817 A | 6/1989 | Maemori |
| 4,864,335 A | 9/1989 | Corrales |
| 4,887,161 A | 12/1989 | Watanabe |
| 4,888,795 A | 12/1989 | Ando |
| 4,953,030 A | 8/1990 | Seo |
| 5,021,813 A | 6/1991 | Corrales |
| 5,092,458 A | 3/1992 | Yokoyama |
| 5,244,326 A | 9/1993 | Henriksen |
| 5,294,988 A | 3/1994 | Wakabayashi |
| 5,327,265 A | 7/1994 | McDonald |
| 5,336,086 A | 8/1994 | Simmen |
| 5,400,234 A | 3/1995 | Yu |
| 5,429,466 A | 7/1995 | Nagayama |
| D363,562 S | 10/1995 | Schildt |
| 5,485,357 A | 1/1996 | Zolninger |
| 5,486,852 A | 1/1996 | Arai |
| 5,505,424 A | 4/1996 | Niemann |
| D373,947 S | 9/1996 | Parduhn |
| 5,563,661 A | 10/1996 | Takahashi |
| 5,627,587 A | 5/1997 | Murata |
| 5,657,081 A | 8/1997 | Kurahashi |
| 5,661,823 A | 8/1997 | Yamauchi |
| D391,217 S | 2/1998 | Pingel |
| 5,726,708 A | 3/1998 | Sakai |
| 5,729,289 A | 3/1998 | Etoh |
| 5,769,370 A | 6/1998 | Ashjaee |
| 5,775,558 A | 7/1998 | Montalbano |
| 5,805,219 A | 9/1998 | Ejima |
| 5,808,663 A | 9/1998 | Okaya |
| 5,842,069 A | 11/1998 | Konno |
| 5,887,375 A | 3/1999 | Watson |
| 5,926,218 A | 7/1999 | Smith |
| 5,938,492 A | 8/1999 | Carlini |
| 5,946,501 A | 8/1999 | Hayakawa |
| 5,969,750 A | 10/1999 | Hsieh |
| 5,978,609 A | 11/1999 | Aoki |
| 5,995,373 A | 11/1999 | Nagai |
| D418,044 S | 12/1999 | Schoeneweis |
| 6,034,728 A | 3/2000 | Arena |
| 6,035,147 A | 3/2000 | Kurosawa |
| 6,042,080 A | 3/2000 | Shepherd |
| 6,104,887 A | 8/2000 | Hamasaki |
| 6,118,929 A | 9/2000 | Kawamura |
| 6,128,441 A | 10/2000 | Kamata |
| 6,138,826 A | 10/2000 | Kanamori |
| D437,772 S | 2/2001 | Erwin |
| D441,386 S | 5/2001 | Yamazaki |
| D442,982 S | 5/2001 | Adachi |
| 6,315,180 B1 | 11/2001 | Watkins |
| 6,332,146 B1 | 12/2001 | Jebens |
| 6,360,928 B1 | 3/2002 | Russo |
| D460,474 S | 7/2002 | Gotham |
| D462,893 S | 9/2002 | Sung |
| 6,480,671 B2 | 11/2002 | Takahashi |
| 6,483,542 B1 | 11/2002 | Morinaga |
| D467,605 S | 12/2002 | Dordick |
| 6,530,784 B1 | 3/2003 | Yim |
| 6,583,809 B1 | 6/2003 | Fujiwara |
| 6,637,904 B2 | 10/2003 | Hernandez |
| 6,654,235 B2 | 11/2003 | Imsand |
| D483,789 S | 12/2003 | Dordick |
| 6,663,064 B1 | 12/2003 | Minelli |
| 6,727,954 B1 | 4/2004 | Hiroyuki |
| 6,741,287 B1 | 5/2004 | Fuchimukai |
| D491,968 S | 6/2004 | Isshiki |
| D492,893 S | 7/2004 | Oddsen, Jr. |
| D494,450 S | 8/2004 | Schultz |
| 6,809,759 B1 | 10/2004 | Chiang |
| D504,904 S | 5/2005 | Nagai |
| 6,955,484 B2 | 10/2005 | Woodman |
| D511,960 S | 11/2005 | Ogino |
| D515,121 S | 2/2006 | Bleau |
| D515,613 S | 2/2006 | Holmes |
| D515,910 S | 2/2006 | Gates |
| 7,011,460 B1 | 3/2006 | Todd |
| 7,060,921 B2 | 6/2006 | Kubo |
| 7,077,582 B2 | 7/2006 | Johnson |
| 7,129,981 B2 | 10/2006 | Berstis |
| 7,182,529 B2 | 2/2007 | Kurosawa |
| 7,185,862 B1 | 3/2007 | Yang |
| 7,196,722 B2 | 3/2007 | White |
| 7,226,261 B1 | 6/2007 | Bristol |
| D551,969 S | 10/2007 | Aurilio |
| 7,285,879 B2 | 10/2007 | Osaka |
| D555,699 S | 11/2007 | Oh |
| 7,295,388 B2 | 11/2007 | Shyu |
| D559,083 S | 1/2008 | Brassard |
| 7,327,396 B2 | 2/2008 | Schultz |
| 7,337,403 B2 | 2/2008 | Pavley |
| 7,362,352 B2 | 4/2008 | Ueyama |
| 7,379,664 B2 | 5/2008 | Marcus |
| D571,188 S | 6/2008 | Brassard |
| D576,486 S | 9/2008 | Koza |
| D577,729 S | 9/2008 | Derry |
| D577,731 S | 9/2008 | Altonji |
| 7,440,693 B2 | 10/2008 | Kouchi |
| D581,255 S | 11/2008 | Calvin |
| D582,955 S | 12/2008 | Sekine |
| 7,463,304 B2 | 12/2008 | Murray |
| 7,464,215 B2 | 12/2008 | Kawai |
| 7,494,290 B2 | 2/2009 | Kim |
| 7,496,293 B2 | 2/2009 | Shamir |
| 7,508,420 B2 | 3/2009 | Kitajima |
| D591,325 S | 4/2009 | Dordick |
| 7,537,399 B2 | 5/2009 | Mayumi |
| 7,543,327 B1 | 6/2009 | Kaplinsky |
| D596,217 S | 7/2009 | Kim |
| D596,658 S | 7/2009 | Dordick |
| 7,612,821 B1 | 11/2009 | Hsia |
| 7,613,386 B2 | 11/2009 | Shimamura |
| 7,643,056 B2 | 1/2010 | Silsby |
| 7,656,294 B2 | 2/2010 | Boss |
| 7,663,666 B2 | 2/2010 | Kawai |
| 7,671,886 B2 | 3/2010 | Sawada |
| 7,674,081 B2 | 3/2010 | Selle |
| D616,286 S | 5/2010 | Foresman |
| D616,480 S | 5/2010 | Ookawa |
| D616,742 S | 6/2010 | Lymn |
| 7,728,905 B2 | 6/2010 | Tanaka |
| 7,752,732 B2 | 7/2010 | Brown |
| 7,801,425 B2 | 9/2010 | Fantone |
| D625,750 S | 10/2010 | Dittmer |
| 7,823,771 B2 | 11/2010 | Sawachi |
| D635,445 S | 4/2011 | Foresman |
| D640,304 S | 6/2011 | Green |
| 8,013,932 B2 | 9/2011 | Chan |
| 8,014,656 B2 | 9/2011 | Woodman |
| 8,026,945 B2 | 9/2011 | Garoutte |
| D646,313 S | 10/2011 | Woodman |
| 8,031,222 B2 | 10/2011 | Crinon |
| D657,808 S | 4/2012 | Woodman |
| 8,150,248 B1 | 4/2012 | Woodman |
| 8,194,145 B2 | 6/2012 | Lee |

(56) References Cited

U.S. PATENT DOCUMENTS

| | | | |
|---|---|---|---|
| 8,194,174 B2 | 6/2012 | Roskowski |
| 8,199,251 B2 | 6/2012 | Woodman |
| 8,218,025 B2 | 7/2012 | Yonaha |
| 8,235,635 B1 | 8/2012 | Brown |
| 8,267,361 B1 | 9/2012 | Dordick |
| 8,300,107 B2 | 10/2012 | Strandwitz |
| D671,394 S | 11/2012 | Derry |
| 8,325,270 B2 | 12/2012 | Woodman |
| 8,328,055 B1 | 12/2012 | Snyder |
| D675,242 S | 1/2013 | Laura |
| 8,348,214 B2 | 1/2013 | Vogt |
| 8,356,948 B2 | 1/2013 | Onishi |
| 8,368,748 B2 | 2/2013 | Ho |
| 8,371,729 B2 | 2/2013 | Sharrah |
| D679,576 S | 4/2013 | Paul |
| D680,097 S | 4/2013 | Davies |
| D683,207 S | 5/2013 | Papadopoulos |
| 8,467,675 B2 | 6/2013 | Chen |
| 8,485,910 B2 | 7/2013 | Selle |
| D690,280 S | 9/2013 | Schul |
| 8,542,308 B2 | 9/2013 | Ozawa |
| 8,544,643 B2 | 10/2013 | Yim |
| 8,638,392 B2 | 1/2014 | Woodman |
| D699,276 S | 2/2014 | Samuels |
| D699,277 S | 2/2014 | Samuels |
| D700,166 S | 2/2014 | Petersen |
| D701,840 S | 4/2014 | Kazakia |
| D702,276 S | 4/2014 | Woodman |
| 8,727,642 B1 | 5/2014 | Tse |
| 8,743,277 B2 | 6/2014 | Matsuzawa |
| 8,749,966 B1 | 6/2014 | Boudreau |
| 8,792,003 B2 | 7/2014 | Nakamura |
| 8,807,849 B2 | 8/2014 | Apter |
| D713,868 S | 9/2014 | Yang |
| 8,825,124 B1 | 9/2014 | Davies |
| 8,827,219 B2 | 9/2014 | Kessler |
| 8,830,326 B2 | 9/2014 | Kitagawa |
| 8,837,928 B1 | 9/2014 | Clearman |
| 8,870,475 B1 | 10/2014 | Bennett |
| D718,617 S | 12/2014 | Taylor |
| 8,917,496 B2 | 12/2014 | Richardson |
| D722,864 S | 2/2015 | Greenthal |
| D724,637 S | 3/2015 | Samuels |
| D724,638 S | 3/2015 | Samuels |
| 8,970,689 B2 | 3/2015 | Campbell |
| 8,992,102 B1 | 3/2015 | Samuels |
| D727,387 S | 4/2015 | Hasegawa |
| D727,991 S | 4/2015 | Hasegawa |
| 9,004,783 B1 | 4/2015 | Woodman |
| 9,014,766 B2 | 4/2015 | Hu |
| D729,059 S | 5/2015 | Taylor |
| D729,761 S | 5/2015 | Hu |
| D729,762 S | 5/2015 | Hu |
| D730,423 S | 5/2015 | Vandenbussche |
| 9,033,596 B2 | 5/2015 | Samuels |
| D732,593 S | 6/2015 | Woodman |
| D732,933 S | 6/2015 | Jansen |
| 9,097,962 B2 | 8/2015 | Johnson, Sr. |
| 9,122,133 B2 | 9/2015 | Bennett |
| 9,152,019 B2 | 10/2015 | Kintner |
| 9,161,110 B1 | 10/2015 | Patsis |
| 9,204,022 B2 | 12/2015 | Campbell |
| 9,204,710 B1 | 12/2015 | Burns |
| 9,229,299 B1 | 1/2016 | Morlon |
| 9,243,737 B2 | 1/2016 | Hida |
| 9,243,739 B2 | 1/2016 | Peters |
| 9,244,337 B2 | 1/2016 | Weihe |
| D749,164 S | 2/2016 | Raccah |
| 9,268,200 B2 | 2/2016 | Clearman |
| 9,268,201 B1 | 2/2016 | Montgomery |
| D750,687 S | 3/2016 | Samuels |
| 9,282,226 B2 | 3/2016 | Samuels |
| 9,297,616 B2 | 3/2016 | Daniel |
| 9,297,640 B2 | 3/2016 | Tassakos |
| 9,300,345 B2 | 3/2016 | Johnson |

| | | | |
|---|---|---|---|
| D754,238 S | 4/2016 | Woodman |
| 9,357,115 B2 | 5/2016 | Campbell |
| 9,360,742 B1 | 6/2016 | Harrison |
| 9,372,383 B2 | 6/2016 | Johnson |
| 9,377,672 B1 | 6/2016 | Clearman |
| 9,395,031 B1 | 7/2016 | Clearman |
| 9,395,603 B2 | 7/2016 | Achenbach |
| D762,536 S | 8/2016 | Wurzer |
| D764,566 S | 8/2016 | Bennett |
| D764,567 S | 8/2016 | Bennett |
| 9,423,673 B2 | 8/2016 | Clearman |
| 9,426,341 B1 | 8/2016 | Baldrige |
| 9,507,245 B1 | 11/2016 | Druker |
| 9,513,535 B2 | 12/2016 | Bennett |
| 9,521,302 B2 | 12/2016 | Samuels |
| D776,746 S | 1/2017 | Bennett |
| D777,240 S | 1/2017 | Costa |
| 9,551,915 B2 | 1/2017 | Clearman |
| D780,249 S | 2/2017 | Ramsthaler |
| 9,588,407 B1 | 3/2017 | Harrison |
| 9,596,388 B2 | 3/2017 | Woodman |
| 9,622,556 B2 | 4/2017 | Fathollahi |
| 9,625,791 B2 | 4/2017 | Harrison |
| 9,628,681 B2 | 4/2017 | Clearman |
| 9,635,226 B2 | 4/2017 | Samuels |
| 9,661,197 B2 | 5/2017 | Clearman |
| 9,681,029 B2 | 6/2017 | Harrison |
| 9,699,360 B2 | 7/2017 | Woodman |
| D795,061 S | 8/2017 | Bacallao |
| 9,736,376 B1 | 8/2017 | Holway |
| 9,763,548 B2 | 9/2017 | Theising |
| 9,772,542 B2 | 9/2017 | Clearman |
| D799,953 S | 10/2017 | Papafagos |
| D800,205 S | 10/2017 | Harrison |
| D800,822 S | 10/2017 | Costa |
| 9,823,549 B1 | 11/2017 | Miyashita |
| 9,829,772 B2 | 11/2017 | Harrison |
| 9,851,622 B2 | 12/2017 | Song |
| 9,864,257 B1 | 1/2018 | Wroblewski |
| 9,880,451 B2 | 1/2018 | Clearman |
| D811,335 S | 2/2018 | Weng |
| 9,904,148 B1 | 2/2018 | Druker |
| 9,915,855 B1 | 3/2018 | Miyashita |
| 9,926,029 B2 | 3/2018 | Rucker |
| 9,930,231 B2 | 3/2018 | Clearman |
| D818,517 S | 5/2018 | Szarawarski |
| 10,025,166 B2 | 7/2018 | Clearman |
| 10,094,513 B2 | 10/2018 | Bennett |
| D837,623 S | 1/2019 | Powers |
| D839,946 S | 2/2019 | De Vries |
| D840,795 S | 2/2019 | Tribbett |
| D841,721 S | 2/2019 | Muhlenkamp, IV |
| D847,609 S | 5/2019 | Ng |
| 10,306,115 B2 | 5/2019 | Samuels |
| 10,356,291 B2 | 7/2019 | Woodman |
| 10,416,538 B2 | 9/2019 | Clearman |
| 10,511,750 B2 | 12/2019 | Clearman |
| D873,833 S | 1/2020 | Leimer |
| 10,539,858 B2 | 1/2020 | Clearman |
| 10,547,769 B2 | 1/2020 | Harrison |
| D874,248 S | 2/2020 | Stekr |
| D879,762 S | 3/2020 | Luo |
| 10,694,083 B1 | 6/2020 | Thomas |
| D894,256 S | 8/2020 | Vitale |
| 10,768,511 B1 * | 9/2020 | Sato .................... G03B 17/563 |
| D905,786 S | 12/2020 | Vitale |
| 10,928,711 B2 * | 2/2021 | Vitale .................. H04N 23/55 |
| D947,357 S | 3/2022 | Chen |
| 11,503,194 B1 * | 11/2022 | Dai .................... H04N 23/51 |
| 11,641,528 B2 | 5/2023 | Douady |
| 11,662,651 B2 | 5/2023 | Nicholas |
| D989,164 S | 6/2023 | Bergman |
| D989,165 S | 6/2023 | Vitale |
| D990,546 S | 6/2023 | Harrison |
| 11,721,712 B2 | 8/2023 | Vitale |
| D1,003,979 S | 11/2023 | Alberstein |
| 11,849,248 B2 | 12/2023 | Chinnaiyan |
| 11,882,351 B2 | 1/2024 | Santos |
| 12,189,277 B2 | 1/2025 | Griggs |

(56) References Cited

U.S. PATENT DOCUMENTS

| | | |
|---|---|---|
| 2001/0017339 A1 | 8/2001 | Brotz |
| 2001/0043281 A1 | 11/2001 | Onuki |
| 2002/0005907 A1 | 1/2002 | Alten |
| 2002/0046218 A1 | 4/2002 | Gilbert |
| 2002/0101534 A1 | 8/2002 | Liu |
| 2002/0178116 A1 | 11/2002 | Yamasaki |
| 2003/0035052 A1 | 2/2003 | Baron |
| 2003/0085244 A1 | 5/2003 | Parsons |
| 2003/0104806 A1 | 6/2003 | Ruef |
| 2003/0115662 A1 | 6/2003 | Dobbie |
| 2003/0156212 A1 | 8/2003 | Kingetsu |
| 2003/0179306 A1 | 9/2003 | Lee |
| 2004/0066457 A1 | 4/2004 | Silverstein |
| 2004/0076415 A1 | 4/2004 | Da Silva |
| 2004/0095506 A1 | 5/2004 | Scott |
| 2004/0201745 A1 | 10/2004 | Wess |
| 2004/0212687 A1 | 10/2004 | Patwari |
| 2004/0223752 A1 | 11/2004 | Ghanouni |
| 2005/0025472 A1 | 2/2005 | Sugita |
| 2005/0041966 A1 | 2/2005 | Johnson |
| 2005/0122424 A1 | 6/2005 | Overstreet |
| 2005/0190263 A1 | 9/2005 | Monroe |
| 2005/0265711 A1 | 12/2005 | Heibel |
| 2006/0007551 A1 | 1/2006 | Sakurai |
| 2006/0015664 A1 | 1/2006 | Zhang |
| 2006/0022108 A1 | 2/2006 | Kuga |
| 2006/0061663 A1 | 3/2006 | Park |
| 2006/0066753 A1 | 3/2006 | Gennetten |
| 2006/0072020 A1 | 4/2006 | McCutchen |
| 2006/0098966 A1 | 5/2006 | Takahashi |
| 2006/0139459 A1 | 6/2006 | Zhong |
| 2006/0177215 A1 | 8/2006 | Johnson |
| 2006/0257137 A1 | 11/2006 | Fromm |
| 2006/0262365 A1 | 11/2006 | Imao |
| 2006/0274157 A1 | 12/2006 | Levien |
| 2006/0274493 A1 | 12/2006 | Richardson |
| 2007/0024734 A1 | 2/2007 | Headley |
| 2007/0025711 A1 | 2/2007 | Marcus |
| 2007/0053680 A1 | 3/2007 | Fromm |
| 2007/0071423 A1 | 3/2007 | Fantone |
| 2007/0077062 A1 | 4/2007 | Senba |
| 2007/0109417 A1 | 5/2007 | Hyttfors |
| 2007/0126883 A1 | 6/2007 | Ishige |
| 2007/0140686 A1 | 6/2007 | Misawa |
| 2007/0154254 A1 | 7/2007 | Bevirt |
| 2007/0242134 A1 | 10/2007 | Zernov |
| 2007/0244634 A1 | 10/2007 | Koch |
| 2007/0268382 A1 | 11/2007 | Shiomi |
| 2007/0268588 A1 | 11/2007 | Elias |
| 2008/0011344 A1 | 1/2008 | Barker |
| 2008/0023607 A1 | 1/2008 | Barker |
| 2008/0063392 A1 | 3/2008 | Ahn |
| 2008/0072163 A1 | 3/2008 | Teng |
| 2008/0074487 A1 | 3/2008 | Ryckman |
| 2008/0100712 A1 | 5/2008 | Hayes |
| 2008/0107414 A1 | 5/2008 | Showalter |
| 2008/0117328 A1 | 5/2008 | Daoud |
| 2008/0122958 A1 | 5/2008 | Huseth |
| 2008/0180537 A1 | 7/2008 | Weinberg |
| 2008/0237414 A1 | 10/2008 | Lien |
| 2008/0248703 A1 | 10/2008 | Russell |
| 2008/0266389 A1 | 10/2008 | Dewind |
| 2008/0267613 A1 | 10/2008 | Darrow |
| 2008/0316327 A1 | 12/2008 | Steinberg |
| 2008/0316734 A1 | 12/2008 | Spartano |
| 2009/0003821 A1 | 1/2009 | Son |
| 2009/0032420 A1 | 2/2009 | Zenzai |
| 2009/0059064 A1 | 3/2009 | Terakado |
| 2009/0109286 A1 | 4/2009 | Ennis |
| 2009/0110380 A1 | 4/2009 | Fantone |
| 2009/0111543 A1 | 4/2009 | Tai |
| 2009/0173863 A1 | 7/2009 | Crown |
| 2009/0206077 A1 | 8/2009 | Melmon |
| 2009/0283184 A1 | 11/2009 | Han |
| 2009/0321483 A1 | 12/2009 | Froloff |
| 2010/0060747 A1 | 3/2010 | Woodman |
| 2010/0061711 A1 | 3/2010 | Woodman |
| 2010/0079607 A1 | 4/2010 | Won |
| 2010/0118158 A1 | 5/2010 | Boland |
| 2010/0141762 A1 | 6/2010 | Siann |
| 2010/0205537 A1 | 8/2010 | Knighton |
| 2010/0220188 A1 | 9/2010 | Renkis |
| 2010/0229450 A1 | 9/2010 | Becker |
| 2010/0246669 A1 | 9/2010 | Harel |
| 2010/0252188 A1 | 10/2010 | Inanami |
| 2010/0253832 A1 | 10/2010 | Duparre |
| 2010/0266273 A1 | 10/2010 | Wood |
| 2010/0283843 A1 | 11/2010 | Cai |
| 2010/0289904 A1 | 11/2010 | Zhang |
| 2010/0299814 A1 | 12/2010 | Celona |
| 2010/0333155 A1 | 12/2010 | Royall |
| 2011/0001834 A1 | 1/2011 | Herrell |
| 2011/0042530 A1 | 2/2011 | Phillips |
| 2011/0064401 A1 | 3/2011 | Desorbo |
| 2011/0067322 A1 | 3/2011 | Taschek |
| 2011/0129210 A1 | 6/2011 | Mcgucken |
| 2011/0138673 A1 | 6/2011 | Deros |
| 2011/0147245 A1 | 6/2011 | Yim |
| 2011/0211820 A1 | 9/2011 | Yim |
| 2011/0216195 A1 | 9/2011 | Tanaka |
| 2011/0224798 A1 | 9/2011 | Caillouette |
| 2011/0252188 A1 | 10/2011 | Weingarten |
| 2011/0260022 A1 | 10/2011 | Lin |
| 2011/0297578 A1 | 12/2011 | Stiehl |
| 2011/0298970 A1 | 12/2011 | Shinohara |
| 2011/0317065 A1 | 12/2011 | Lin |
| 2012/0017922 A1 | 1/2012 | Hirshberg |
| 2012/0043236 A1 | 2/2012 | Szucs |
| 2012/0070223 A1 | 3/2012 | Wimberley |
| 2012/0099849 A1 | 4/2012 | Onishi |
| 2012/0120236 A1 | 5/2012 | Xiao |
| 2012/0133758 A1 | 5/2012 | Foss |
| 2012/0195585 A1 | 8/2012 | Wagner |
| 2012/0224078 A1 | 9/2012 | Woodman |
| 2012/0228346 A1 | 9/2012 | Huang |
| 2012/0240444 A1 | 9/2012 | Russell |
| 2012/0242785 A1 | 9/2012 | Sasagawa |
| 2012/0242786 A1 | 9/2012 | Sasagawa |
| 2012/0262618 A1 | 10/2012 | Weakly |
| 2012/0288269 A1 | 11/2012 | Jensen |
| 2012/0312309 A1 | 12/2012 | Zimmerman |
| 2012/0315813 A1 | 12/2012 | Rossini |
| 2012/0324682 A1 | 12/2012 | Ballentine |
| 2013/0029515 A1 | 1/2013 | Lin |
| 2013/0057758 A1 | 3/2013 | Woodman |
| 2013/0082963 A1 | 4/2013 | Chu |
| 2013/0107111 A1 | 5/2013 | Campbell |
| 2013/0127309 A1 | 5/2013 | Wyner |
| 2013/0148951 A1 | 6/2013 | Zhang |
| 2013/0170823 A1 | 7/2013 | Mcdonald |
| 2013/0184033 A1 | 7/2013 | Willenborg |
| 2013/0186310 A1 | 7/2013 | Lymberis |
| 2013/0250134 A1 | 9/2013 | Mccauley |
| 2013/0263865 A1 | 10/2013 | Khast |
| 2013/0306689 A1 | 11/2013 | Johnson |
| 2013/0315577 A1 | 11/2013 | Clark |
| 2013/0324189 A1 | 12/2013 | Katis |
| 2013/0331976 A1 | 12/2013 | Freeman |
| 2014/0016922 A1 | 1/2014 | Greenthal |
| 2014/0027591 A1 | 1/2014 | Fountain |
| 2014/0028484 A1 | 1/2014 | Ho |
| 2014/0036420 A1 | 2/2014 | Chen |
| 2014/0050468 A1 | 2/2014 | Henry |
| 2014/0060582 A1 | 3/2014 | Hartranft |
| 2014/0066144 A1 | 3/2014 | Hong |
| 2014/0069824 A1 | 3/2014 | Kalashnikov |
| 2014/0090205 A1 | 4/2014 | Sarnowski |
| 2014/0098241 A1 | 4/2014 | Stout |
| 2014/0099093 A1 | 4/2014 | Johnson |
| 2014/0104447 A1 | 4/2014 | Woodman |
| 2014/0105589 A1 | 4/2014 | Samuels |
| 2014/0190841 A1 | 7/2014 | Nash |
| 2014/0226268 A1 | 8/2014 | Oneill |
| 2014/0231475 A1 | 8/2014 | Donnelly |

(56) References Cited

U.S. PATENT DOCUMENTS

| | | |
|---|---|---|
| 2014/0252188 A1 | 9/2014 | Webster |
| 2014/0267894 A1 | 9/2014 | Campbell |
| 2014/0310915 A1 | 10/2014 | Tung |
| 2014/0321843 A1 | 10/2014 | Hulse |
| 2014/0353178 A1 | 12/2014 | Kim |
| 2015/0030320 A1 | 1/2015 | Clearman |
| 2015/0040917 A1 | 2/2015 | Gottsch |
| 2015/0078737 A1 | 3/2015 | Albonico |
| 2015/0122849 A1 | 5/2015 | Jones |
| 2015/0130998 A1 | 5/2015 | Campbell |
| 2015/0136620 A1 | 5/2015 | Williams |
| 2015/0143618 A1 | 5/2015 | Pereira |
| 2015/0171404 A1 | 6/2015 | Kwon |
| 2015/0177597 A1 | 6/2015 | Harrison |
| 2015/0180527 A1 | 6/2015 | Fathollahi |
| 2015/0192841 A1 | 7/2015 | Bennett |
| 2015/0195436 A1 | 7/2015 | Samuels |
| 2015/0201113 A1 | 7/2015 | Wood |
| 2015/0234258 A1 | 8/2015 | Hida |
| 2015/0253651 A1 | 9/2015 | Russell |
| 2015/0264226 A1 | 9/2015 | Gafni |
| 2015/0286115 A1 | 10/2015 | Koch |
| 2015/0286117 A1 | 10/2015 | Sung |
| 2015/0288892 A1 | 10/2015 | Frank |
| 2015/0305518 A1 | 10/2015 | Galant |
| 2015/0312446 A1 | 10/2015 | Blackman |
| 2015/0316205 A1 | 11/2015 | Bennett |
| 2015/0323856 A1 | 11/2015 | Nordhaug |
| 2015/0332129 A1 | 11/2015 | Murphy |
| 2015/0346588 A1 | 12/2015 | Hudson |
| 2015/0366093 A1 | 12/2015 | Battista |
| 2015/0372705 A1 | 12/2015 | Fiorentino |
| 2016/0077409 A1 | 3/2016 | Samuels |
| 2016/0100083 A1 | 4/2016 | Harrison |
| 2016/0119516 A1 | 4/2016 | Clearman |
| 2016/0131963 A1 | 5/2016 | Clearman |
| 2016/0131964 A1 | 5/2016 | Basulto |
| 2016/0134788 A1 | 5/2016 | Clearman |
| 2016/0139494 A1 | 5/2016 | Tien |
| 2016/0186919 A1 | 6/2016 | Zhao |
| 2016/0209733 A1 | 7/2016 | Akai |
| 2016/0216597 A1 | 7/2016 | Lim |
| 2016/0219202 A1 | 7/2016 | Barros |
| 2016/0269629 A1 | 9/2016 | Martin |
| 2016/0309064 A1 | 10/2016 | Woodman |
| 2016/0330352 A1 | 11/2016 | Samuels |
| 2016/0355121 A1 | 12/2016 | Gertsma |
| 2016/0373623 A1 | 12/2016 | Woodman |
| 2017/0050794 A1 | 2/2017 | Clark |
| 2017/0059967 A1 | 3/2017 | Harrison |
| 2017/0060184 A1 | 3/2017 | Ranetkins |
| 2017/0090273 A1 | 3/2017 | Clearman |
| 2017/0108759 A1 | 4/2017 | Clearman |
| 2017/0142300 A1 | 5/2017 | Rice |
| 2017/0176843 A1 | 6/2017 | Yamakose |
| 2017/0223238 A1 | 8/2017 | Clearman |
| 2017/0235213 A1 | 8/2017 | Clearman |
| 2017/0242321 A1* | 8/2017 | Hehir .................... G03B 17/55 |
| 2017/0255082 A1 | 9/2017 | Song |
| 2017/0272626 A1 | 9/2017 | Harrison |
| 2017/0289413 A1 | 10/2017 | Samuels |
| 2017/0306672 A1 | 10/2017 | Romero Contreras |
| 2017/0324890 A1 | 11/2017 | Moskovchenko |
| 2017/0339319 A1 | 11/2017 | Woodman |
| 2018/0059514 A1 | 3/2018 | Druker |
| 2018/0095343 A1 | 4/2018 | Wroblewski |
| 2018/0136546 A1 | 5/2018 | Clearman |
| 2018/0157153 A1 | 6/2018 | Clearman |
| 2018/0220050 A1 | 8/2018 | Clearman |
| 2019/0025675 A1 | 1/2019 | Druker |
| 2019/0238729 A1 | 8/2019 | Samuels |
| 2019/0258142 A1 | 8/2019 | Liu |
| 2019/0281197 A1 | 9/2019 | Woodman |
| 2019/0342473 A1 | 11/2019 | Clearman |
| 2019/0342474 A1 | 11/2019 | Woodman |
| 2019/0369466 A1 | 12/2019 | Clearman |
| 2020/0159091 A1* | 5/2020 | Vitale .................... H04N 23/55 |
| 2021/0112182 A1 | 4/2021 | Crow |
| 2021/0173288 A1 | 6/2021 | Vitale |
| 2021/0306536 A1 | 9/2021 | Vitale |
| 2021/0397070 A1* | 12/2021 | Thomas ................ H04N 23/54 |
| 2022/0291573 A1 | 9/2022 | Hilliard |
| 2023/0057637 A1 | 2/2023 | Krishnamurthy |
| 2023/0236481 A1 | 7/2023 | Vitale |
| 2023/0324772 A1 | 10/2023 | Russell |
| 2023/0324774 A1 | 10/2023 | Muhlenkamp, IV |
| 2023/0328432 A1 | 10/2023 | Tisch |
| 2025/0341765 A1 | 11/2025 | Wong |

FOREIGN PATENT DOCUMENTS

| | | |
|---|---|---|
| CN | 100432830 | 11/2008 |
| CN | 201796220 U | 4/2011 |
| CN | 301786205 S | 1/2012 |
| CN | 202353622 U | 7/2012 |
| CN | 302436013 S | 5/2013 |
| CN | 302579018 S | 9/2013 |
| CN | 302748860 S | 2/2014 |
| CN | 302790142 S | 4/2014 |
| CN | 303181818 S | 4/2015 |
| CN | 303248953 S | 6/2015 |
| CN | 104871082 A | 8/2015 |
| CN | 105474089 | 4/2016 |
| CN | 303775763 S | 8/2016 |
| CN | 106164768 | 11/2016 |
| CN | 303907057 S | 11/2016 |
| CN | 303988503 S | 12/2016 |
| CN | 106516141 A | 3/2017 |
| CN | 304130943 S | 5/2017 |
| CN | 304232547 S | 8/2017 |
| CN | 206579852 U | 10/2017 |
| CN | 304363793 S | 11/2017 |
| CN | 304461932 S | 1/2018 |
| CN | 304723510 S | 7/2018 |
| CN | 109375454 | 2/2019 |
| CN | 110426910 | 11/2019 |
| CN | 305434602 | 11/2019 |
| CN | 305689289 | 4/2020 |
| CN | 111120817 A | 5/2020 |
| CN | 305905490 | 7/2020 |
| CN | 211375284 U | 8/2020 |
| CN | 306285361 | 1/2021 |
| CN | 213576439 U | 6/2021 |
| CN | 218226303 U | 1/2023 |
| CN | 218830398 U | 4/2023 |
| DE | 202005004068 U1 | 6/2005 |
| DE | 202013005239 | 7/2013 |
| DE | 202014011346 | 8/2019 |
| EP | 0845399 A2 | 6/1998 |
| EP | 1160499 | 12/2001 |
| EP | 1653423 A1 | 5/2006 |
| EP | 2464096 A1 | 6/2012 |
| EP | 2906993 | 8/2015 |
| EP | 3025193 | 6/2016 |
| EP | 3092527 | 11/2016 |
| GB | 2018929 A | 10/1979 |
| GB | 2363028 A | 12/2001 |
| GB | 6006189 | 1/2017 |
| GB | 2546075 A | 7/2017 |
| JP | H05304625 A | 11/1993 |
| JP | 2002006381 A | 1/2002 |
| JP | 2003029330 A | 1/2003 |
| JP | 2003330090 A | 11/2003 |
| JP | 2004080256 A | 3/2004 |
| JP | 2004221775 A | 8/2004 |
| JP | 2005142671 A | 6/2005 |
| JP | D1265949 | 3/2006 |
| JP | 2007003648 A | 1/2007 |
| JP | 2008109364 A | 5/2008 |
| JP | 2008158143 A | 7/2008 |
| JP | D1400935 | 11/2010 |
| JP | 2011193209 A | 9/2011 |
| JP | 2014191189 A | 10/2014 |
| WO | 2004023795 A1 | 3/2004 |

(56)                References Cited

FOREIGN PATENT DOCUMENTS

| | | |
|---|---|---|
| WO | 2004081713 A2 | 9/2004 |
| WO | 2005096760 A2 | 10/2005 |
| WO | 2005098304 A1 | 10/2005 |
| WO | 2007128317 A1 | 11/2007 |
| WO | 2007130146 A1 | 11/2007 |
| WO | 2010005975 A1 | 1/2010 |
| WO | 2010005976 A1 | 1/2010 |
| WO | 2013067340 | 5/2013 |
| WO | 2014062360 A1 | 4/2014 |
| WO | 2015013054 A1 | 1/2015 |
| WO | 2015102888 A1 | 7/2015 |
| WO | 2016053472 | 4/2016 |
| WO | 2016064468 | 4/2016 |
| WO | 2016073188 | 5/2016 |

OTHER PUBLICATIONS

Youtube video clip entitled "Convert GoPro mount to DJI Action mount, uploaded by user Roger Seng" uploaded Sep. 15, 2023 and retrieved Jul. 22, 2025. https://www.youtube.com/watch?v=AMuAl9aczOU (Year: 2023).*

'Day of the (most recent) update in DPMAregister' (German Patent and Trademark Office) Jul. 5, 2014 (Jul. 5, 2014), 19 Pages, [Online] retrieved from DPMAregister <URL:https://register.dpma.de/DPMAregister/pat/register/PAT2020130052392_2015-10-137AKZ=2020130052392&VIEW=pdf >, (used to establish publication date of 'File Inspection' publication by Maas).

'GoPro Hero 3 Sports Wrist Camera Review,' PaddleDogNation, 2006, 6 pages, [Online] [Retrieved on Aug. 8, 2007] Retrieved from the Internet <URL:http://paddledognation. com/Reviews/PaddlingGearReviews/He-ro3Ca . . . >. 6 pages.

'Tekkno Trading Project—Brandnews,' NSP, Jan. 2008, p. 59.

"WoCase 360 Degree Panoramic Swiveling Glove Mount Hand Mount (Compatible with left handed) for GoPro HERO4 HERO3+3 2 1 Cameras (Rotary Mount, Retail Package, Gifting Ready)," Amazon.com, Jul. 11, 2013, 8 pages, [online] [retrieved on Feb. 22, 2020] Retrieved from the internet <URL:http://www.amazon.com/WoCase-Panoramic-Swiveling-Compatible-Cameras/dp/B00HMLYMHW/ref=pd_sim_sbs_421_1?ie=UTF8&dpID=51%2BoLD9jb2L&dpSrc=sims&preST=_AC_UL160_SR160%2C160_&refRID=097XMG8E8BDXQAJRSS0D>.

Canon, 'Wireless file Transmitter WFT-EF E,'2009, 132 pages, [Online] [Retrieved on Feb. 11, 2015] Retrieved from the Internet<URL:http://shuttersnitch.com/downloads/manuals/canon/wft-e5-en.pdf.

Cheesycam.com, 'Remote LCD Live View + Remote Shutter for DSLR Video—Exciting!', Jul. 16, 2010, 12 pages, [Online] [Retrieved on Feb. 11, 2015] Retrieved from the Internet<URL:http://cheesycam.com/remote-LCD-live-view-for-dslr-video-exciting/>.

Chinese Office Action dated May 30, 2018 for CN Application No. 201480072371.9, (6 pages).

Design U.S. Appl. No. 29/661,818, filed Aug. 31, 2018, Huy Phuong Nguyen et al., 79 pages.

Design U.S. Appl. No. 29/661,819, filed Aug. 31, 2018, Vitale et al., 80 pages.

Design U.S. Appl. No. 29/681,087, filed Feb. 22, 2019, Vitale et al., 41 pages.

Design U.S. Appl. No. 29/694,559, filed Jun. 11, 2019, Coster et al., 28 pages.

Design U.S. Appl. No. 29/706,013, filed Sep. 17, 2019, Muhlenkamp et al., 97 pages.

Double male GoPro bar by eliotg Thingiverse. [online] Published on Jan. 16, 2016. Retrieved from URL:https://www.thingiverse.com/thing: 1273246 (2 pages).

European Search Report for European Patent Application No. EP 14876907.8, Jan. 10, 2017, 8 Pages.

Extended European Search Report issued in App. No. EP24164959, dated May 27, 2024, 7 pages.

Fantaseal Action Camera Bike Mount Aluminum Alloy 2-Rail Saddle Bike Seat Mount for GoPro Pro Seat Rail Mount GoPro Bike Mount GoPro Bicycle Seat Rack Mount for GoPro Garmin Virb XE SJCAM DBPOWER-BK. Online, published date unknown. Retrieved on May 23, 2018 from URL: https://www.amazon.com/fantaseal-Action-Camera-Bi (1 page).

File Inspection—DE 20 2013 005 239.2, (MAAS) Retrieved on Oct. 13, 2015 (Oct. 13, 2015) entire document, 4 Pages, [Online] retrieved from DPMAregister <URL:https://register.dpma.de/DPMAregister/pat/PatAkteneinsicht?akz=2020130052392>.

Guarnera, M. et al., 'Manet: Possible Applications with PDA in Wireless Imagining Environment', IEEE International Symposium, Sep. 2002, vol. 7, pp. 2394-2398, vol. 5, pp. 15-18.

http://web.archive.org/web/20190503083635/http://www.fvshare.com:80/en/viltag Note—wayback machine link may take extra time to load pictures May 3, 2019, 8 pages.

https://www.amazon.com/Adjust-Straight-Joints-HSU-Direction/dp/B01IQPD9DU/ref=sr_1_1?keywords=long+and+short+straight+joint+tripod+mount+adapter+for+GoPro+hero+5+4+3&qid=1582047554&sr=8-1, retrieved Feb. 22, 2020, 9 pages.

https://www.amazon.com/Fotasy-Aluminum-Folding-Release-Cameras/dp/B0058FJHR4/ref=sr_1_8?keywords=z+tripod+mount&qid=1582047698&sr=8-8, retrieved Feb. 22, 2020, 10 pages.

https://www.amazon.com/Tripod-Pistol-Cameras-Weighing-2-5lbs/dp/B0739YGN9M/ref=sr_1_1?keywords=Handheld+Grip+Mini+Tripod+Stand+for+DC+Digital+Camera+Camcorder&qid=1582047442&sr=8-1, Retrieved Feb. 22, 2020, 9 pages.

https://www.youtube.com/watch?v=sOfMcPM5Xg4 (@7:08 mark), retrieved Feb. 22, 2020. No pdf attached. please see video at link.

Huang, J., "Part 19—Oct. 21: Interbike Bits and Baubles," Interbike Show, Las Vegas, Nevada, USA, Sep. 22-26, 2008, Cyclingnews. com, [Online] [Retrieved on Oct. 21, 2008] Retrieved from the Internet<URL:http://www.cyclingnews.com/tech/2008/shows/interbike08/?i-d=result . . . >. 3 pages.

I Phone X Outfitting it for Adventure. [online] Published on Nov. 29, 2017. Retrieved from URL: https://explore.globalcreations.com/reviews/tools/outfitting-iphone-x-adventure/(13 pages).

Insta360 GO 3 Pivot Stand, Insta360 Store, https://store.insta360.com/product/go-3-pivot-stand, 5 pages printed Apr. 19, 2024.

Insta360 GO 3 Quick Release Mount, insta360.com, https://store.insta360.com/product/go-3-quick-release-mount, 6 pages, printed Apr. 19, 2024.

Instagram Account for "mygomount", First post uploaded on Mar. 19, 2017, 3 Pages, [online] Retrieved on Jul. 25, 2017] Retrieved from the internet <URL:https://www.instagmm.com/mygomount/?hl=en>.

International Preliminary Report on Patentability for App. No. PCT/US2019/045281, dated Feb. 18, 2021, 7 pages.

International Search Report and Written Opinion for Application No. PCT/US2019/045281, date of mailing Oct. 24, 2019, 10 pages.

International Search Report and Written Opinion for International Application No. PCT/US2014/046552, Aug. 18, 2014, 7 pages.

Ion USA, 'Wi-Fi PODZ,' Date Unknown, 2 pages. [Online] [Retrieved Oct. 11, 2016] Retrieved from the internet <https://usa.ioncamera.com/shop/wi-fi-podz/>.

JP-05304625 A, 1993, 5 pages, (Machine Translation available from JPO website), [Online]. [Retrieved Dec. 14, 2014], Retrieved from the Internet <http://dossier1.ipdl.inpit.go.jp/cgi-bin/tran_web_cgi_e-je?u=http%3A%2F%2Fdossier1% >.

JP5-304625 English Machine Translation available from JPO website. 2016. 7 pages.

Non-Final Rejection for U.S. Appl. No. 13/665,594 mailed Mar. 29, 2013, 25 Pages.

Non-Final Rejection for U.S. Appl. No. 12/498,890 mailed Aug. 30, 2011, 31 Pages.

Norouznezhad, E. et al. "A High Resolution Smart Camera with GigE Vision Extension for Surveillance Applications," Second ACM/IEEE International Conference on Distributed Smart Cameras, 2008, 8 pages.

Office Action for U.S. Appl. No. 14/521,458, Feb. 25, 2016, 13 Pages.

Office Action for U.S. Appl. No. 14/521,458, Jul. 28, 2015, 12 Pages.

(56) References Cited

OTHER PUBLICATIONS

PCT International Search Report and Written Opinion for PCT/US15/43958, Nov. 9, 2015, 14 Pages.

PCT International Search Report and Written Opinion for PCT/US15/45403, Nov. 19, 2015, 12 Pages.

PCT International Search Report and Written Opinion for PCT/US15/56478, Jan. 15, 2016, 9 Pages.

PCT International Search Report and Written Opinion for PCT/US2014/058465, Dec. 23, 2014, 17 pages.

PCT International Search Report and Written Opinion for PCT/US2014/070655, Apr. 29, 2015, 13 Pages.

PCT International Search Report and Written Opinion for PCT/US2015/028377, Jul. 24, 2015, 16 Pages.

PCT International Search Report and Written Opinion, PCT Application No. PCT/US2009/049821, Sep. 3, 2009, 8 pages.

PCT International Search Report and Written Opinion, PCT/US2012/063304, Jan. 22, 2013, 7 Pages.

PCT International Search Report for Written Opinion for PCT/US2013/062061, Mar. 3, 2014, 15 Pages.

Pro Camera Bracket Integrated Mount. Online, published date unknown. Retrieved on May 23, 2018 from URL: https://www.annaincycling.conn/pro-camera-bracket-integrated-mount-black-17-pro-saddle-connpatible-prac0129/p612468 (1 page).

Pro Standard, "The Grill Mount Multi-Function Mouth Mount," Date unknown, 8 Pages, [online] [Retrieved on Jul. 25, 2017] Retrieved from the internet <URL:https://www.prostandard.com/collections/pro-standard/products/the-grill-mount?variant=7683423299>.

HSU HGP235 Amazon product listing at https://www.amazon.com/HSU-Replacement-Folding-Compatible-Connector/dp/B08R2XP8DW, accessed Nov. 15, 2024 (Year: 2024) 22 pages.

Re-Fuel, '24hr Action Pack Battery for GoPro Hero4, Hero3+ & Hero3,' Date Unknown, 5 pages. [Online] [Retrieved Oct. 11, 2016] Retrieved from the internet <https://re-fuel.com/action-packs/24hr-action-battery-pack.html>.

Sewing Machine Table Folding Flip Hinge, Uxcell store, Amazon, https://www.amazon.com/uxcell-Sewing-Machine-Folding-Plating/dp/B07GQVB98L, Aug. 22, 2018 (Year: 2018) 5 pages.

Spypoint Xcel Action Camera Adhesive Mount XHD-AM. Online, published date unknown. Retrieved on May 14, 2020 from URL: https://www.opti csplanet.com/spy-point-xcel-action-camera-adhesive-mount.html, 1 page.

Sun, X. et al. "Region of Interest Extraction and Virtual Camera Control Based on Panoramic Video Capturing," IEEE Transactions on Multimedia, 2005, pp. 981-990, vol. 7, issue 5.

Supplementary European Search Report for European Patent Application No. EP 14829354, Aug. 16, 2016, 6 Pages.

The Telesin Tripod Mount Adapter, TELESIN Tripod Mount Adapter for GoPro Hero 11/10/9/8/Max—telesinstore.

U.S. Appl. No. 16/697,947, filed Nov. 27, 2019, Vitale et al., 77 pages.

Ulanzi Mount 3 (Ulanzi Mount 3), Ulanzi Go-Quick II Magnetic Quick Release 1/4" Screw Adapter Mount Set C045GBB1, https://www.ulanzi.com/products/ulanzi-go-quick-ii-magnetic-quick-release-1-4-screw-adapter-mount-set-c045gbb1, Retrieved from Internet Mar. 26, 2024.

Ulanzi Mount 4 (Ulanzi Mount 4) Ulanzi Go Quick II Quick Release Basic Set, https://www.ulanzi.com/products/ulanzi-go-quick-ii-quick-release-basic-set, Retrieved from Internet Mar. 26, 2024.

United States Advisory Action, U.S. Appl. No. 14/521,458, Aug. 12, 2016, 2 pages.

United States Advisory Action, U.S. Appl. No. 14/521,458, Jun. 20, 2016, 4 pages.

United States Advisory Action, U.S. Appl. No. 14/947,766, Aug. 29, 2016, 3 pages.

United States Office Action for U.S. Appl. No. 14/148,536, Jul. 9, 2014, 9 pages.

United States Office Action for U.S. Appl. No. 14/536,683, Dec. 18, 2014, 14 Pages.

United States Office Action for U.S. Appl. No. 14/536,683, Jun. 9, 2015, 16 pages.

United States Office Action for U.S. Appl. No. 14/536,683, Sep. 21, 2015. 15 Pages.

United States Office Action for U.S. Appl. No. 13/666,807, Oct. 6, 2014, 11 pages.

United States Office Action for U.S. Appl. No. 14/149,502, Jul. 9, 2014, 8 pages.

United States Office Action for U.S. Appl. No. 14/495,673, Jan. 28, 2015, 16 pages.

United States Office Action for U.S. Appl. No. 14/495,673, Mar. 24, 2015, 15 pages.

United States Office Action for U.S. Appl. No. 14/495,673, Nov. 7, 2014, 16 pages.

United States Office Action for U.S. Appl. No. 14/604,118, Apr. 14, 2015, 11 pages.

United States Office Action, U.S. Appl. No. 14/459,650, Jun. 10, 2015, 7 pages.

United States Office Action, U.S. Appl. No. 14/132,554, Apr. 24, 2015, 13 pages.

United States Office Action, U.S. Appl. No. 14/132,554, Dec. 3, 2015, 28 pages.

United States Office Action, U.S. Appl. No. 14/132,554, Feb. 26, 2016, 31 pages.

United States Office Action, U.S. Appl. No. 14/854,040, Feb. 4, 2016, 7 pages.

United States Office Action, U.S. Appl. No. 14/521,458, Feb. 25, 2016, 13 pages.

United States Office Action, U.S. Appl. No. 14/521,458, Jul. 28, 2015, 12 pages.

United States Office Action, U.S. Appl. No. 14/521,458, Sep. 20, 2016, 16 pages.

United States Office Action, U.S. Appl. No. 14/606,018, Dec. 2, 2016, 19 pages.

United States Office Action, U.S. Appl. No. 14/606,018, Jan. 13, 2016, 16 pages.

United States Office Action, U.S. Appl. No. 14/606,018, Jul. 15, 2016, 21 pages.

United States Office Action, U.S. Appl. No. 14/606,018, Jun. 2, 2016, 19 pages.

United States Office Action, U.S. Appl. No. 14/947,766, Apr. 21, 2016, 13 pages.

United States Office Action, U.S. Appl. No. 14/947,766, Aug. 16, 2016, 6 pages.

United States Office Action, U.S. Appl. No. 14/947,766, Nov. 9, 2016, 11 pages.

United States Office Action, U.S. Appl. No. 15/180,535, Jan. 17, 2017, 12 pages.

United States Office Action, U.S. Appl. No. 15/187,708, Oct. 7, 2016, 13 pages.

Vilta-G-Freevision Intelligent Technology, URL:http://www.fvshare.com/en/viltag, retrieved on Feb. 22, 2020, 8 pages.

Vixen Polarie Star Tracker Review. [online] Published date Mar. 22, 2013. Retrieved on Oct. 25, 2016 from <URL: https://www.ephotozine.com/article/vixen-polarie-star-tracker-review-21516> 6 pages.

Volk, W., 'Go Pro's Digital Hero Camera,' Divester, Posted Dec. 5, 2008, [Online] [Retrieved on Sep. 16, 2009] Retrieved from the Internet<URL:http://www.divester.com/2006/12/05/go-pro-digital-hero-camera/>. 3 pages.

YourDealer, 'Aputure Gigtube Digital Screen Remote Viewfinder gives you more remote control with most DSLRs,' 2009 Deals-World.com, Apr. 11, 2010, 3 pages, [Online] [Retrieved on Feb. 11, 2015] Retrieved from the Internet <URL:http://www.deals-world.com/deals/2010/04/11/aputure-gigtube-digital-screen-remote-viewfinder-gives-you-more-remote-control-with-most-dslrs/, Apr. 11, 2010.

youtube.com, Video for 'The Air Pro Wi-Fi Podz,' Aug. 18, 2014, 1 page, [Online] [Retrieved Oct. 11, 2016] Can be retrieved from the internet <URL:https://www.youtube.com/watch?v=YpWZ44aCdGA>.

youtube.com, Video for 'The WiFi PODZ Tutorial,' Jun. 15, 2012, 2 pages. [Online] [Retrieved Oct. 11, 2016] Can be retrieved from the internet <URL:https://www.youtube.com/watch ?v=kGGwGobzQBg>.

(56)     References Cited

OTHER PUBLICATIONS

Ulanzi Mount 1 (Ulanzi Mount 1), Ulanzi Falcam GoPro Mount to DJI Action Mount Magnetic Base 3234, https://www.ulanzi.com/products/falcam-gopro-mount-to-dji-action-mount-magnetic-base-3234?currency=USD&variant=43790033617117&utm_medium=cpc &utm_source=google&utm_campaign=Google%20Shopping&stkn= 100b30dffdd7&gad_source=1&gclid= Cj0KCQiAz8GuBhCxARIsAOpzk8yq_enSf9_lu-apX_ iT9dlSxJeBOYwposKpfiMItKxjmpkwSGC32ksaAugHEALw_wcB. Ulanzi Mount 2 (Ulanzi Mount 2), Ulanzi Falcam F22 GoPro Mount to DJI Action Mount Magnetic Base 3235, https://www. ulanzi.com/products/falcam-f22-gopro-mount-to-dji-action-mount-magnetic-base-3235.
You Tube video clip entitled "Customizable GoPro Cage—Go Tough Sharkcage Unboxing Video," uploaded on Dec. 17, 2014 by user "Fotodiox Inc". Retrieved from Internet: <https://www.youtube. com/watch?v=x4lij96EtYA:> (Year: 2014) 1 page.

* cited by examiner

IMAGE CAPTURE APPARATUS INCLUDING A MULTI-FUNCTION INTERCONNECT MECHANISM

TECHNICAL FIELD

The present disclosure relates to an image capture apparatus that includes a multi-function interconnect mechanism, which is configured to facilitate connection of the image capture apparatus to a variety of surfaces and/or accessories, as well as an adapter and a mounting system that are configured for use therewith.

BACKGROUND

Image capture apparatuses are used in a variety of applications, including, for example, handheld cameras and video recorders, cell phones, drones, etc. Often times, an image capture apparatus will include an interconnect mechanism (e.g., a finger assembly, a ball-and-socket interface, etc.) in order to facilitate connection of the image capture apparatus to a variety of surfaces, accessories, products, devices, etc. (e.g., handle assemblies, selfie sticks, tripods, wrist straps, vests, hats, helmets, vehicles, surfboards, bicycles, etc.). Known image capture apparatuses and accessories, however, offer limited compatibility.

In order to allow for more robust options, the present disclosure provides: an image capture apparatus that includes a multi-function interconnect mechanism; an adapter that is configured for use therewith, which allows for connection of the image capture apparatus to a wider variety of surfaces, accessories, products, devices, etc.; and a mounting system that is configured to support the image capture apparatus in a variety of orientations.

SUMMARY

In one aspect of the present disclosure, an image capture apparatus is disclosed that includes a body and an interconnect mechanism that is connected to the body, wherein the interconnect mechanism includes: a base plate; protrusions; and magnetic members.

The base plate includes: a receptacle that is configured to engage an accessory such that the accessory is directly connectable to the image capture apparatus via the interconnect mechanism; locating features that are configured to receive corresponding alignment members on an adapter to facilitate proper registration of the adapter and the interconnect mechanism; and latching features that are configured for engagement with corresponding latch members on the adapter to thereby connect the adapter to the interconnect mechanism.

The protrusions include apertures that extend therethrough and are pivotably connected to the base plate such that the interconnect mechanism is reconfigurable between a collapsed configuration, in which the protrusions are nested within the body, and an extended configuration, in which the protrusions extend outwardly from the body.

The magnetic members are connected to the base plate such that the magnetic members extend into the apertures when the interconnect mechanism is in the collapsed configuration.

In certain embodiments, the base plate may include a magnetic material.

In certain embodiments, the base plate may include grille portions that extend therethrough.

In certain embodiments, the grille portions may be integrally formed in the base plate.

In certain embodiments, the grille portions may be concealed by the protrusions when the interconnect mechanism is in the collapsed configuration and exposed from the protrusions when the interconnect mechanism is in the extended configuration.

In certain embodiments, the receptacle may be configured to threadably engage the accessory.

In certain embodiments, the latching features may include undercuts that define hook members.

In certain embodiments, the hook members may extend laterally inward.

In certain embodiments, the locating features and the receptacle may be generally aligned along a transverse axis of the interconnect mechanism.

In certain embodiments, the magnetic members may be positioned laterally outward of the locating features and the receptacle.

In certain embodiments, the latching features may be positioned laterally outward of the magnetic members.

In another aspect of the present disclosure, an image capture apparatus is disclosed that includes a body and an interconnect mechanism that is connected to the body, wherein the interconnect mechanism includes: a base plate; a first protrusion; a second protrusion; a first magnetic member; and a second magnetic member.

The base plate includes a first grille portion and a second grille portion that extend therethrough.

The first protrusion and the second protrusion are pivotably connected to the base plate such that the interconnect mechanism is reconfigurable between a collapsed configuration, in which the first grille portion and the second grille portion are concealed by the first protrusion and second protrusion, respectively, and an extended configuration, in which the first grille portion and the second grille portion are exposed from the first protrusion and the second protrusion, respectively.

The first magnetic member and the second magnetic member are connected to the base plate such that the first magnetic member and the second magnetic member extend into the first protrusion and the second protrusion, respectively, when the interconnect mechanism is in the collapsed configuration.

In certain embodiments, the base plate may include a magnetic material.

In certain embodiments, the first grille portion and the second grille portion may be integrally formed with the base plate.

In certain embodiments, the first grille portion may extend laterally outward of the first magnetic member, and the second grille portion may extend laterally outward of the second magnetic member.

In certain embodiments, the first grille portion may overlie a speaker, and the second grille portion may overlie an air vent that is configured to facilitate pressure equalization within the image capture apparatus.

In another aspect of the present disclosure, an image capture apparatus is disclosed that includes a body and an interconnect mechanism that is connected to the body, wherein the interconnect mechanism includes a base plate and protrusions that are pivotably connected to the base plate such that the interconnect mechanism is reconfigurable between a collapsed configuration and an extended configuration.

The base plate includes locating features, which are configured to receive corresponding alignment members on an adapter to facilitate proper registration of the adapter and the interconnect mechanism, and latching features, which are configured to receive corresponding latch members on the adapter to thereby connect the adapter to the interconnect mechanism.

In certain embodiments, the locating features may be generally aligned along a transverse axis of the interconnect mechanism.

In certain embodiments, the latching features may include undercuts that define hook members.

In certain embodiments, the hook members may extend laterally inward.

In certain embodiments, the base plate may include strengthening ribs that extend outwardly therefrom and laterally inward from the latching features.

In certain embodiments, the protrusions may include reliefs that are configured to receive the strengthening ribs.

In another aspect of the present disclosure, an adapter is disclosed that is configured for use with an image capture apparatus. The adapter includes: a body; latch members; a cover plate; and magnetic members.

The latch members are repositionable in relation to the body such that the adapter is reconfigurable between an engaged configuration, in which the latch members are positioned for engagement with the image capture apparatus to thereby releasably connect the adapter to the image capture apparatus, and a disengaged configuration, in which the latch members are positioned to permit disconnection of the adapter from the image capture apparatus.

The cover plate is connected to the body and includes alignment members that extend outwardly therefrom. The alignment members are configured to interface with the image capture apparatus to facilitate proper registration of the adapter in relation thereto.

The magnetic members are connected to the cover plate and are configured to provide an interface between the adapter and the image capture apparatus. The magnetic members include outer magnetic members and an inner magnetic member that is positioned between the outer magnetic members.

In certain embodiments, the latch members may be movable in relation to the body along an axis of movement that extends in generally orthogonal relation to the alignment members.

In certain embodiments, the adapter may further include biasing members that engage the latch members.

In certain embodiments, the biasing members may be configured to bias the adapter towards the engaged configuration.

In certain embodiments, the alignment members may include a first alignment member and second alignment members that are positioned outwardly of the first alignment member.

In certain embodiments, the second alignment members may be configured to inhibit relative rotation between the adapter and the image capture apparatus.

In certain embodiments, the first alignment member and the second alignment members may be generally centered on the cover plate along a longitudinal axis of the adapter.

In certain embodiments, the first alignment member and the second alignment members may be generally aligned along a transverse axis of the adapter that extends in generally orthogonal relation to the longitudinal axis.

In certain embodiments, the outer magnetic members may define a first polarity, and the inner magnetic member may define a second polarity that is opposite to the first polarity.

In certain embodiments, the outer magnetic members may each include a first configuration, and the inner magnetic member may include a second configuration that is different than the first configuration.

In certain embodiments, the outer magnetic members and the inner magnetic member may be generally aligned along the longitudinal axis of the adapter.

In another aspect of the present disclosure, an adapter is disclosed that is configured for use with an image capture apparatus. The adapter includes: a body; a cover plate that is connected to the body; and first and second magnetic members that are connected to the body, wherein the first and second magnetic members are configured to interface with the image capture apparatus and include opposite polarities.

In certain embodiments, the first and second magnetic members may include a pair of first magnetic members and a second magnetic member that is positioned between the pair of first magnetic members.

In certain embodiments, the pair of first magnetic members may each include a first configuration, and the second magnetic member may include a second configuration that is different than the first configuration.

In certain embodiments, the first and second magnetic members may be generally aligned along a longitudinal axis of the adapter.

In certain embodiments, the cover plate may include alignment members that extend outwardly therefrom and which are configured to interface with the image capture apparatus to facilitate proper registration of the adapter in relation thereto.

In certain embodiments, the first and second magnetic members may be generally aligned along a first reference axis, and the alignment members may be generally aligned along a second reference axis that extends in generally orthogonal relation to the first reference axis.

In another aspect of the present disclosure, an adapter is disclosed that is configured for use with an image capture apparatus, wherein the adapter includes a body and a cover plate that is connected to the body.

The cover plate includes a first alignment member and second alignment members, each of which extends outwardly from the cover plate and is generally centered on the cover plate along a longitudinal axis of the adapter. The first alignment member and the second alignment members are configured to interface with the image capture apparatus to facilitate proper registration of the adapter and the image capture apparatus.

In certain embodiments, the second alignment members may be positioned outwardly of the first alignment member along a transverse axis of the adapter that extends in generally orthogonal relation to the longitudinal axis.

In certain embodiments, the first alignment member may include a first configuration, and the second alignment members may each include a second configuration that is different than the first configuration.

In certain embodiments, the first alignment member may include a generally annular transverse cross-sectional configuration, and the second alignment members may each include a non-annular transverse cross-sectional configuration.

In certain embodiments, the first alignment member may define a first height, and the second alignment members may each define a second height that is less than the first height.

In another aspect of the present disclosure, a mounting system for an image capture apparatus is disclosed. The mounting system includes an adapter that is configured for connection to the image capture apparatus and a mount that is configured for connection to the adapter such that the adapter and the image capture apparatus are tiltable in relation to the mount about a single axis that extends in generally parallel relation to a longitudinal axis of the adapter.

In certain embodiments, the adapter and the mount may include corresponding mating surfaces that facilitate repositioning of the adapter in relation to the mount.

In certain embodiments, the corresponding mating surfaces may each include an arcuate configuration.

In certain embodiments, the mount may include: an inner body portion; an outer body portion that extends about the inner body portion; and a base that is secured to the outer body portion.

In certain embodiments, the inner body portion may be formed from a rigid material, and the outer body portion may be formed from a flexible material.

In certain embodiments, the base may include an adhesive material in order to secure the mount to an attachment surface.

In certain embodiments, the mounting system may further include a fastener that extends through the adapter and into the mount.

In certain embodiments, the mount may include a channel that is configured to receive the fastener such that the fastener is movable therethrough during tilting of the adapter and the image capture apparatus in relation to the mount.

In certain embodiments, the channel may include a first end defining a first stop that is configured for engagement with the fastener and a second end defining a second stop that is configured for engagement with the fastener, whereby the first stop and the second stop define a range of relative motion between the adapter and the mount.

In certain embodiments, the fastener may include a fastener body, which extends through the adapter and into the channel, and a nut, which is located within the channel and is configured to receive the fastener body.

In certain embodiments, the nut may be captive to the mount.

In another aspect of the present disclosure, a mounting system for an image capture apparatus is disclosed. The mounting system includes: an adapter that is configured for connection to the image capture apparatus; a mount; and a fastener that extends through the adapter and into the mount to thereby connect the adapter to the mount.

The adapter defines a longitudinal axis and includes a body, which defines a first mating surface.

The mount defines a second mating surface that is configured in correspondence with the first mating surface and is positioned in contacting relation therewith, whereby the adapter is tiltable in relation to the mount through an arcuate range of motion to vary an orientation of the image capture apparatus.

In certain embodiments, the mount may include a flexible material to allow the mount to contour to an attachment surface.

In certain embodiments, the mount may define a channel that is configured to receive the fastener such that the fastener is movable through the channel during tilting of the adapter in relation to the mount.

In certain embodiments, the channel may extend in generally orthogonal relation to the longitudinal axis.

In certain embodiments, the channel may define an arc length that corresponds to the arcuate range of motion.

In another aspect of the present disclosure, a method of connecting an image capture apparatus to an attachment surface is disclosed. The method includes: connecting an adapter to a mount such that the adapter is repositionable in relation to the mount via movement through a single plane that extends in generally orthogonal relation to a longitudinal axis of the adapter; repositioning the adapter in relation to the mount; securing the adapter in relation to the mount; and connecting an image capture apparatus to the adapter.

In certain embodiments, repositioning the adapter in relation to the mount may include causing relative movement between corresponding arcuate mating surfaces on the adapter and the mount.

In certain embodiments, securing the adapter in relation to the mount may include adjusting a fastener extending through the adapter and into the mount.

In certain embodiments, adjusting the fastener may include causing compression locking the adapter in a desired orientation.

In certain embodiments, repositioning the adapter in relation to the mount may include moving the fastener through a channel defined by the mount.

BRIEF DESCRIPTION OF THE DRAWINGS

The present disclosure is best understood from the following detailed description when read in conjunction with the accompanying drawings. According to common practice, the various features of the drawings may not be to-scale, and the dimensions of the various features may be arbitrarily expanded or reduced. Additionally, in the interest of clarity, certain components, elements, and/or features may be omitted from certain drawings in the interest of clarity.

DETAILED DESCRIPTION

The present disclosure describes an image capture apparatus that includes a multi-function interconnect mechanism as well as an adapter and a mounting system that are configured for use with the image capture apparatus. The interconnect mechanism, the adapter, and the mounting system allow for more robust connection of the image capture apparatus to a wider variety of surfaces, accessories, products, devices, etc., in a variety of orientations, thereby increasing the versatility of the image capture apparatus.

The interconnect mechanism is connected to a body of the image capture apparatus and includes: a (metallic) base plate; protrusions (e.g., fingers) that are pivotably connected to the base plate and which are configured to facilitate the connection of a (first) accessory to the image capture apparatus (via the interconnect mechanism); and magnetic members that are secured (connected) to the base plate. The base plate includes a (threaded) receptacle that is configured to facilitate the connection of a (second) accessory to the image capture apparatus (via the interconnect mechanism) and latching features that are configured to facilitate the connection of the adapter to the image capture apparatus.

The adapter provides a quick-release mechanism that facilitates connection of the adapter to the image capture apparatus (via the interconnect mechanism). The adapter includes: spring-loaded latch members that are configured to interface with (i.e., connect to) the interconnect mechanism; alignment members that are configured to interface with the image capture apparatus to facilitate proper registration of the adapter in relation thereto; multiple magnetic members, which not only magnetically attract the adapter to the image capture apparatus, but further facilitate proper registration of the adapter in relation thereto; and a connector that is configured to interface with (i.e., connect to) the (first) accessory such that the (first) accessory is indirectly connected to the image capture apparatus via the adapter.

In addition to (an alternate embodiment of) the adapter, the mounting system includes a mount that is configured for connection to the adapter and a fastener that extends through the adapter and into the mount.

The adapter and the mount include corresponding arcuate mating surfaces that facilitate articulation (e.g., tilting) of the adapter in relation to the mount. Upon reaching a desired orientation, the fastener can be adjusted (i.e., tightened) in order to fix the position of the adapter and, thus, the image capture apparatus, upon connection to the mounting system.

Figure 1A:
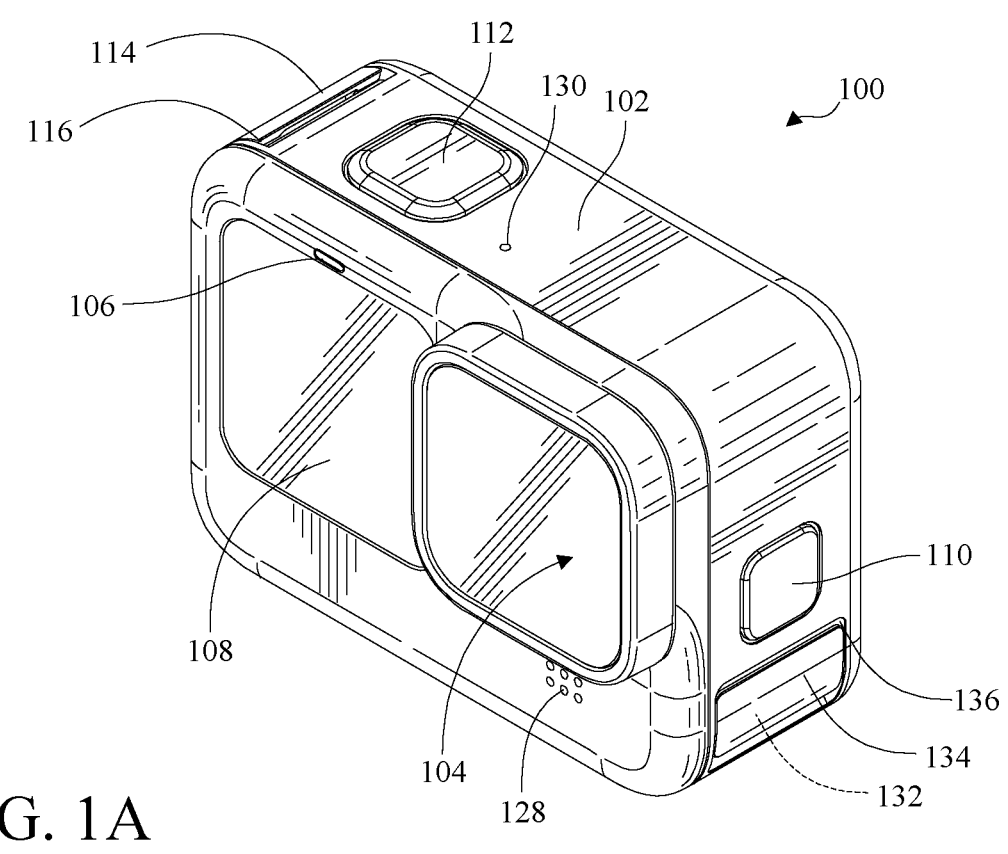
FIGS. 1A-B are isometric views of an example of an image capture apparatus.
Figure 1B:
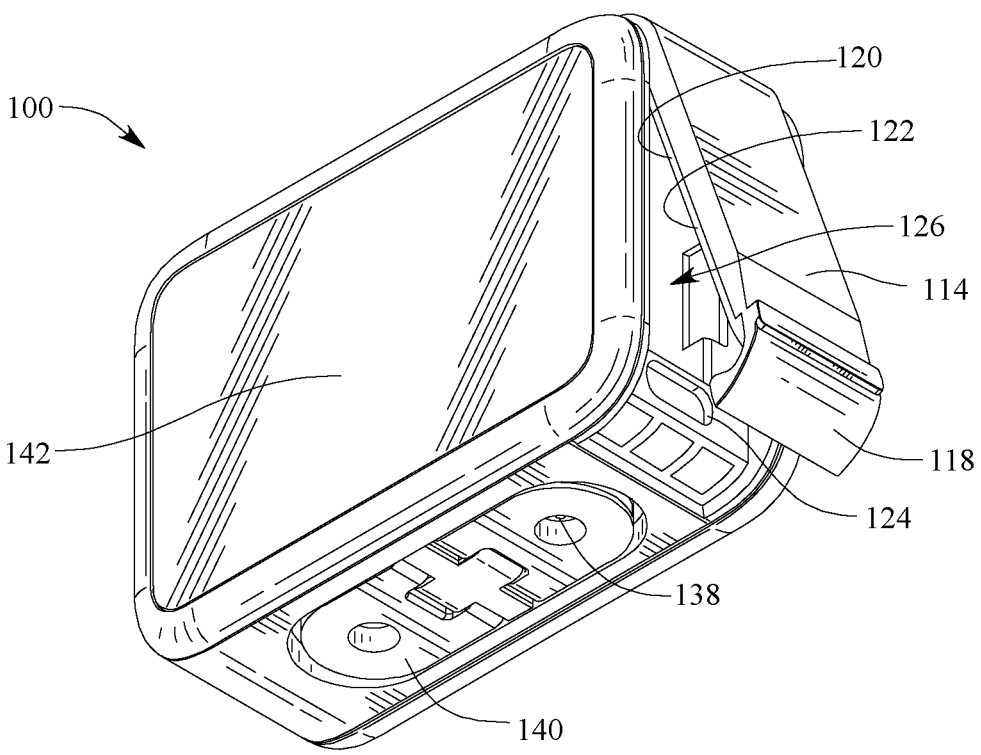

FIGS. 1A-B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 138, an interconnect mechanism 140, and a display 142. Although not expressly shown in FIGS. 1A-B, the image capture apparatus 100 includes internal electronics, such as imaging electronics, power electronics, and the like, internal to the body 102 for capturing images and performing other functions of the image capture apparatus 100. The arrangement of the components of the image capture apparatus 100 shown in FIGS. 1A-B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used. The image capture device 104 is structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. In some implementations, the display 108 may be omitted or combined with another component of the image capture apparatus 100.

As shown in FIG. 1A, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1A, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. The shutter button 112 may be another type of input device, such as a switch, a toggle, a slider, or a dial. The image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1B, the image capture apparatus 100 includes the door 114 coupled to the body 102, such as using the hinge mechanism 116 (FIG. 1A). The door 114 may be connected (secured) to the body 102 using the latch mechanism 118 that releasably engages (contacts) the body 102 at a position generally opposite the hinge mechanism 116. The door 114 includes the seal 120 and the battery interface 122. Although one door 114 is shown in FIG. 1A, the image capture apparatus 100 may include multiple doors respectively forming respective surfaces of the body 102, or portions thereof. The door 114 may be removable from the body 102 by releasing the latch mechanism 118 from the body 102 and decoupling the hinge mechanism 116 from the body 102.

In FIG. 1B, the door 114 is shown in a partially open position such that the data interface 124 is accessible for communicating with external devices and the battery receptacle 126 is accessible for placement or replacement of a battery. In FIG. 1A, the door 114 is shown in a closed position. In implementations in which the door 114 is in the closed position, the seal 120 engages (contacts) a flange (not shown) to provide an environmental seal and the battery interface 122 engages (contacts) the battery (not shown) to secure the battery in the battery receptacle 126.

As shown in FIG. 1B, the image capture apparatus 100 includes the battery receptacle 126 structured to form a portion of an interior surface of the body 102. The battery receptacle 126 includes operative connections for power transfer between the battery and the image capture apparatus 100. In some implementations, the battery receptable 126 may be omitted. The image capture apparatus 100 may include multiple battery receptacles.

As shown in FIG. 1A, the image capture apparatus 100 includes a first microphone 128 structured on a front surface of the body 102, a second microphone 130 structured on a top surface of the body 102, and a third microphone 132 structured on a side surface of the body 102. The third microphone 132, which may be referred to as a drain microphone and is indicated as hidden in dotted line, is positioned (located) behind a drain cover 134, surrounded by a drain channel 136, and can drain liquid from audio components of the image capture apparatus 100. The image capture apparatus 100 may include other microphones on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 138 structured on a bottom surface of the body 102. The speaker 138 outputs or presents audio, such as by playing back recorded audio or emitting sounds associated with notifications. The image capture apparatus 100 may include multiple speakers structured on respective surfaces of the body 102.

As shown in FIG. 1B, the image capture apparatus 100 includes the interconnect mechanism 140 structured on a bottom surface of the body 102. The interconnect mechanism 140 removably connects (secures) the image capture apparatus 100 to an external structure, such as a handle grip, another mount, or a securing device. The interconnect mechanism 140 includes folding protrusions configured to move between a collapsed (nested) configuration as shown in FIG. 1B and an extended (open) configuration. The folding protrusions of the interconnect mechanism 140 in the extended configuration may be coupled to reciprocal protrusions of other devices such as handle grips, mounts, clips, or like devices. The image capture apparatus 100 may include multiple interconnect mechanisms structured on, or forming a portion of, respective surfaces of the body 102. In some implementations, the interconnect mechanism 140 may be omitted.

As shown in FIG. 1B, the image capture apparatus 100 includes the display 142 structured on, and forming a portion of, a rear surface of the body 102. The display 142 outputs, such as presents or displays, such as by emitting visible light, data, such as to show image information such as image previews, live video capture, or status information such as battery life, camera mode, elapsed time, and the like. In some implementations, the display 142 may be an interactive display, which may receive, detect, or capture input, such as user input representing user interaction with the image capture apparatus 100. The image capture apparatus 100 may include multiple displays structured on respective surfaces of the body 102, such as the displays 108, 142 shown in FIGS. 1A-1B. In some implementations, the display 142 may be omitted or combined with another component of the image capture apparatus 100.

The image capture apparatus 100 may include features or components other than those described herein, such as other buttons or interface features. In some implementations, interchangeable lenses, cold shoes, and hot shoes, or a combination thereof, may be coupled to or combined with the image capture apparatus 100. For example, the image capture apparatus 100 may communicate with an external device, such as an external user interface device, via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link.

The external device may store, process, display, or combination thereof, the images. The external user interface device may be a computing device, such as a smartphone, a tablet computer, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 2A:
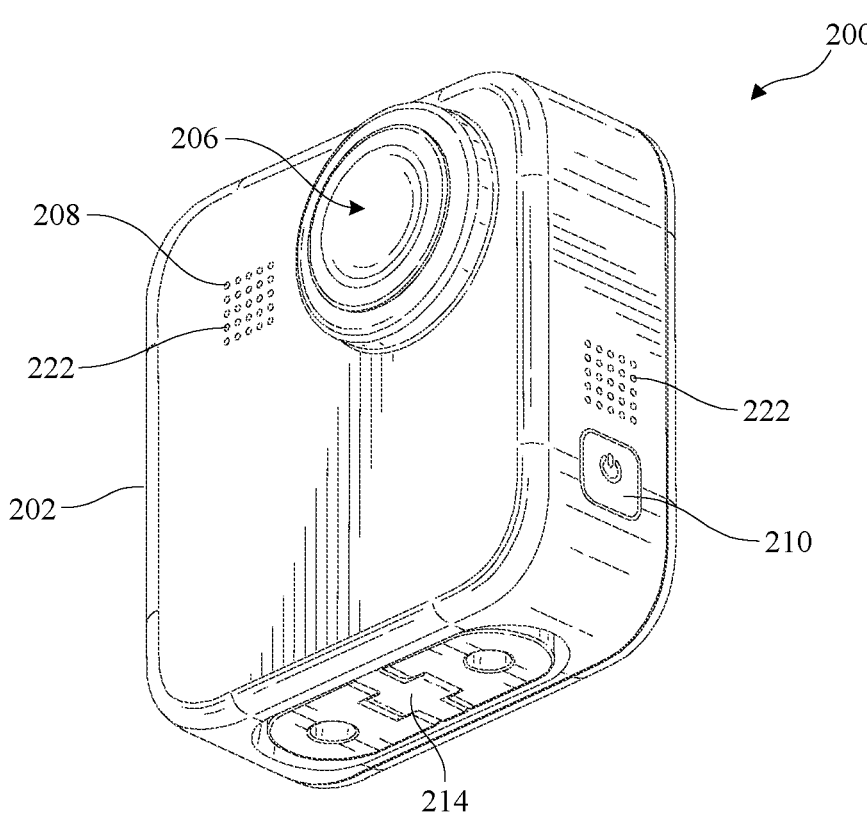
FIGS. 2A-B are isometric views of another example of an image capture apparatus.
Figure 2B:
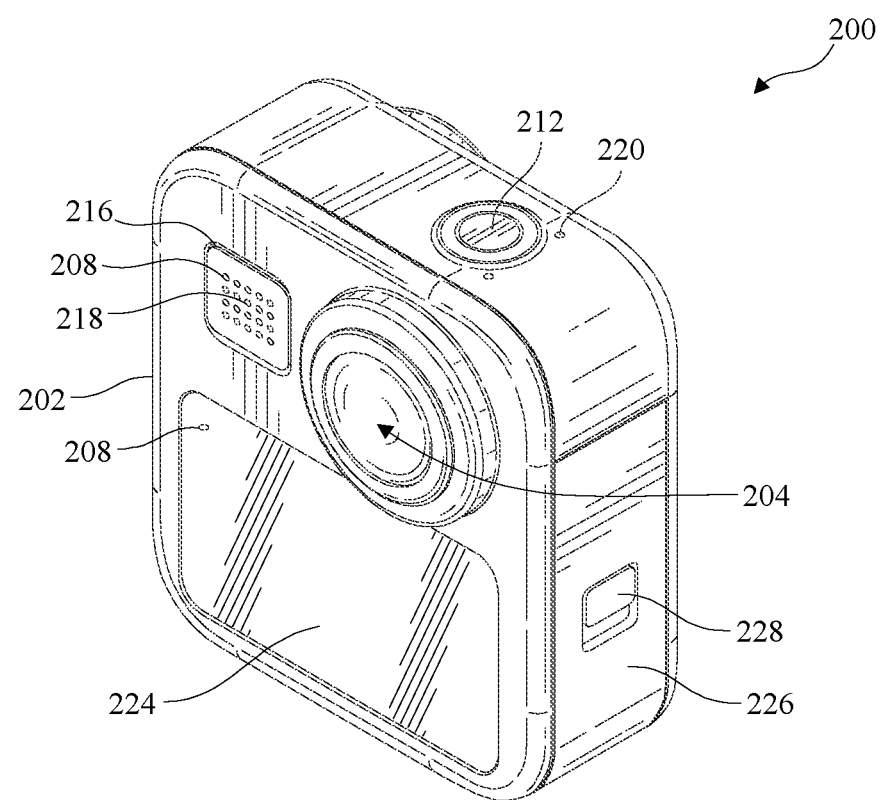

FIGS. 2A-2B illustrate another example of an image capture apparatus 200. The image capture apparatus 200 is similar to the image capture apparatus 100 shown in FIGS. 1A-1B. The image capture apparatus 200 includes a body 202, a first image capture device 204, a second image capture device 206, indicators 208, a mode button 210, a shutter button 212, an interconnect mechanism 214, a drainage channel 216, audio components 218, 220, 222, a display 224, and a door 226 including a release mechanism 228. The arrangement of the components of the image capture apparatus 200 shown in FIGS. 2A-2B is an example, other arrangements of elements may be used.

The body 202 of the image capture apparatus 200 may be similar to the body 102 shown in FIGS. 1A-1B. The first image capture device 204 is structured on a front surface of the body 202. The first image capture device 204 includes a first lens. The first image capture device 204 may be similar to the image capture device 104 shown in FIG. 1A. As shown in FIG. 2A, the image capture apparatus 200 includes the second image capture device 206 structured on a rear surface of the body 202. The second image capture device 206 includes a second lens. The second image capture device 206 may be similar to the image capture device 104 shown in FIG. 1A. The image capture devices 204, 206 are disposed on opposite surfaces of the body 202, for example, in a back-to-back configuration, Janus configuration, or offset Janus configuration. The image capture apparatus 200 may include other image capture devices structured on respective surfaces of the body 202.

As shown in FIG. 2B, the image capture apparatus 200 includes the indicators 208 associated with the audio component 218 and the display 224 on the front surface of the body 202. The indicators 208 may be similar to the indicator 106 shown in FIG. 1A. For example, one of the indicators 208 may indicate a status of the first image capture device 204 and another one of the indicators 208 may indicate a status of the second image capture device 206. Although two indicators 208 are shown in FIGS. 2A-2B, the image capture apparatus 200 may include other indictors structured on respective surfaces of the body 202.

As shown in FIGS. 2A-B, the image capture apparatus 200 includes input mechanisms including the mode button 210, structured on a side surface of the body 202, and the shutter button 212, structured on a top surface of the body 202. The mode button 210 may be similar to the mode button 110 shown in FIG. 1B. The shutter button 212 may be similar to the shutter button 112 shown in FIG. 1A.

Figure 4:
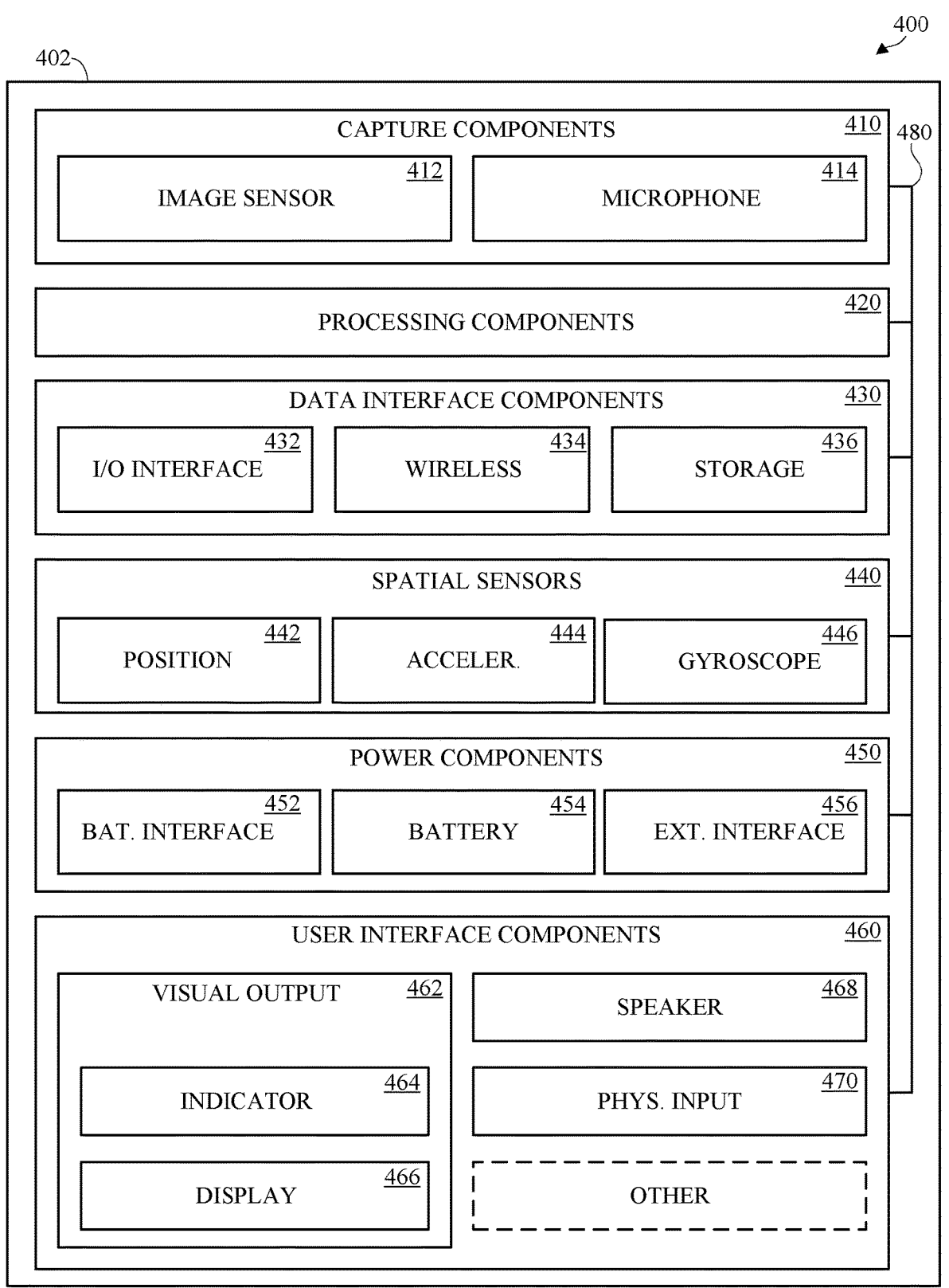
FIG. 4 is a block diagram of electronic components of an image capture apparatus.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 4.

As shown in FIGS. 2A-2B, the image capture apparatus 200 includes the interconnect mechanism 214 structured on a bottom surface of the body 202. The interconnect mechanism 214 may be similar to the interconnect mechanism 140 shown in FIG. 1B.

As shown in FIG. 2B, the image capture apparatus 200 includes the drainage channel 216 for draining liquid from audio components of the image capture apparatus 200.

As shown in FIGS. 2A-2B, the image capture apparatus 200 includes the audio components 218, 220, 222, respectively structured on respective surfaces of the body 202. The audio components 218, 220, 222 may be similar to the microphones 128, 130, 132 and the speaker 138 shown in FIGS. 1A-1B. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts.

As shown in FIGS. 2A-2B, a first audio component 218 is positioned (located) on a front surface of the body 202, a second audio component 220 is positioned (located) on a top surface of the body 202, and a third audio component 222 is positioned (located) on a back surface of the body 202. Other numbers and configurations for the audio components 218, 220, 222 may be used. For example, the audio component 218 may be a drain microphone surrounded by the drainage channel 216 and adjacent to one of the indicators 208 as shown in FIG. 2B.

As shown in FIG. 2B, the image capture apparatus 200 includes the display 224 structured on a front surface of the body 202. The display 224 may be similar to the displays 108, 142 shown in FIGS. 1A-1B. The display 224 may include an I/O interface. The display 224 may include one or more of the indicators 208. The display 224 may receive touch inputs. The display 224 may display image information during video capture. The display 224 may provide status information to a user, such as status information indicating battery power level, memory card capacity, time elapsed for a recorded video, etc. The image capture apparatus 200 may include multiple displays structured on respective surfaces of the body 202. In some implementations, the display 224 may be omitted or combined with another component of the image capture apparatus 200.

As shown in FIG. 2B, the image capture apparatus 200 includes the door 226 structured on, or forming a portion of, the side surface of the body 202. The door 226 may be similar to the door 114 shown in FIG. 1A. For example, the door 226 shown in FIG. 2A includes a release mechanism 228. The release mechanism 228 may include a latch, a button, or other mechanism configured to receive a user input that allows the door 226 to change position. The release mechanism 228 may be used to open the door 226 for a user to access a battery, a battery receptacle, an I/O interface, a memory card interface, etc.

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable lenses, cold shoes, or hot shoes.

Figure 3:
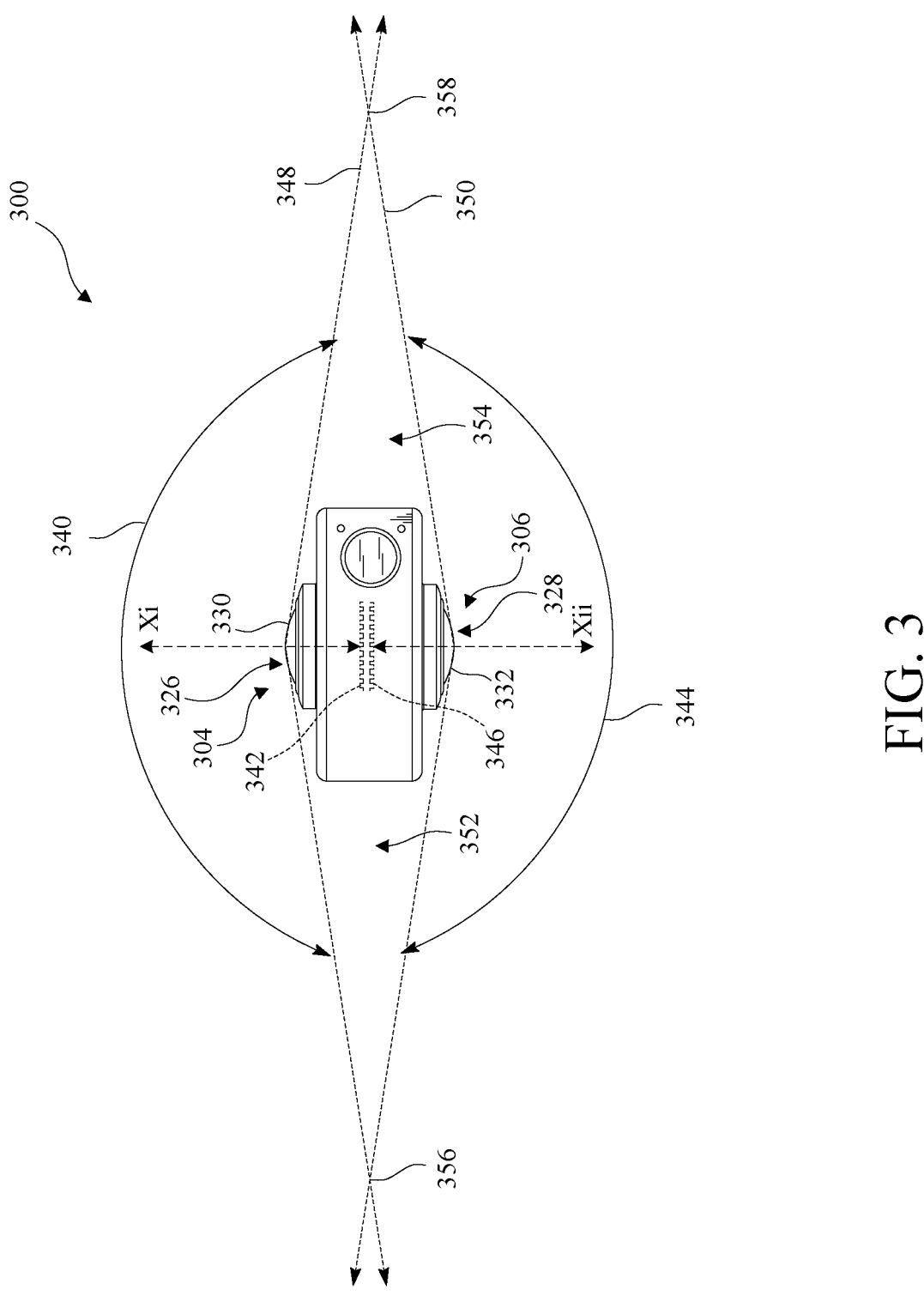
FIG. 3 is a top view of another example of an image capture apparatus.

FIG. 3 is a top view of an image capture apparatus 300. The image capture apparatus 300 is similar to the image capture apparatus 200 of FIGS. 2A-2B and is configured to capture spherical images.

As shown in FIG. 3, a first image capture device 304 includes a first lens 330 and a second image capture device 306 includes a second lens 332. For example, the first image capture device 304 may capture a first image, such as a first hemispheric, or hyper-hemispherical, image, the second image capture device 306 may capture a second image, such as a second hemispheric, or hyper-hemispherical, image, and the image capture apparatus 300 may generate a spherical image incorporating or combining the first image and the second image, which may be captured concurrently, or substantially concurrently.

The first image capture device 304 defines a first field-of-view 340 wherein the first lens 330 of the first image capture device 304 receives light. The first lens 330 directs the received light corresponding to the first field-of-view 340 onto a first image sensor 342 of the first image capture device 304. For example, the first image capture device 304 may include a first lens barrel (not expressly shown), extending from the first lens 330 to the first image sensor 342. In the illustrated embodiment, the first lens 330 and the first image sensor 342 are integrated into a single unit, whereby the first image capture device 304 is configured as a first ISLA 326 that defines a first optical axis Xi.

The second image capture device 306 defines a second field-of-view 344 wherein the second lens 332 receives light. The second lens 332 directs the received light corresponding to the second field-of-view 344 onto a second image sensor 346 of the second image capture device 306. For example, the second image capture device 306 may include a second lens barrel (not expressly shown), extending from the second lens 332 to the second image sensor 346. In the illustrated embodiment, the second lens 332 and the second image sensor 346 are integrated into a single unit, whereby the second image capture device 306 is configured as a second ISLA 328 that defines a second optical axis Xii.

A boundary 348 of the first field-of-view 340 is shown using broken directional lines. A boundary 350 of the second field-of-view 344 is shown using broken directional lines. As shown, the image capture devices 304, 306 are arranged in a back-to-back (Janus) configuration such that the lenses 330, 332 face in opposite directions (e.g., a forward direction and a rearward direction), and such that the image capture apparatus 300 may capture spherical images. The first image sensor 342 captures a first hyper-hemispherical image plane from light entering the first lens 330. The second image sensor 346 captures a second hyper-hemispherical image plane from light entering the second lens 332.

As shown in FIG. 3, the fields-of-view 340, 344 partially overlap such that the combination of the fields-of-view 340, 344 forms a spherical field-of-view, except that one or more uncaptured areas 352, 354 may be outside of the fields-of-view 340, 344 of the lenses 330, 332. Light emanating from or passing through the uncaptured areas 352, 354, which may be proximal to the image capture apparatus 300, may be obscured from the lenses 330, 332 and the corresponding image sensors 342, 346, such that content corresponding to the uncaptured areas 352, 354 may be omitted from images captured by the image capture apparatus 300. In some implementations, the image capture devices 304, 306, or the lenses 330, 332 thereof, may be configured to minimize the uncaptured areas 352, 354.

Examples of points of transition, or overlap points, from the uncaptured areas 352, 354 to the overlapping portions of the fields-of-view 340, 344 are shown at 356, 358.

Images contemporaneously captured by the respective image sensors 342, 346 may be combined to form a combined image, such as a spherical image. Generating a combined image may include correlating the overlapping regions captured by the respective image sensors 342, 346, aligning the captured fields-of-view 340, 344, and stitching the images together to form a cohesive combined image. Stitching the images together may include correlating the overlap points 356, 358 with respective locations in corresponding images captured by the image sensors 342, 346. Although a planar view of the fields-of-view 340, 344 is shown in FIG. 3, the fields-of-view 340, 344 are hyper-hemispherical.

A change in the alignment, such as position, tilt, or a combination thereof, of the image capture devices 304, 306, such as of the lenses 330, 332, the image sensors 342, 346, or both, may change the relative positions of the respective fields-of-view 340, 344, may change the locations of the overlap points 356, 358, such as with respect to images captured by the image sensors 342, 346, and may change the uncaptured areas 352, 354, which may include changing the uncaptured areas 352, 354 unequally.

Incomplete or inaccurate information indicating the alignment of the image capture devices 304, 306, such as the locations of the overlap points 356, 358, may decrease the accuracy, efficiency, or both of generating a combined image. In some implementations, the image capture apparatus 300 may maintain information indicating the location and orientation of the image capture devices 304, 306, such as of the lenses 330, 332, the image sensors 342, 346, or both, such that the fields-of-view 340, 344, the overlap points 356, 358, or both may be accurately determined, which may improve the accuracy, efficiency, or both of generating a combined image.

The ISLAs 326, 328 (e.g., the lenses 330, 332) may be aligned as shown (e.g., such that the optical axes Xi, Xii are coincident with each other), laterally offset from each other (not shown), off-center from a central axis of the image capture apparatus 300 (not shown), or laterally offset and off-center from the central axis (not shown). Whether through use of offset or through use of compact image capture devices 304, 306, a reduction in distance between the lenses 330, 332 may improve the overlap in the fields-of-view 340, 344, such as by reducing the uncaptured areas 352, 354.

Images or frames captured by the image capture devices 304, 306 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 356, 358, may be matched accurately to minimize boundary discontinuities.

FIG. 4 is a block diagram of electronic components in an image capture apparatus 400. The image capture apparatus 400 may be a single-lens image capture device, a multi-lens image capture device, or variations thereof, including an image capture apparatus with multiple capabilities such as the use of interchangeable integrated sensor lens assemblies. Components, such as electronic components, of the image capture apparatus 100 shown in FIGS. 1A-B, the image capture apparatus 200 shown in FIGS. 2A-B, or the image capture apparatus 300 shown in FIG. 3, may be implemented as shown in FIG. 4.

The image capture apparatus 400 includes a body 402. The body 402 may be similar to the body 102 shown in FIGS. 1A-1B or the body 202 shown in FIGS. 2A-2B. The body 402 includes electronic components such as capture components 410, processing components 420, data interface components 430, spatial sensors 440, power components 450, user interface components 460, and a bus 480.

The capture components 410 include an image sensor 412 for capturing images. Although one image sensor 412 is shown in FIG. 4, the capture components 410 may include multiple image sensors. The image sensor 412 may be similar to the image sensors 342, 346 shown in FIG. 3. The image sensor 412 may be, for example, a charge-coupled device (CCD) sensor, an active pixel sensor (APS), a complementary metal-oxide-semiconductor (CMOS) sensor, or an N-type metal-oxide-semiconductor (NMOS) sensor. The image sensor 412 detects light, such as within a defined spectrum, such as the visible light spectrum or the infrared spectrum, incident through a corresponding lens such as the first lens 330 with respect to the first image sensor 342 or the second lens 332 with respect to the second image sensor 346 as shown in FIG. 3. The image sensor 412 captures detected light as image data and conveys the captured image data as electrical signals (image signals or image data) to the other components of the image capture apparatus 400, such as to the processing components 420, such as via the bus 480.

The capture components 410 include a microphone 414 for capturing audio. Although one microphone 414 is shown in FIG. 4, the capture components 410 may include multiple microphones. The microphone 414 detects and captures, or records, sound, such as sound waves incident upon the microphone 414. The microphone 414 may detect, capture, or record sound in conjunction with capturing images by the image sensor 412. The microphone 414 may detect sound to receive audible commands to control the image capture apparatus 400. The microphone 414 may be similar to the microphones 128, 130, 132 shown in FIGS. 1A-1B or the audio components 218, 220, 222 shown in FIGS. 2A-2B.

The processing components 420 perform image signal processing, such as filtering, tone mapping, or stitching, to generate, or obtain, processed images, or processed image data, based on image data obtained from the image sensor 412. The processing components 420 may include one or more processors having single or multiple processing cores. In some implementations, the processing components 420 may include, or may be, an application specific integrated circuit (ASIC) or a digital signal processor (DSP). For example, the processing components 420 may include a custom image signal processor. The processing components 420 conveys data, such as processed image data, with other components of the image capture apparatus 400 via the bus 480. In some implementations, the processing components 420 may include an encoder, such as an image or video encoder that may encode, decode, or both, the image data, such as for compression coding, transcoding, or a combination thereof.

Although not shown expressly in FIG. 4, the processing components 420 may include memory, such as a random-access memory (RAM) device, which may be non-transitory computer-readable memory. The memory of the processing components 420 may include executable instructions and data that can be accessed by the processing components 420.

The data interface components 430 communicates with other, such as external, electronic devices, such as a remote control, a smartphone, a tablet computer, a laptop computer, a desktop computer, or an external computer storage device. For example, the data interface components 430 may receive commands to operate the image capture apparatus 400. In another example, the data interface components 430 may transmit image data to transfer the image data to other electronic devices. The data interface components 430 may be configured for wired communication, wireless communication, or both. As shown, the data interface components 430 include an I/O interface 432, a wireless data interface 434, and a storage interface 436. In some implementations, one or more of the I/O interface 432, the wireless data interface 434, or the storage interface 436 may be omitted or combined.

The I/O interface 432 may send, receive, or both, wired electronic communications signals. For example, the I/O interface 432 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 432 is shown in FIG. 4, the data interface components 430 include multiple I/O interfaces. The I/O interface 432 may be similar to the data interface 124 shown in FIG. 1B.

The wireless data interface 434 may send, receive, or both, wireless electronic communications signals. The wireless data interface 434 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 434 is shown in FIG. 4, the data interface components 430 include multiple wireless data interfaces. The wireless data interface 434 may be similar to the data interface 124 shown in FIG. 1B.

The storage interface 436 may include a memory card connector, such as a memory card receptacle, configured to receive and operatively couple to a removable storage device, such as a memory card, and to transfer, such as read, write, or both, data between the image capture apparatus 400 and the memory card, such as for storing images, recorded audio, or both captured by the image capture apparatus 400 on the memory card. Although one storage interface 436 is shown in FIG. 4, the data interface components 430 include multiple storage interfaces. The storage interface 436 may be similar to the data interface 124 shown in FIG. 1B.

The spatial, or spatiotemporal, sensors 440 detect the spatial position, movement, or both, of the image capture apparatus 400. As shown in FIG. 4, the spatial sensors 440 include a position sensor 442, an accelerometer 444, and a gyroscope 446. The position sensor 442, which may be a global positioning system (GPS) sensor, may determine a geospatial position of the image capture apparatus 400, which may include obtaining, such as by receiving, temporal data, such as via a GPS signal. The accelerometer 444, which may be a three-axis accelerometer, may measure linear motion, linear acceleration, or both of the image capture apparatus 400. The gyroscope 446, which may be a three-axis gyroscope, may measure rotational motion, such as a rate of rotation, of the image capture apparatus 400. In some implementations, the spatial sensors 440 may include other types of spatial sensors. In some implementations, one or more of the position sensor 442, the accelerometer 444, and the gyroscope 446 may be omitted or combined.

The power components 450 distribute electrical power to the components of the image capture apparatus 400 for operating the image capture apparatus 400. As shown in FIG. 4, the power components 450 include a battery interface 452, a battery 454, and an external power interface 456 (ext. interface). The battery interface 452 (bat. interface) operatively couples to the battery 454, such as via conductive contacts to transfer power from the battery 454 to the other electronic components of the image capture apparatus 400. The battery interface 452 may be similar to the battery receptacle 126 shown in FIG. 1B. The external power interface 456 obtains or receives power from an external source, such as a wall plug or external battery, and distributes the power to the components of the image capture apparatus 400, which may include distributing power to the battery 454 via the battery interface 452 to charge the battery 454. Although one battery interface 452, one battery 454, and one external power interface 456 are shown in FIG. 4, any number of battery interfaces, batteries, and external power interfaces may be used. In some implementations, one or more of the battery interface 452, the battery 454, and the external power interface 456 may be omitted or combined. For example, in some implementations, the external interface 456 and the I/O interface 432 may be combined.

The user interface components 460 receive input, such as user input, from a user of the image capture apparatus 400, output, such as display or present, information to a user, or both receive input and output information, such as in accordance with user interaction with the image capture apparatus 400.

As shown in FIG. 4, the user interface components 460 include visual output components 462 to visually communicate information, such as to present captured images. As shown, the visual output components 462 include an indicator 464 and a display 466. The indicator 464 may be similar to the indicator 106 shown in FIG. 1A or the indicators 208 shown in FIGS. 2A-2B. The display 466 may be similar to the display 108 shown in FIG. 1A, the display 142 shown in FIG. 1B, or the display 224 shown in FIG. 2B. Although the visual output components 462 are shown in FIG. 4 as including one indicator 464, the visual output components 462 may include multiple indicators. Although the visual output components 462 are shown in FIG. 4 as including one display 466, the visual output components 462 may include multiple displays. In some implementations, one or more of the indicators 464 or the display 466 may be omitted or combined.

As shown in FIG. 4, the user interface components 460 include a speaker 468. The speaker 468 may be similar to the speaker 138 shown in FIG. 1B or the audio components 218, 220, 222 shown in FIGS. 2A-2B. Although one speaker 468 is shown in FIG. 4, the user interface components 460 may include multiple speakers. In some implementations, the speaker 468 may be omitted or combined with another component of the image capture apparatus 400, such as the microphone 414.

As shown in FIG. 4, the user interface components 460 include a physical input interface 470. The physical input interface 470 may be similar to the mode buttons 110, 210 shown in FIGS. 1A, 2A or the shutter buttons 112, 212 shown in FIGS. 1A, 2B. Although one physical input interface 470 is shown in FIG. 4, the user interface components 460 may include multiple physical input interfaces. In some implementations, the physical input interface 470 may be omitted or combined with another component of the image capture apparatus 400. The physical input interface 470 may be, for example, a button, a toggle, a switch, a dial, or a slider.

As shown in FIG. 4, the user interface components 460 include a broken line border box labeled "other" to indicate that components of the image capture apparatus 400 other than the components expressly shown as included in the user interface components 460 may be user interface components. For example, the microphone 414 may receive, or capture, and process audio signals to obtain input data, such as user input data corresponding to voice commands. In another example, the image sensor 412 may receive, or capture, and process image data to obtain input data, such as user input data corresponding to visible gesture commands. In another example, one or more of the spatial sensors 440, such as a combination of the accelerometer 444 and the gyroscope 446, may receive, or capture, and process motion data to obtain input data, such as user input data corresponding to motion gesture commands.

Figure 5:
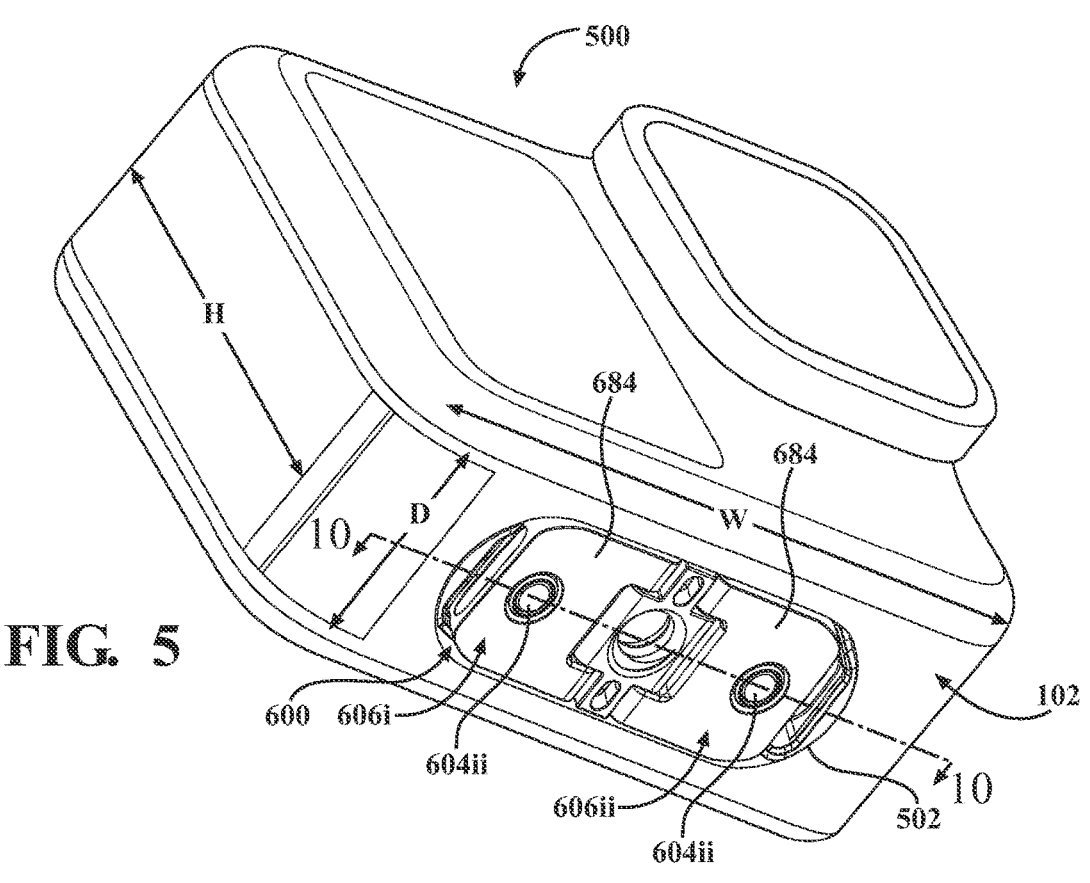
FIG. 5 is a bottom, perspective view of another example of an image capture apparatus, which includes an interconnect mechanism according to the principles of the present disclosure.
Figure 6:
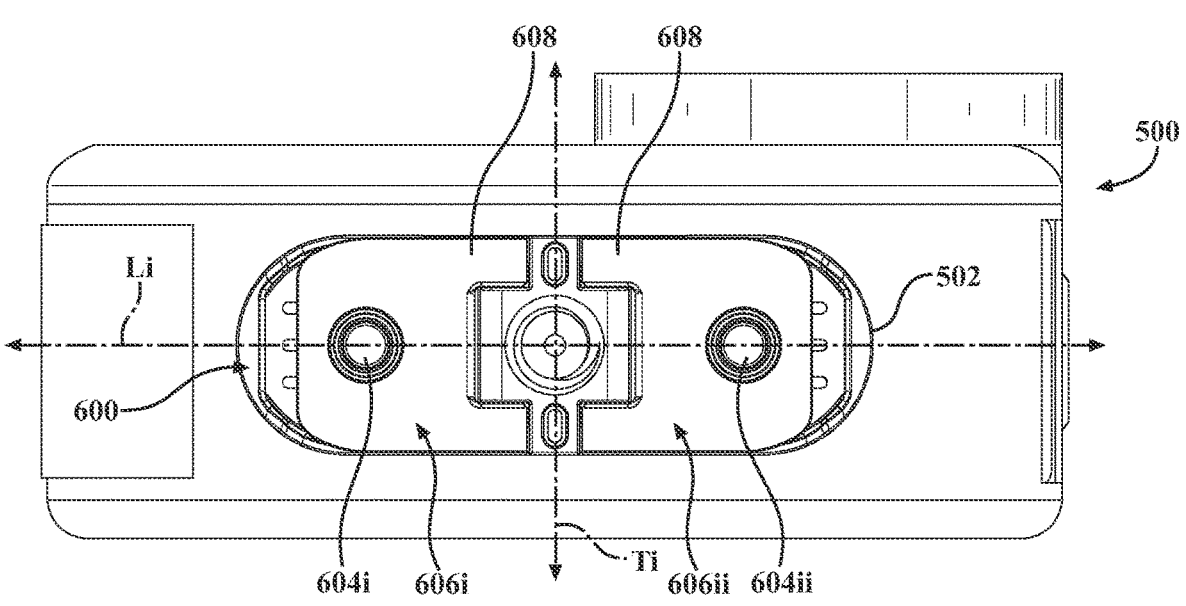
FIG. 6 is a bottom, plan view of the image capture apparatus seen in FIG. 5 with the interconnect mechanism shown in a collapsed configuration.
Figure 7:
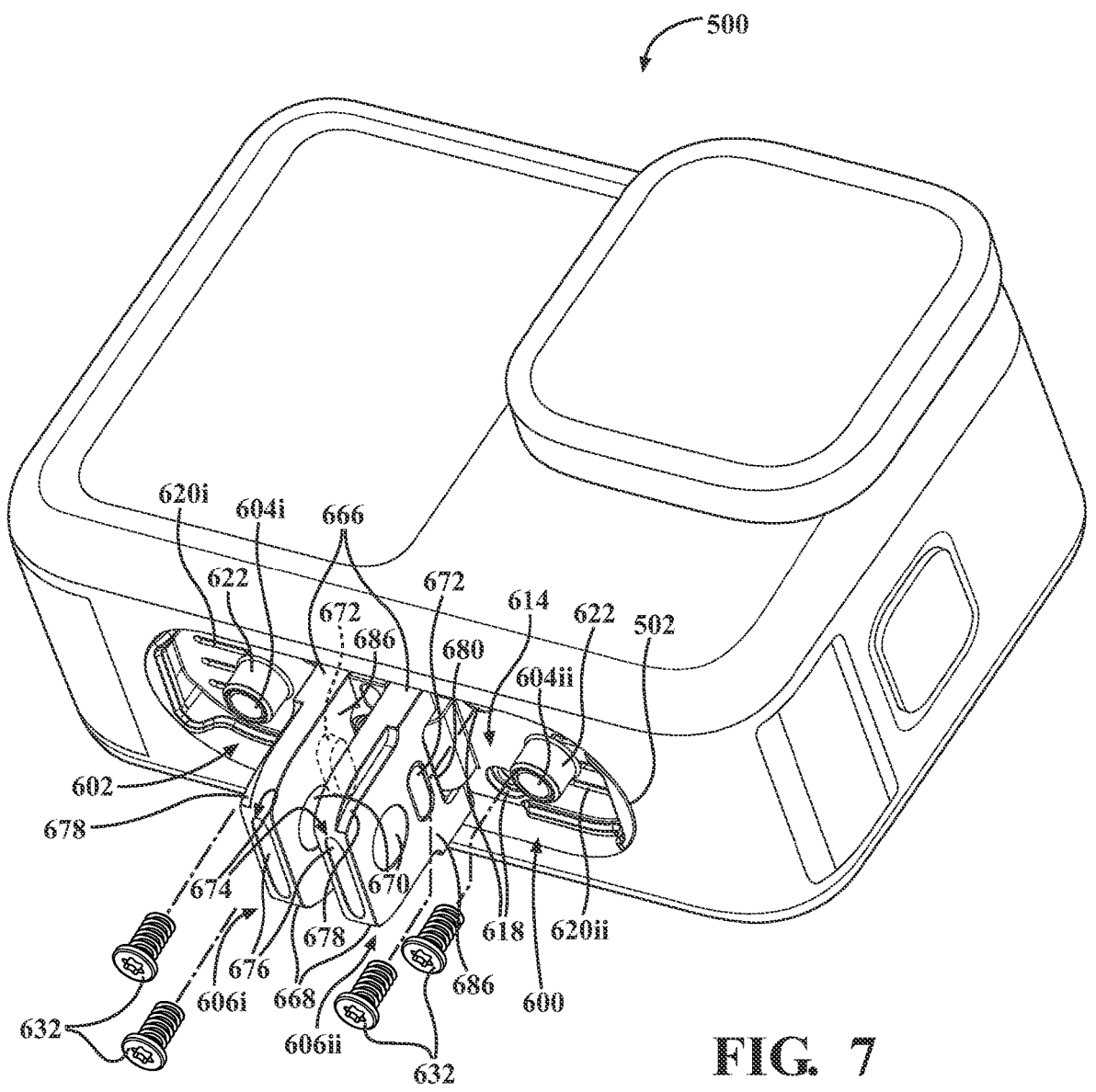
FIG. 7 is a front, perspective view of the image capture apparatus seen in FIG. 5 with the interconnect mechanism shown in an extended configuration.
Figure 8:
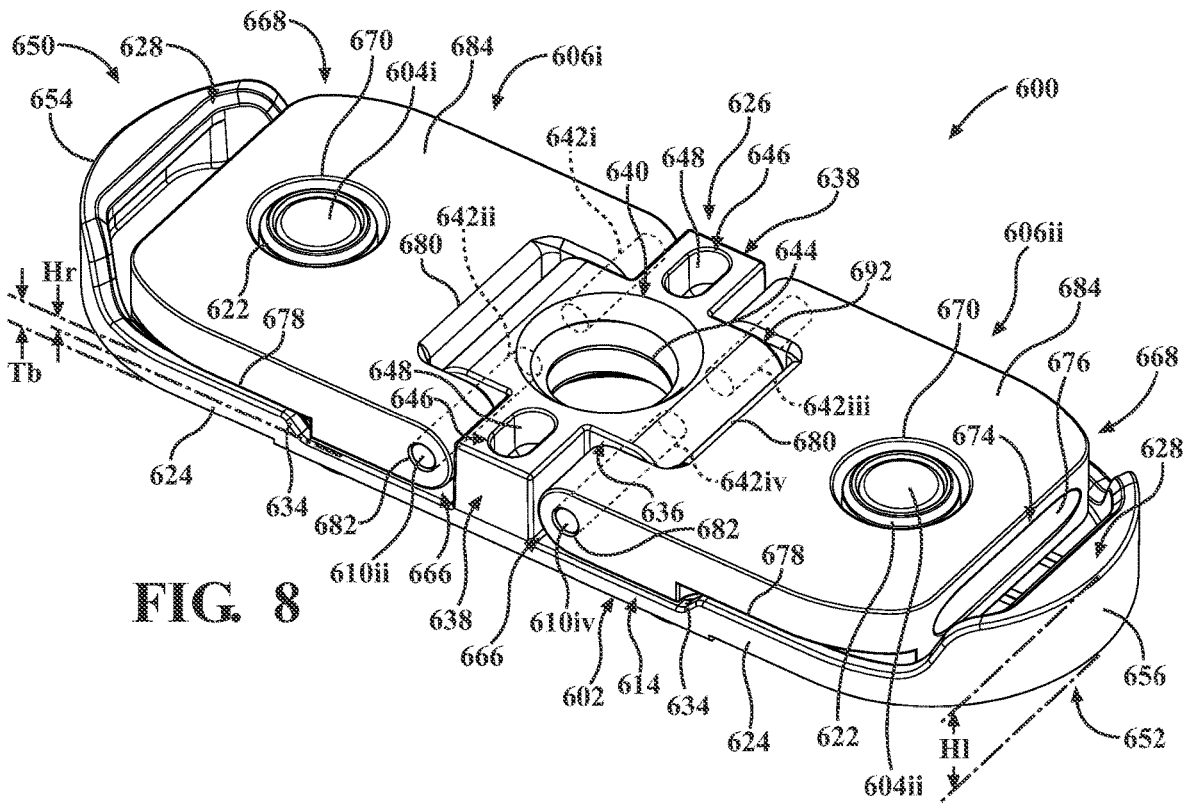
FIG. 8 is a bottom, perspective view of the interconnect mechanism.
Figure 9:
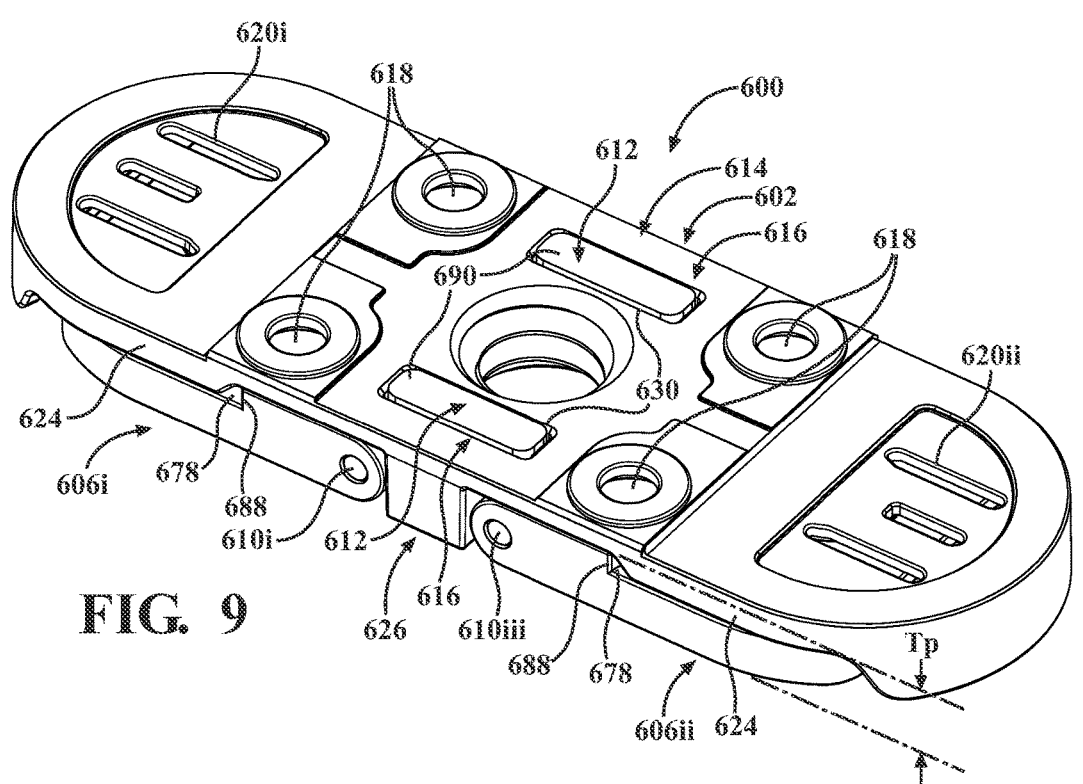
FIG. 9 is a top, perspective view of the interconnect mechanism.
Figure 10:
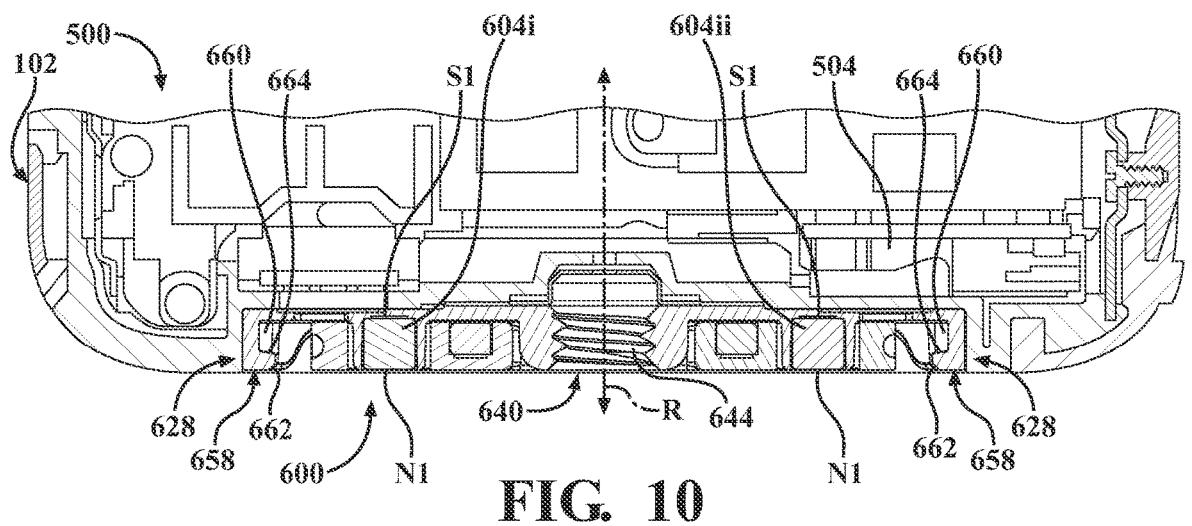
FIG. 10 is a partial, cross-sectional view of the image capture apparatus taken along line 10-10 in FIG. 5.

With reference now to FIGS. 5-10, an image capture apparatus 500 is illustrated that includes a multi-function interconnect mechanism 600. More specifically, FIG. 5 is a bottom, perspective view of the image capture apparatus 500; FIG. 6 is a bottom, plan view of the image capture apparatus 500 illustrating the interconnect mechanism 600 in a collapsed configuration; FIG. 7 is a front, perspective view of the image capture apparatus 500 illustrating the interconnect mechanism 600 in an extended configuration; FIG. 8 is a bottom, perspective view of the interconnect mechanism 600; FIG. 9 is a top, perspective view of the interconnect mechanism 600; and FIG. 10 is a partial, cross-sectional view of the image capture apparatus 500 taken along line 10-10 in FIG. 5.

The image capture apparatus 500 and the interconnect mechanism 600 include features that are similar to the image capture apparatus 100 (FIGS. 1A, 1B) and the interconnect mechanisms 140 discussed above and, accordingly, will only be discussed with respect to differences therefrom in the interest of brevity. As such, identical reference characters will be utilized to refer to elements, structures, features, etc., common to the image capture apparatuses 100, 500 and the interconnect mechanisms 140, 600. Although illustrated in connection with the image capture apparatus 500, it is envisioned that the interconnect mechanism 600 may be configured for use with a wide variety of image capture apparatuses including, for example, the image capture apparatus 200 (FIGS. 2A, 2B), the image capture apparatus 300 (FIG. 3), the image capture apparatus 400 (FIG. 4), etc.

The interconnect mechanism 600 is connected (secured) to the body 102 of the image capture apparatus 500 and is configured for (removable) engagement (contact) with (e.g., connection to) a variety of surfaces and/or accessories such that the image capture apparatus 500 is (repeatably) connectable to and disconnectable from the surfaces and/or the accessories via the interconnect mechanism 600. More specifically, the interconnect mechanism 600 is positioned (located) within a cavity 502 (FIGS. 5-7) that extends (vertically upward) into the body 102 of the image capture apparatus 500 (i.e., towards the shutter button 112 (FIG. 1A)).

The interconnect mechanism 600 is generally symmetrical in configuration and includes: a base plate 602; (first and second) magnetic members 604i, 604ii; (first and second) protrusions 606i, 606ii (e.g., fingers 608); hinge pins 610; and restrictors 612. More specifically, the interconnect mechanism 600 is generally symmetrical about a (first) longitudinal axis Li (FIG. 6) thereof, which extends in generally parallel relation to a width W (FIG. 5) of the image capture apparatus 500, and a (second) transverse axis Ti, which extends in generally parallel relation to a depth D of the image capture apparatus 500 and in generally orthogonal (perpendicular) relation to the longitudinal axis Li.

The base plate 602 includes: a base 614 (FIGS. 8, 9) with windows 616, apertures 618, and (first and second) grille portions 620i, 620ii that are integrally formed therein; bosses 622; strengthening ribs 624; a mounting platform 626; and latching (engagement) features 628. In the illustrated embodiment, the base plate 602 is integral (e.g., unitary, monolithic) in construction and includes (i.e., is formed from) a single piece of magnetic material (e.g., ferritic steel). Embodiments in which the base plate 602 may include a plurality of components are also envisioned herein, however, as are embodiments in which the base plate 602 may include (e.g., may be partially formed from) one or more non-metallic materials (e.g., one or more plastic, polymeric, and/or composite materials). For example, embodiments in which the base 614, the strengthening ribs 624, and/or the mounting platform 626 may be formed as separate (discrete) components of the base plate 602 would not be beyond the scope of the present disclosure.

The windows 616 (FIG. 9) extend through the base 614 and are generally aligned with the mounting platform 626 along the longitudinal axis Li (FIG. 6). The windows 616 are configured to receive the restrictors 612 such that the restrictors 612 extend into the base plate 602, through the base 614, and into engagement (contact) with the protrusions 606, as described in further detail below. More specifically, in the illustrated embodiment, the windows 616 and the restrictors 612 are configured such that the windows 616 receive the restrictors 612 in a press (interference) fit such that the restrictors 612 are frictionally retained within the base 614, thereby inhibiting (if not entirely preventing) unintended removal of the restrictors 612 from the base plate 602.

Although configured as (generally) linear slits 630 in the illustrated embodiment, it should be appreciated that the particular configuration of the windows 616 may be varied in alternate embodiments without departing from the scope of the present disclosure (e.g., depending upon the particular configuration of the restrictors 612, the configuration of the protrusions 606, etc.).

The apertures 618 (FIGS. 7, 9) extend through the base 614 and are positioned (located) laterally outward of the windows 616 along the longitudinal axis Li. The apertures 618 are configured to receive mechanical fasteners 632 (FIG. 7) such that the mechanical fasteners 632 extend through the apertures 618 and into corresponding apertures in the body 102, thereby connecting (securing) the interconnect mechanism 600 to the image capture apparatus 500.

In order to increase the compatibility of the interconnect mechanism 600, it is envisioned that the apertures 618 and, thus, the mechanical fasteners 632, may be arranged in a pattern corresponding to that defined by similar apertures in the bodies of additional image capture apparatuses.

Although shown as including four apertures 618 (and four mechanical fasteners 632), it should be appreciated that the particular number of apertures 618 (and mechanical fasteners 632) may be altered in various embodiments without departing from the scope of the present disclosure (e.g., depending upon the particular configuration the interconnect mechanism 600, the material(s) used in construction of the interconnect mechanism 600 and the body 102 of the image capture apparatus 500, etc.). As such, embodiments of the interconnect mechanism 600 including both greater and fewer numbers of apertures 618 (and mechanical fasteners 632) are envisioned herein and would not be beyond the scope of the present disclosure The grille portions 620 extend through the base 614 and extend (are positioned (located)) laterally outward of the apertures 618 and the magnetic members 604 along the longitudinal axis Li. More specifically, in the illustrated embodiment, the grille portion 620i is positioned laterally outward of the magnetic member 604i and overlies the speaker 138 (FIG. 1B), and the grille portion 620ii is positioned laterally outward of the magnetic member 604ii and overlies an air vent 504 (FIG. 10) that is formed in the body 102 in order to facilitate pressure equalization inside the image capture apparatus 500. Integrating the grille portions 620 into the interconnect mechanism 600 simplifies the overall construction of the image capture apparatus 500 by allowing for the elimination of additional components (e.g., sheet metal covers) that would otherwise require connection to the body 102.

The bosses 622 (FIGS. 7, 8) extend outwardly (i.e., vertically downward) from the base 614 and are positioned (located) laterally between the apertures 618 and the grille portions 620 along the longitudinal axis Li. The bosses 622 receive (accommodate) the magnetic members 604 such that the magnetic members 604 are connected (secured) to the base plate 602. More specifically, in the illustrated embodiment, the magnetic members 604 are adhesively connected to (secured within) the bosses 622. Embodiments in which the magnetic members 604 may be mechanically connected to (secured within) the bosses 622, either in addition to or instead of an adhesive connection, are also envisioned herein, however, and would not be beyond the scope of the present disclosure.

The strengthening ribs 624 (FIGS. 8, 9) increase the stiffness (e.g., the rigidity) of the interconnect mechanism 600 and extend outwardly (i.e., vertically downward) from the base plate 602 (i.e., the base 614) so as to define a height Hr, whereby the base 614 includes a non-uniform thickness Tb. As seen in FIG. 8, the strengthening ribs 624 extend laterally inward from the latching features 628 along the longitudinal axis Li and include inner ends 634 that are positioned (located) laterally outward of the apertures 618.

The mounting platform 626 extends outwardly (i.e., vertically downward) from the base 614 and includes a central portion 636 and wings 638.

The central portion 636 defines a receptacle 640 and channels 642. Although illustrated as being polygonal (e.g., (generally) rectangular) in configuration, it should be appreciated that the particular configuration of the central portion 636 may be altered in various embodiments without departing from the scope of the present disclosure (e.g., depending upon the particular configuration of the protrusions 606, the particular configuration of the image capture apparatus 500, etc.).

Figure 12:
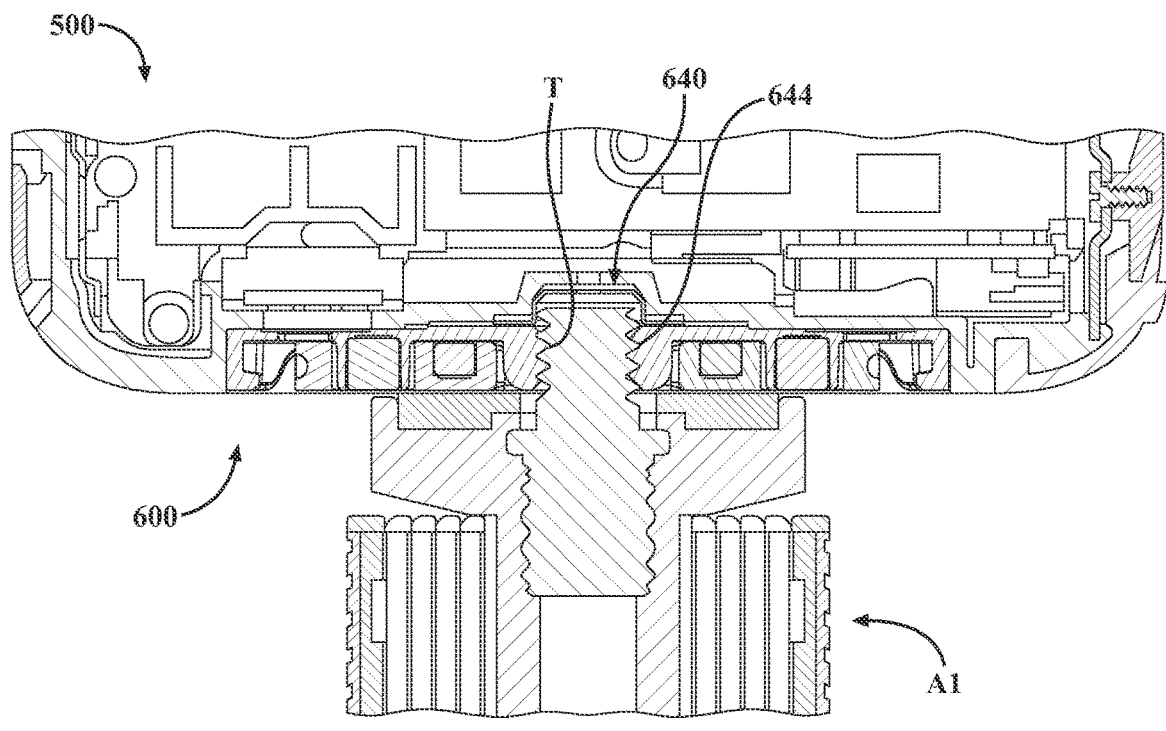
FIG. 12 is a partial, cross-sectional view of the image capture apparatus and the (first) accessory taken along line 12-12 in FIG. 11.
Figure 11:
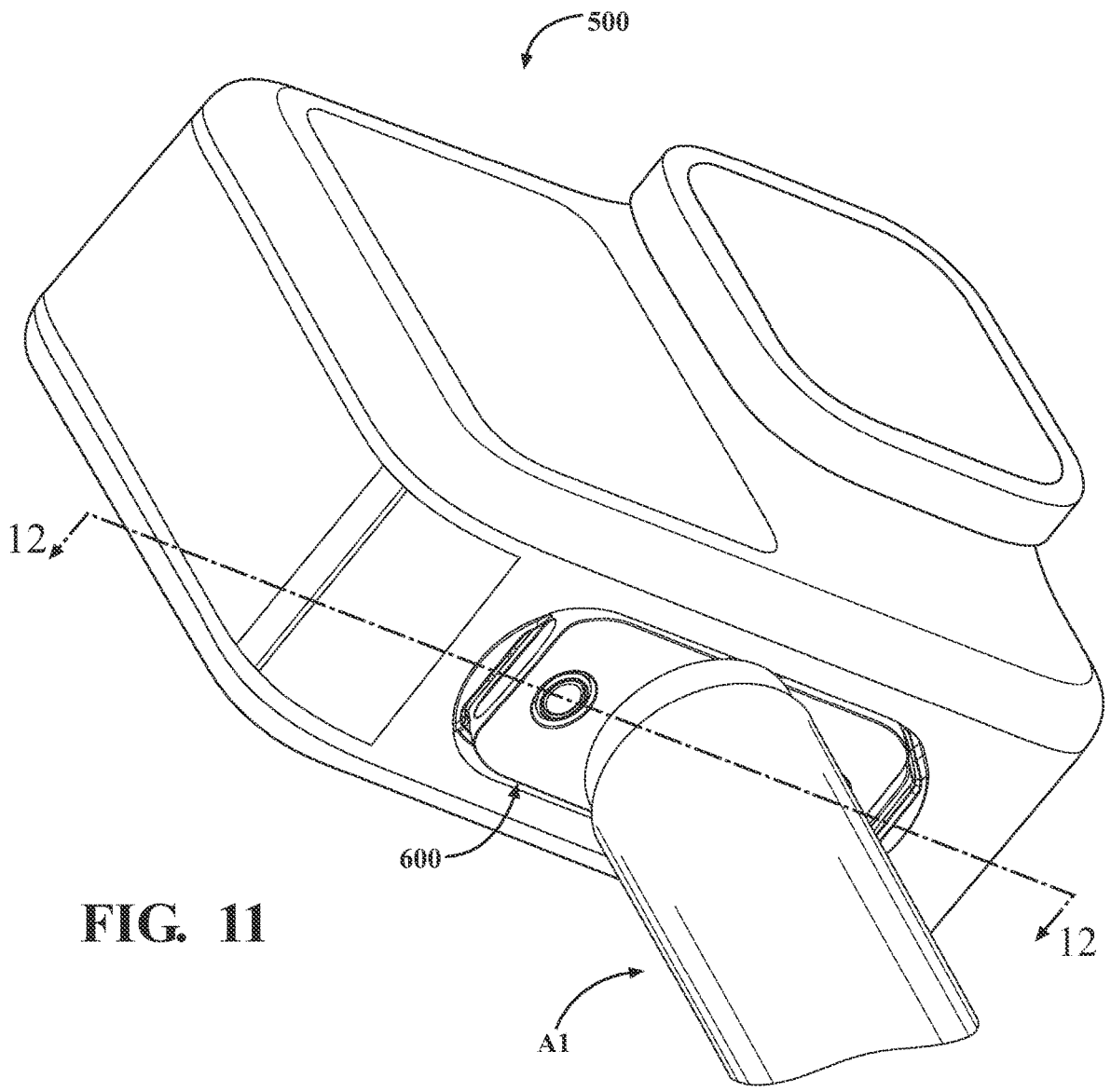
FIG. 11 is a bottom, perspective view of the image capture apparatus seen in FIG. 5 shown connected to a (first) accessory.

With reference to FIGS. 11 and 12 as well, the receptacle 640 is configured to (removably) receive and releasably engage (contact) a (first) accessory A1 and, thus, provides an interface between the image capture apparatus 500 and the accessory A1. More specifically, FIG. 11 is a bottom, perspective view of the image capture apparatus 500 shown connected to the accessory A1, and FIG. 12 is a partial, cross-sectional view of the image capture apparatus 500 and the accessory A1 taken along line 12-12 in FIG. 11.

The receptacle 640 extends into the mounting platform 626 along (and defines) a (first) axis R (FIG. 10), which extends in generally parallel relation to a height H (FIG. 5) of the image capture apparatus 500 and in generally orthogonal (perpendicular) relation to the axes Li, Ti (FIG. 6). The receptacle 640 is configured to receive and engage (contact) the accessory A1 such that the accessory A1 is directly connectable to the image capture apparatus 500 via the interconnect mechanism 600. More specifically, the receptacle 640 includes internal threading 644 that is configured in correspondence with the external threading T on the accessory A1, which facilitates threaded engagement of the accessory A1 with the interconnect mechanism 600 such that the accessory A1 is directly and removably connectable to the image capture apparatus 500.

In the illustrated embodiment, the receptacle 640 is open and extends entirely through the base plate 602 (i.e., the mounting platform 626 and the base 614). Embodiments in which the receptacle 640 may be closed (i.e., such that the receptacle 640 extends partially through the base plate 602) are also envisioned herein, however, and would not be beyond the scope of the present disclosure. For example, it is envisioned that closure of the receptacle 640 may offer additional protection against over-advancement of the accessory A1 (e.g., via excessive tightening of the accessory A1 and the image capture apparatus 500) by providing a barrier that inhibits (if not entirely prevents) penetration of the body 102 by the accessory A1.

The channels 642 (FIG. 8) extend into the central portion 636 and are configured to receive the hinge pins 610. More specifically, the channels 642 extend in generally parallel relation to the transverse axis Ti (FIG. 6).

In the illustrated embodiment, the interconnect mechanism 600 includes four channels 642*i*-624*iv*. It should be appreciated, however, that the particular number of channels 642 may be varied in alternate embodiments (e.g., depending upon the particular number of hinge pins 610 included in the interconnection mechanism 600). For example, an embodiment of the interconnect mechanism 600 including a pair of channels 642 is also envisioned herein and would not be beyond the scope of the present disclosure.

The wings 638 extend outwardly from the central portion 636 in generally parallel relation to the transverse axis Ti, the channels 642, and the hinge pins 610, whereby the mounting platform 626 includes a generally cruciform configuration. The wings 638 include locating features 646 (e.g., indentations 648), which facilitate proper registration of the interconnection mechanism 600 and an adapter 700 (FIGS. 13-28), as described in further detail below.

The locating features 646 extend in generally parallel relation to the axis R (FIG. 10) and the height H (FIG. 5) of the image capture apparatus 500 and in generally orthogonal (perpendicular) relation to the axes Li, Ti (FIG. 6). As seen in FIG. 8, the locating features 646 are generally aligned with each other and the receptacle 640 along the axis Ti.

The latching features 628 are positioned (located) laterally outward of the grille portions 620 along the longitudinal axis Li and extend outwardly (i.e., vertically downward) from the base 614 so as to define a height Hl (FIG. 8), which is greater than the height Hr defined by the strengthening ribs 624. More specifically, the latching features 628 are positioned (located) laterally outward of the magnetic members 604 along the longitudinal axis Li at opposite (first and second) lateral ends 650, 652 of the interconnect mechanism 600. As seen in FIG. 8, the latching features 628 respectively define outer lateral walls 654, 656 of the interconnect mechanism 600, which impart an arcuate (curved) configuration to the interconnect mechanism 600 corresponding to that defined by the cavity 502 (FIGS. 5-7).

The latching features 628 include hook members 658 (FIG. 10) that are configured to (removably) receive and engage (contact) the adapter 700 (FIGS. 13-28) to thereby connect the adapter 700 to the interconnect mechanism 600, as described in further detail below. As seen in FIG. 10, the hook members 658 define receiving spaces 660 and include bearing surfaces 662 and engagement surfaces 664, each of which is tapered (angled, chamfered, beveled) in configuration.

Although shown as extending laterally inward along the longitudinal axis Li (i.e., towards the receptacle 640), embodiments in which the hook members 658 may extend laterally outward (i.e., away from the receptacle 640) are also envisioned herein (e.g., depending upon the particular configuration of the adapter 700) and would not be beyond the scope of the present disclosure.

The magnetic members 604 (FIG. 8) are generally identical and are positioned (located) within the bosses 622, as indicated above, whereby the magnetic members 604 are positioned (located) laterally outward of the receptacle 640 and the locating features 646 along the longitudinal axis Li. The magnetic members 604 each define opposite first (e.g., North) and second (e.g., South) poles N1, S1, respectively, and are oriented so as to define a first polarity. More specifically, the magnetic members 604 are oriented such that the poles N1 face outwardly (i.e., away from the body 102 of the image capture apparatus 500), whereby the magnetic member 604 are configured to facilitate a magnetic connection (interface) between the image capture apparatus 500 and the adapter 700 (FIGS. 13-28), as described in further detail below, or any other magnetic surface (e.g., the handlebars of a bicycle or a motorcycle, the hood of a vehicle, a mounting plate, etc.).

With reference to FIGS. 7 and 8 in particular, the protrusions 606 are pivotably connected to the base plate 602 and include: opposite (first and second) ends 666, 668; apertures 670; magnetic members 672; tactile members 674 (e.g., finger picks 676); and reliefs 678. The protrusions 606 are movable independently of each other such that the interconnect mechanism 600 is reconfigurable between a collapsed (nested, closed, stowed) configuration (FIGS. 5, 6, 8-10) and an extended (expanded, open, deployed) configuration (FIG. 7).

As seen in FIGS. 5 and 6, when the interconnect mechanism 600 is in the collapsed configuration, the protrusions 606 extend into (are nested within) the body 102, which facilitates connection of the image capture apparatus 500 to the adapter 700 (FIGS. 13-28) as well as any other magnetic surface, as described in further detail below. More specifically, when the interconnect mechanism 600 is in the collapsed configuration, the protrusions 606i, 606ii extend into the cavity 502 and are positioned so as to (partially) conceal the grille portions 620i, 620ii (FIG. 7), respectively.

When the interconnect mechanism 600 is in the extended configuration, the protrusions 606 extend outwardly (vertically downward) from the cavity 502 (i.e., away from the shutter button 112 (FIG. 1A)), thereby exposing the grille portions 620i, 620ii, respectively. Additionally, in the extended configuration, the interconnect mechanism 600 facilitates connection of the image capture apparatus 500 to a (second) accessory A2 (FIG. 13) via insertion of the protrusions 606 into channels C that are defined between corresponding protrusions P on the accessory A2.

The ends 666 of the protrusions 606 define generally U-shaped recesses 680 (FIG. 8), which are configured to receive the central portion 636 of the mounting platform 626, and openings 682, which are configured to receive the hinge pins 610 to thereby facilitate reconfiguration of the interconnect mechanism 600 between the collapsed and extended configurations.

The apertures 670 extend through the protrusions 606 and are configured to receive the magnetic members 604 and a fastener F (FIGS. 13, 14) (e.g., a thumbscrew) on the accessory A2. More specifically, when the interconnect mechanism 600 is in the collapsed configuration, the magnetic members 604 extend into the apertures 670 in the protrusions 606 such that the magnetic members 604 are generally flush with outer (i.e., lower, bottom) surfaces 684 (FIGS. 5, 8) of the protrusions 606, which facilitates magnetic connection to the adapter 700 (FIGS. 13-28) or any other magnetic surface. When the interconnect mechanism 600 is in the extended configuration, following insertion of the protrusions 606 into the channels C, the fastener F is inserted through the protrusions P via apertures O and through the protrusions 606 via the apertures 670 to thereby connect the interconnect mechanism 600 and, thus, the image capture apparatus 500, to the accessory A2.

The magnetic members 672 are connected (secured) to (e.g., embedded within) inner (i.e., upper, top) surfaces 686 (FIG. 7) of the protrusions 606 and are positioned (located) between the apertures 670 and the recesses 680. The magnetic members 672 secure (maintain) the interconnect mechanism 600 in the collapsed configuration via magnetic connection to the base plate 602, which inhibits (if not entirely prevents) unintended reconfiguration of the interconnect mechanism 600 from the collapsed configuration into the extended configuration as well as unintended movement (e.g., rattle) of the protrusions 606.

The tactile members 674 are positioned (located) at the ends 668 of the protrusions 606 and extend laterally inward to define the finger picks 676. The tactile members 674 facilitate the (manual) application of force to the protrusions 606 in order to overcome the force applied by the magnetic members 672 and thereby reconfigure the interconnect mechanism 600 from the collapsed configuration into the extended configuration.

The reliefs 678 (FIG. 7, 8) extend outwardly (i.e., vertically downward) into the inner surfaces 686 of the protrusions 606, whereby the protrusions 606 include a non-uniform thickness Tp (FIG. 9), and are configured to receive the strengthening ribs 624 when the interconnect mechanism 600 is in the collapsed configuration. More specifically, the reliefs 678 include proximal ends 688 that are positioned (located) laterally between the apertures 670 and the recesses 680 and extend to the ends 668 of the protrusions 606.

The hinge pins 610 connect the protrusions 606 to the base plate 602 and facilitate reconfiguration of the interconnect mechanism 600 between the collapsed and extended configurations. More specifically, the hinge pins 610 extend into the mounting platform 626 via the channels 642 (FIG. 8) and into the protrusions 606 via the openings 682.

In the illustrated embodiment, the interconnect mechanism 600 includes four hinge pins 610i-610iv and four openings 682i-682iv, which allows for a reduction in the length of each hinge pin 610, thereby avoiding penetration of the receptacle 640 by the hinge pins 610 and interference with insertion of the accessory A1 (FIGS. 11, 12). It should be appreciated, however, that the particular number of hinge pins 610, channels 642, and openings 682 may be varied in alternate embodiments without departing from the scope of the present disclosure. For example, an embodiment of the interconnect mechanism 600 including a pair of hinge pins 610 is also envisioned herein (e.g., depending upon the particular dimensions of the image capture apparatus 500, the dimensions of the base plate 602, the dimensions of the accessory A1, etc.).

With reference to FIG. 9, the restrictors 612 will be discussed. The restrictors 612 frictionally engage (contact) the protrusions 606 to inhibit (if not entirely prevent) unintended movement thereof (i.e., e.g., unintended reconfiguration of the interconnect mechanism 600 from the collapsed configuration towards the extended configuration and unintended reconfiguration of the interconnect mechanism 600 from the extended configuration towards the collapsed configuration). The increased resistance to movement provided by the restrictors 612 disallows free movement of the protrusions 606 and, thus, facilitates more controlled and deliberate positioning thereof.

The restrictors 612 may include any material(s) suitable for the intended purpose of limiting free movement of the protrusions 606 via frictional engagement (contact) therewith in the manner described above. For example, in the illustrated embodiment, the restrictors 612 include (e.g., are formed partially or entirely from) one or more non-metallic materials (e.g., one or more plastic, polymeric, and/or composite materials). More specifically, the restrictors 612 are configured as rubberized pads 690 (FIG. 9). Embodiments in which the restrictors 612 may include (e.g., may be formed partially or entirely from) one or more metallic materials (e.g., aluminum, steel, etc.) are also envisioned herein, however, and would not be beyond the scope of the present disclosure. For example, it is envisioned that the restrictors 612 may include a multi-material construction in which a metallic core is overlayed with a non-metallic jacket.

The restrictors 612 are configured such that, upon assembly of the interconnect mechanism 600, the restrictors 612 protrude inwardly from the base plate 602 (e.g., towards the body 102 of the image capture apparatus 500). Such inward protrusion facilitates the application of pressure to the restrictors 612 during (upon) connection of the interconnect mechanism 600 to the image capture apparatus 500. The restrictors 612 are thus compressed between the base plate 602 and the body 102 (e.g., within the cavity 502 (FIGS. 5-7)), thereby inhibiting (if not entirely preventing) unintended relative movement between the interconnect mechanism 600 and the image capture apparatus 500 (e.g., rattling, etc.) and absorbing (dampening) forces that may otherwise be transmitted to the image capture apparatus 500 via the interconnect mechanism 600 (e.g., during connection of the adapter 700, the accessory A1 (FIGS. 11, 12), the accessory A2 (FIG. 13), upon contact with an external object, in the event that the image capture apparatus 500 is dropped, etc.).

Figure 13:
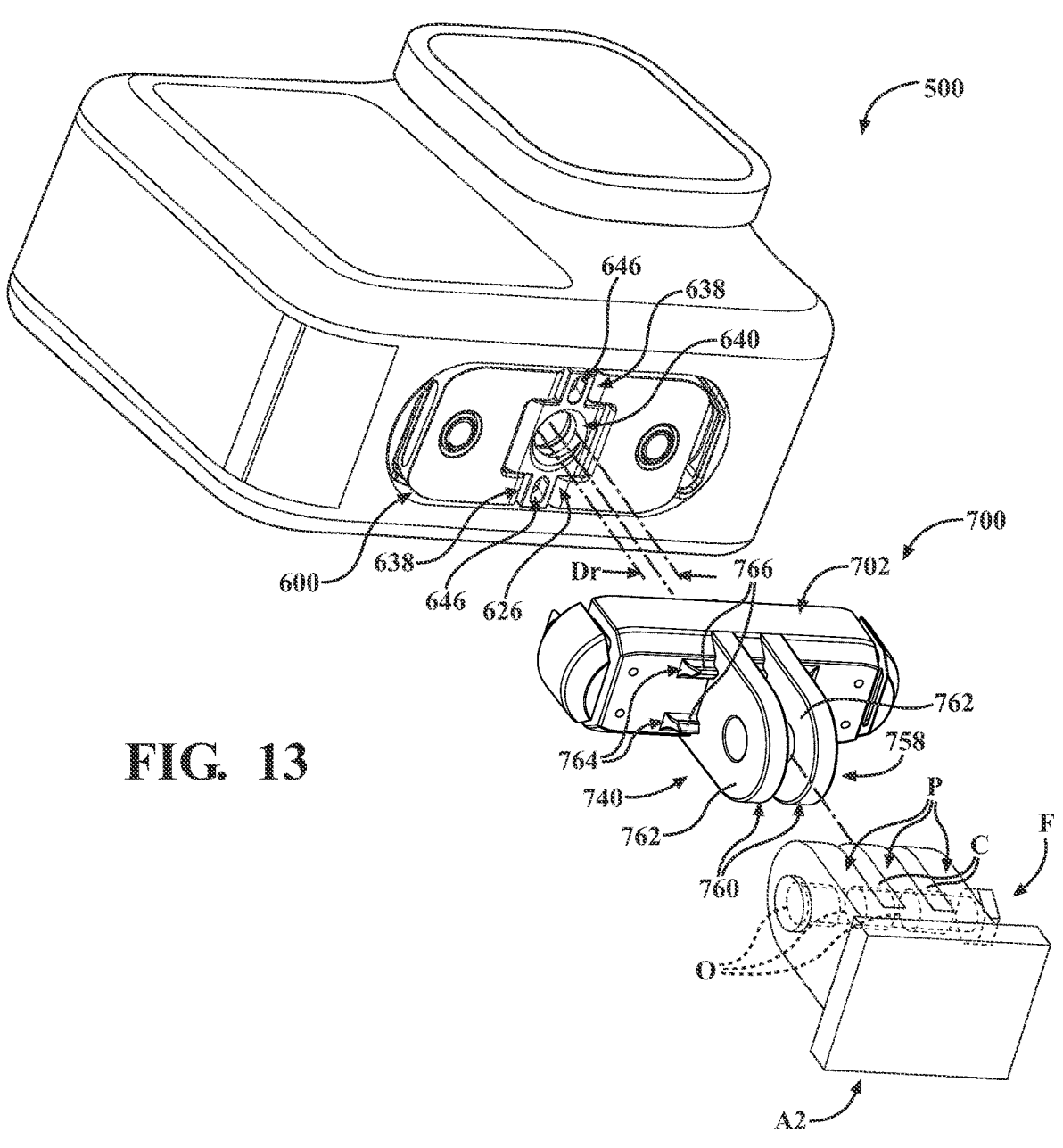
FIG. 13 is a bottom, perspective view of the image capture apparatus seen in FIG. 5 shown with an example of an adapter according to the principles of the present disclosure and a (second) accessory prior to connection.
Figure 14:
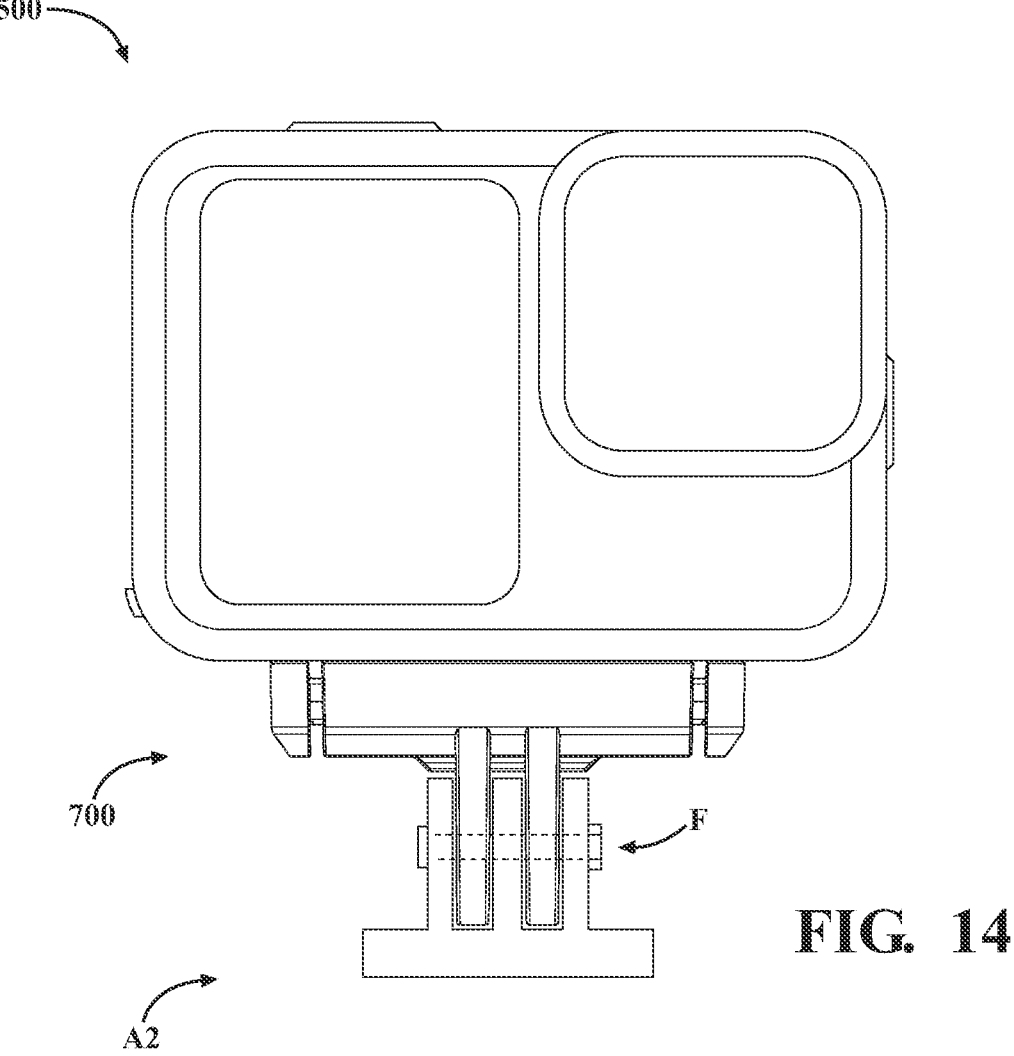
FIG. 14 is a front, plan view of the adapter shown connected to the image capture apparatus seen in FIG. 5 and the (second) accessory.
Figures 15, 16:
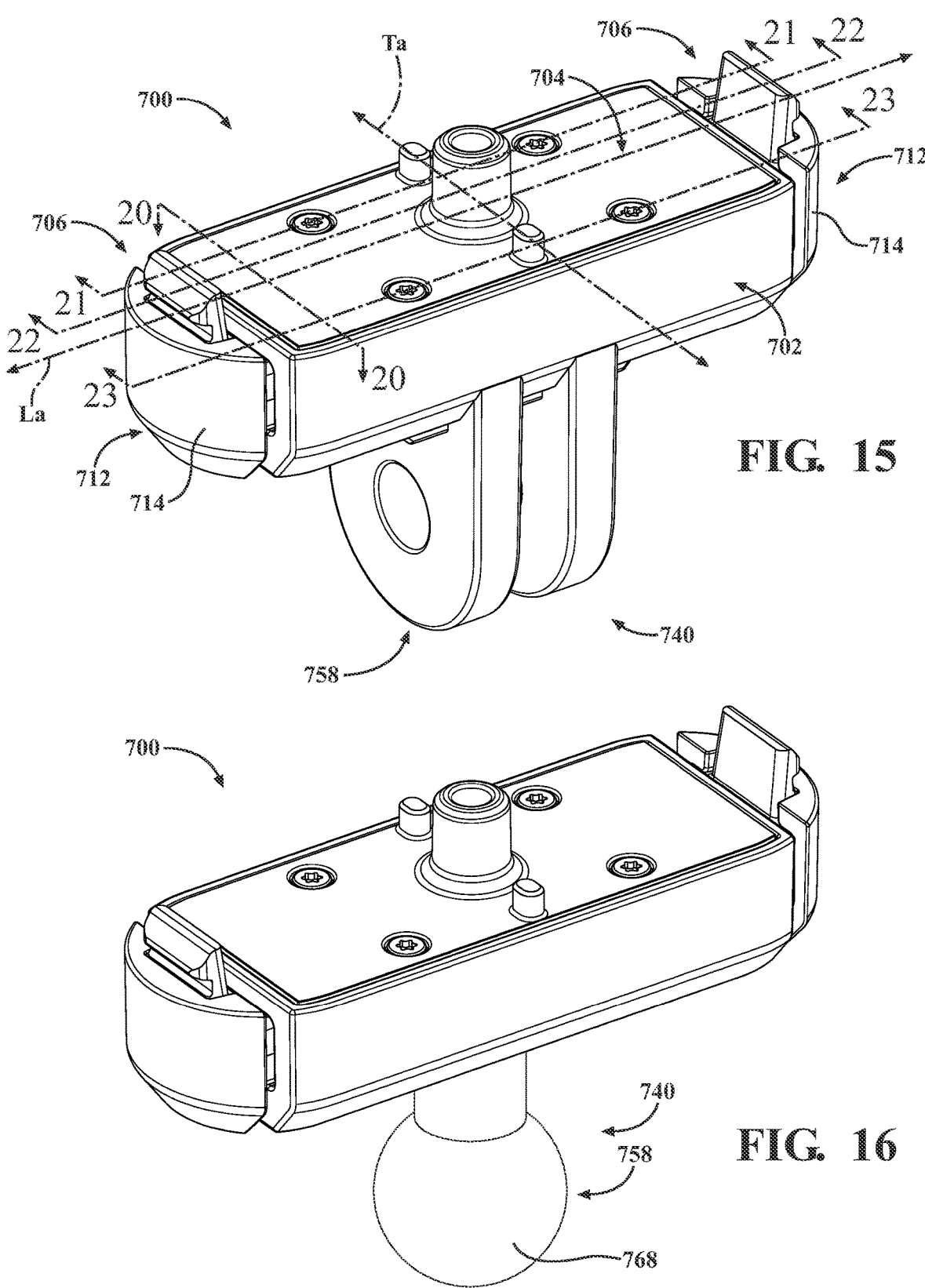
FIG. 15 is a top, perspective view of the adapter.
FIG. 16 is a top, perspective view of an alternate embodiment of the adapter.
Figure 17:
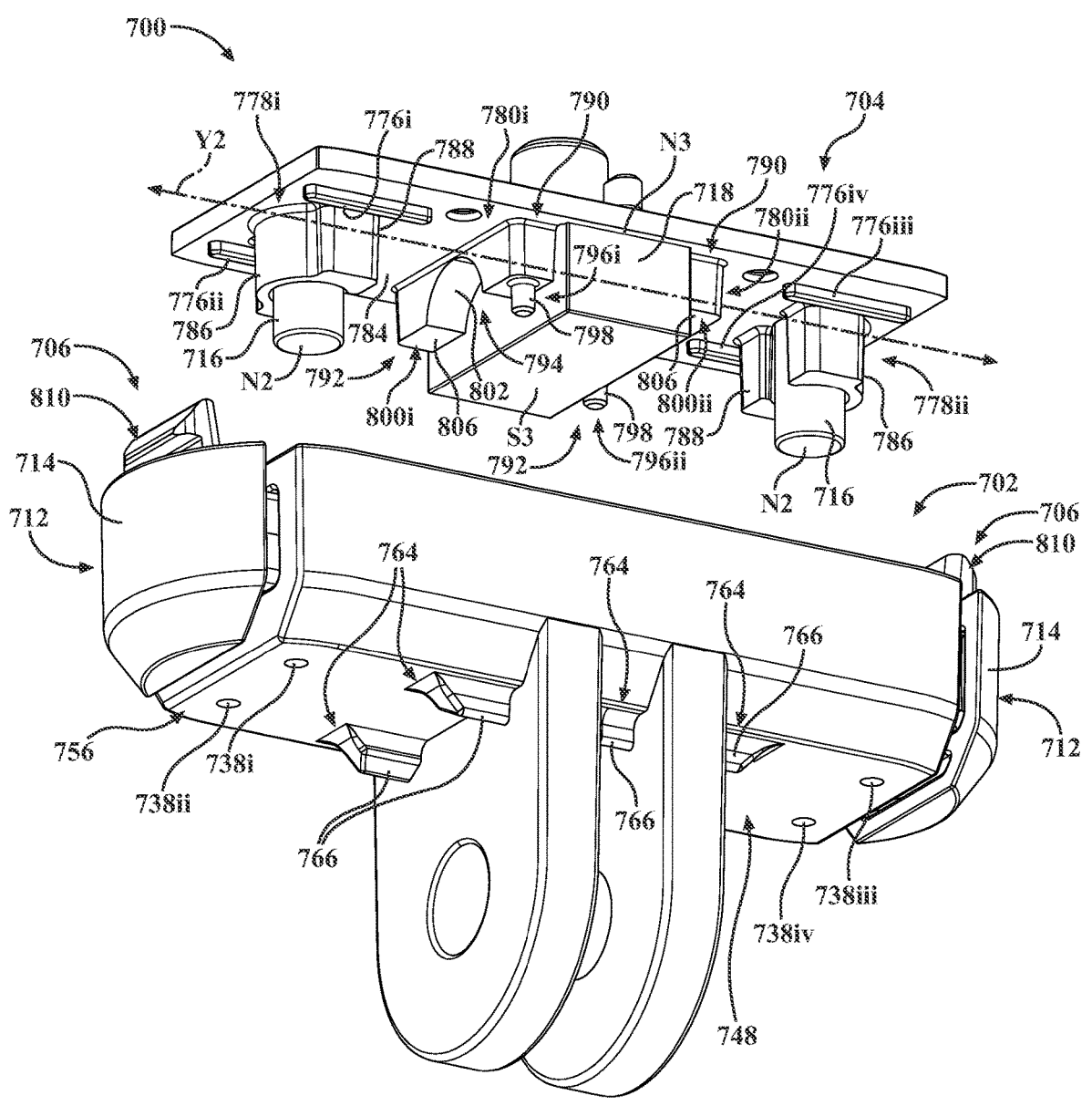
FIG. 17 is a bottom, perspective view of the adapter shown with parts separated.
Figure 18:
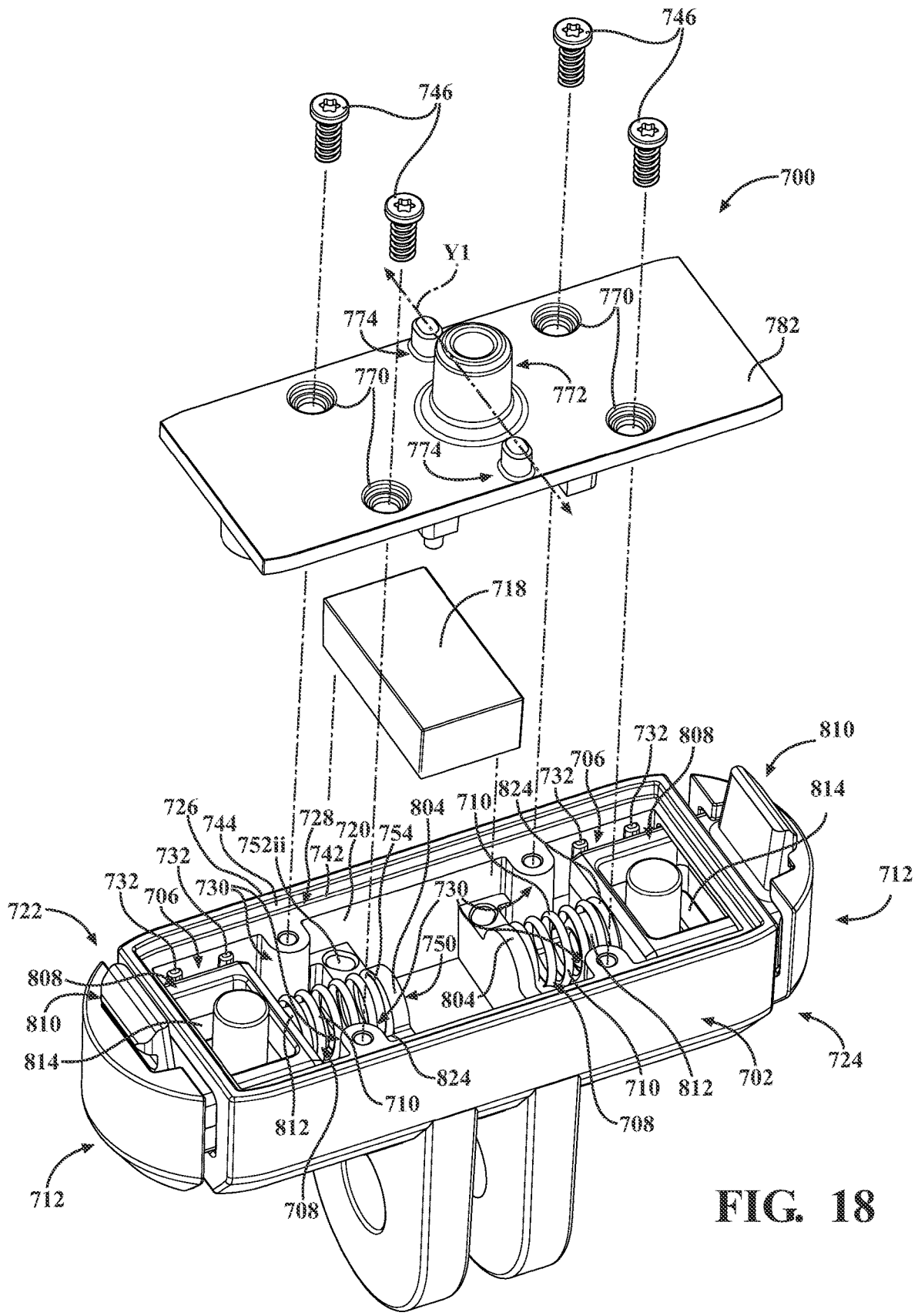
FIG. 18 is a top, perspective view of the adapter shown with parts separated.
Figure 19:
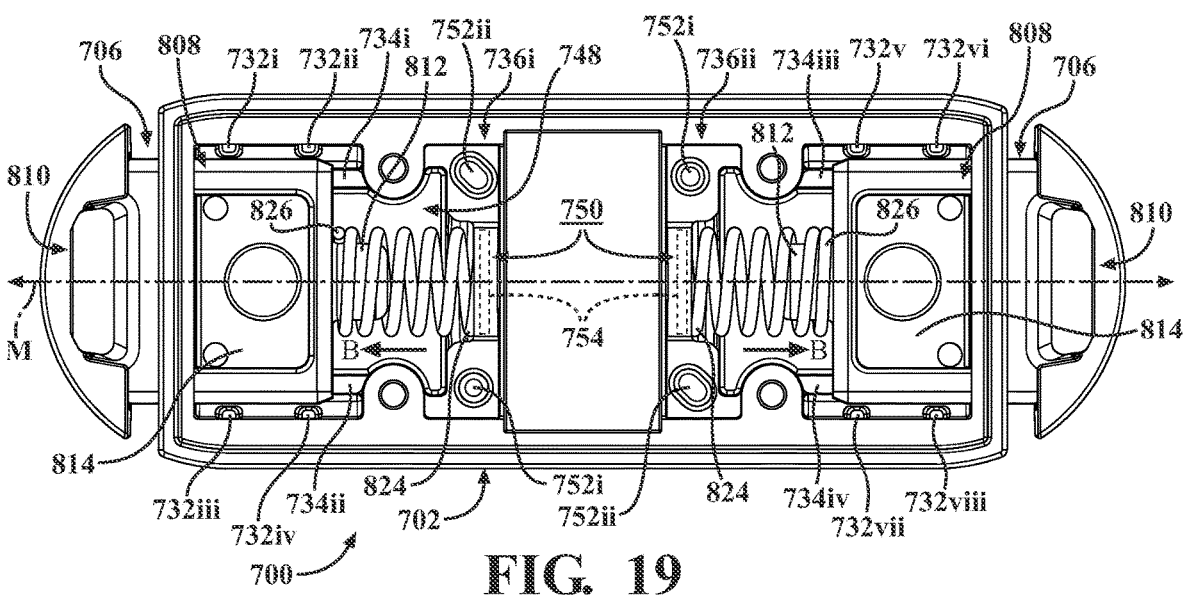
FIG. 19 is a partial, top, plan view of the adapter shown in an engaged configuration.
Figure 20:
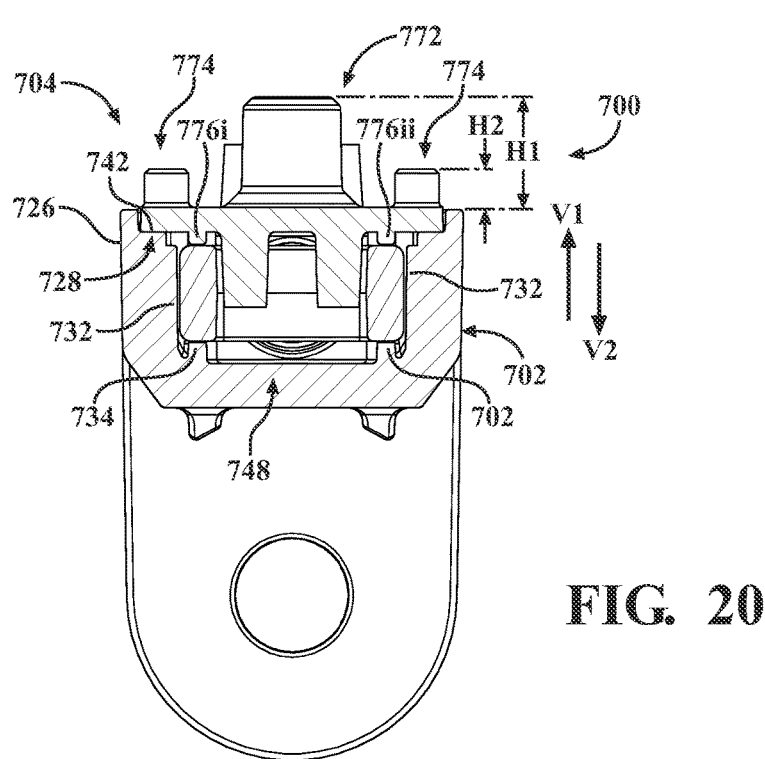
FIG. 20 is a cross-sectional view taken along line 20-20 in FIG. 15.
Figure 21:
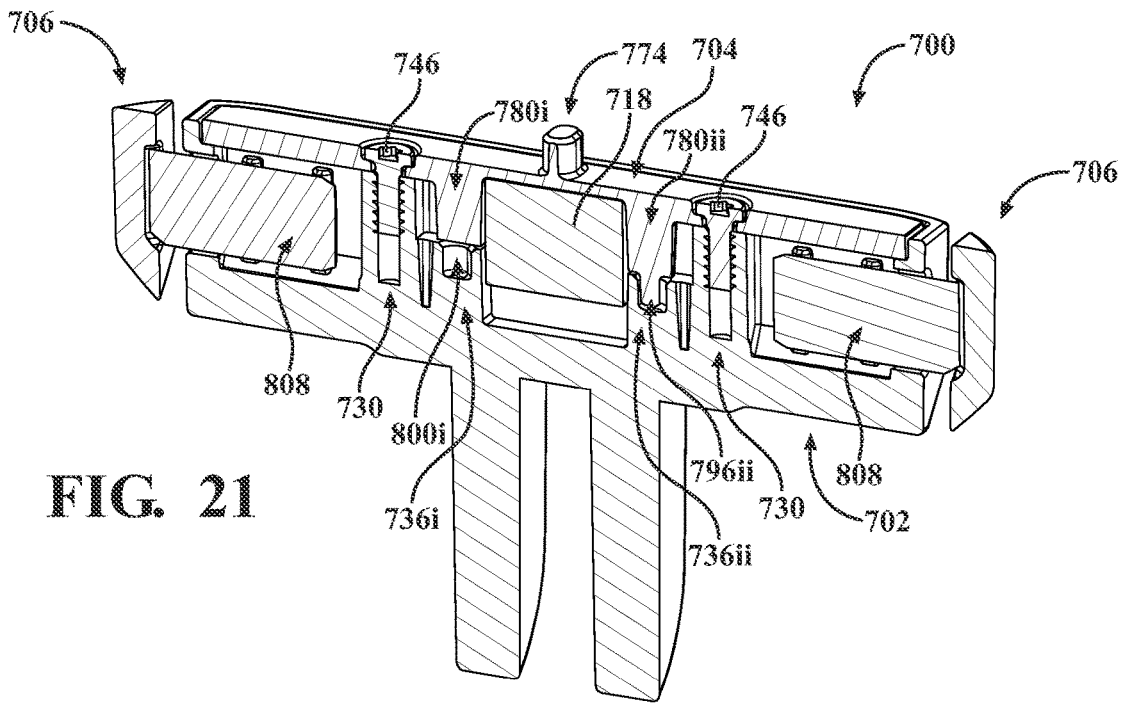
FIG. 21 is a cross-sectional view taken along line 21-21 in FIG. 15.
Figure 22:
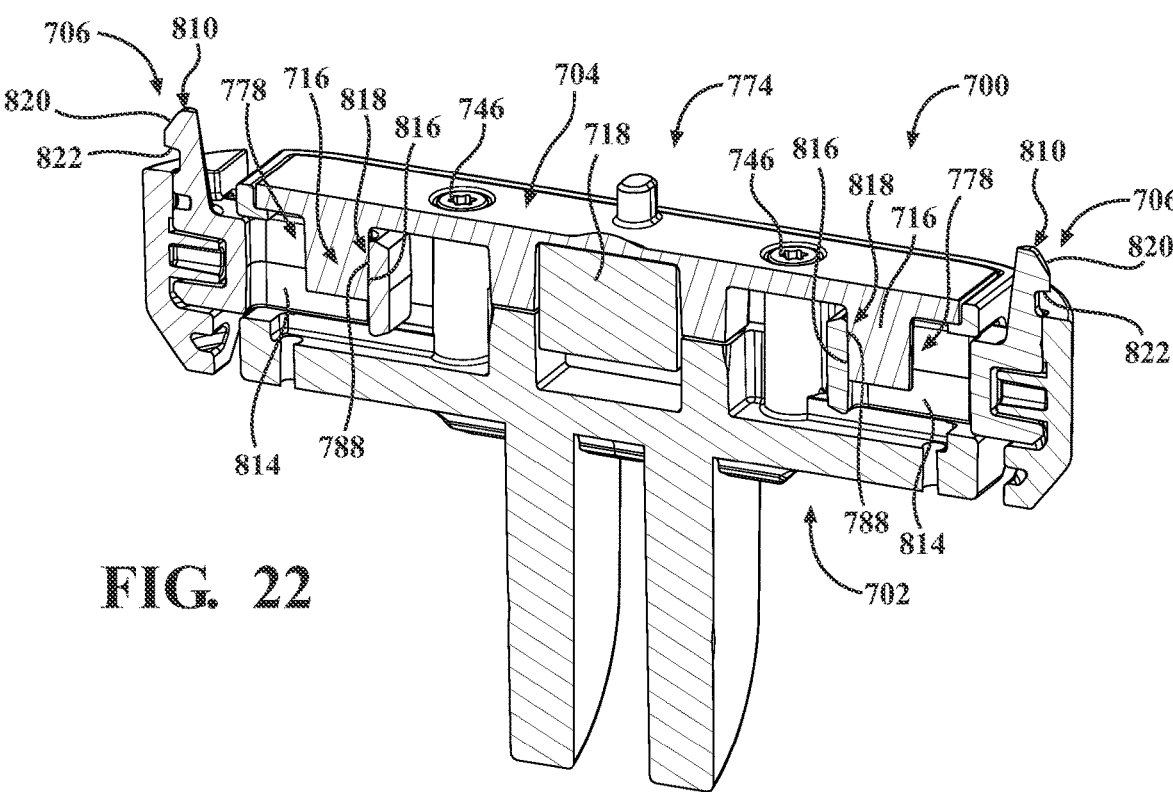
FIG. 22 is a cross-sectional view taken along line 22-22 in FIG. 15.
Figure 23:
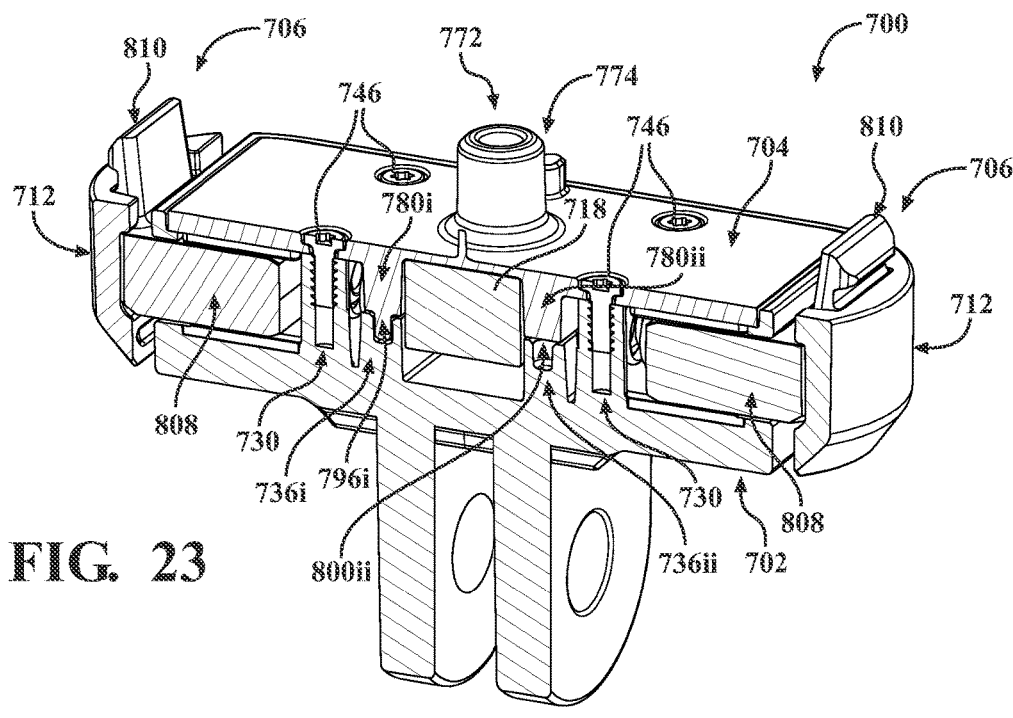
FIG. 23 is a cross-sectional view taken along line 23-23 in FIG. 15.
Figure 24:
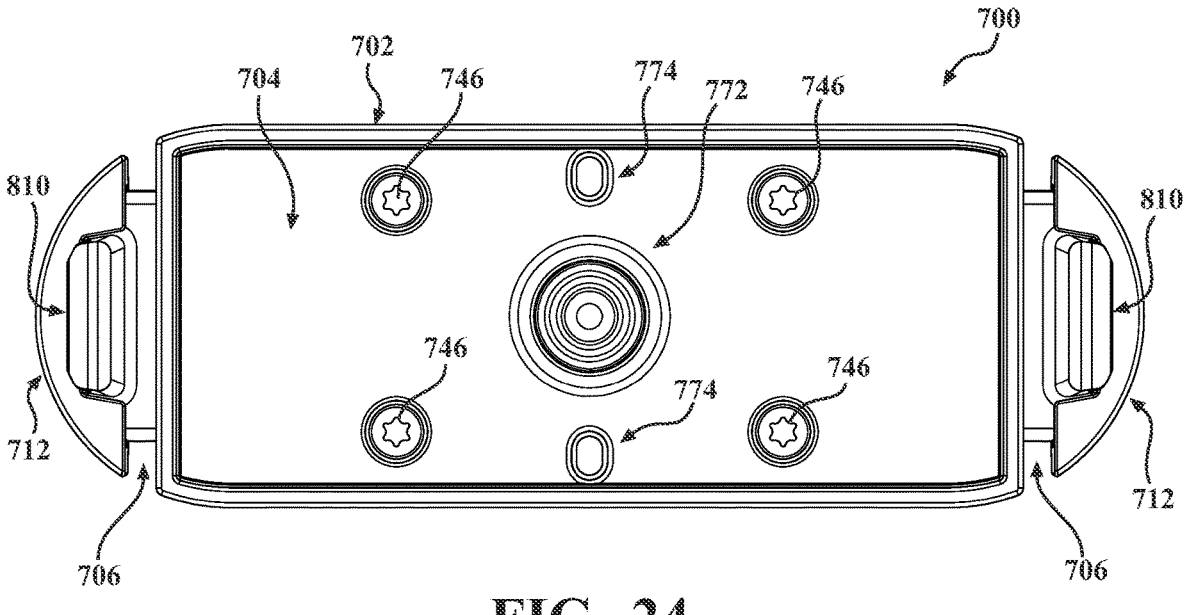
FIG. 24 is a top, plan view of the adapter shown in the engaged configuration.
Figure 25:
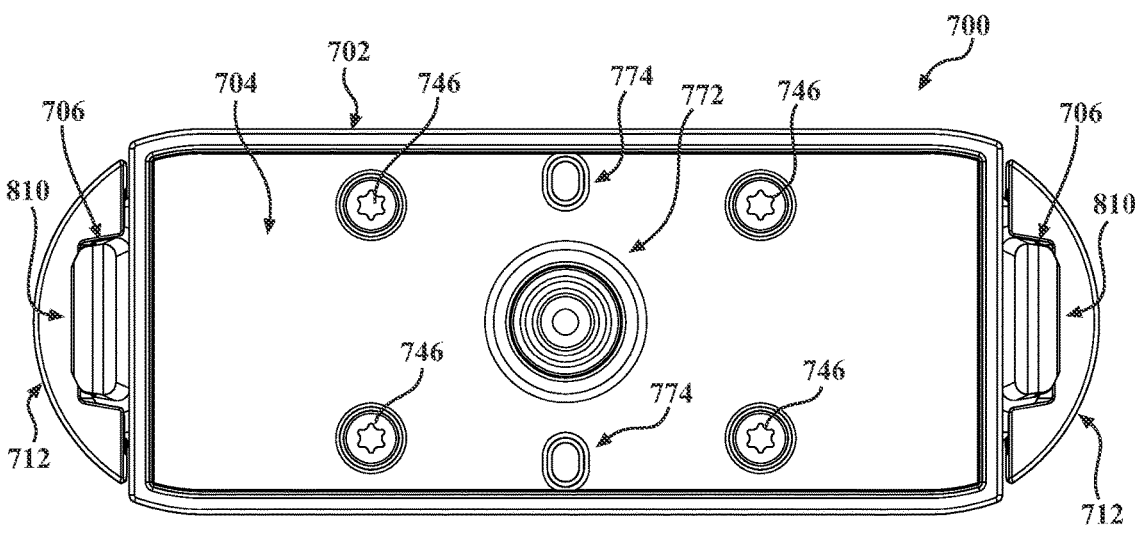
FIG. 25 is a top, plan view of the adapter shown in a disengaged configuration.
Figure 26:
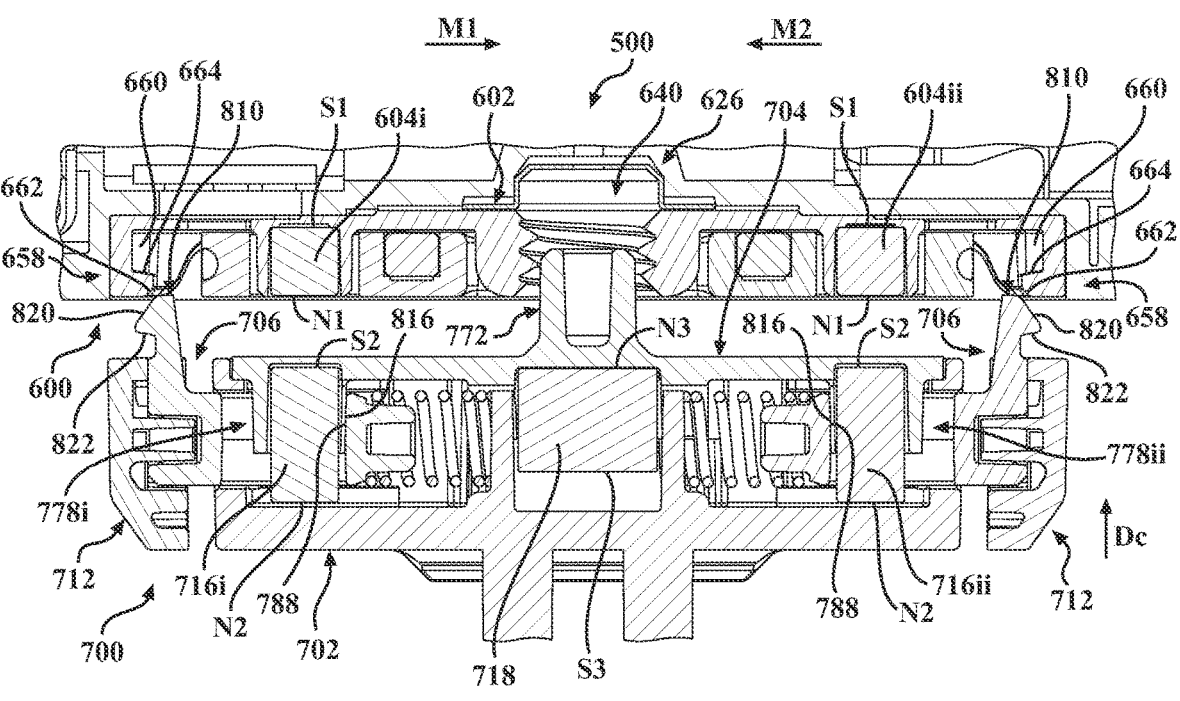
FIG. 26 is a partial, cross-sectional view of the image capture apparatus seen in FIG. 5 and the adapter shown prior to connection.
Figure 27:
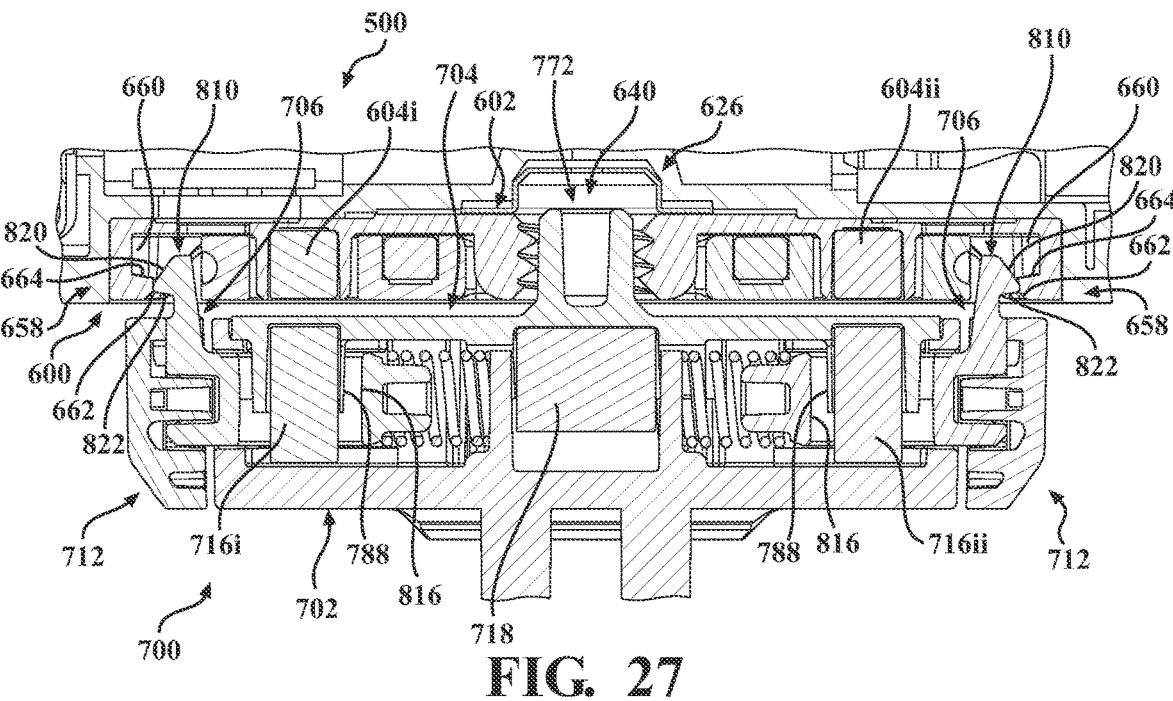
FIG. 27 is a partial, cross-sectional view of the image capture apparatus seen in FIG. 5 and the adapter shown during connection.
Figure 28:
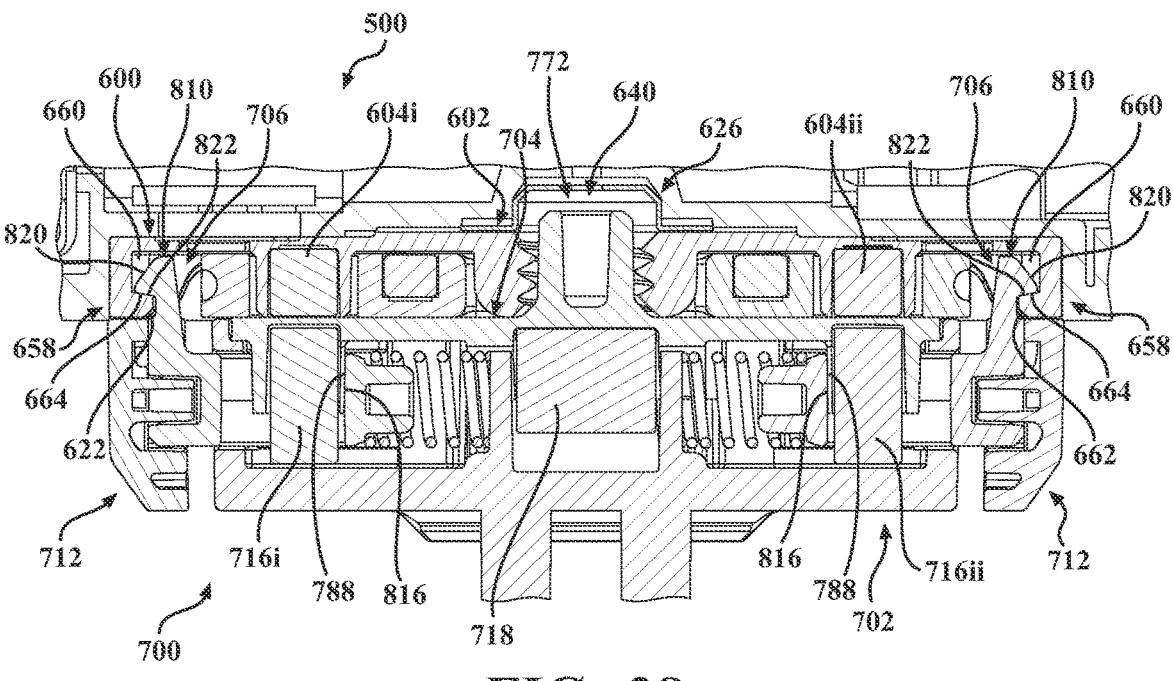
FIG. 28 is a partial, cross-sectional view of the image capture apparatus seen in FIG. 5 and the adapter shown upon connection.

With reference now to FIGS. 13-28, the adapter 700 will be discussed. More specifically, FIG. 13 is a bottom, perspective view of the adapter 700 shown with the image capture apparatus 500 and the accessory A2 prior to connection; FIG. 14 is a front, plan view of the adapter 700 shown connected to the image capture apparatus 500 and the accessory A2; FIG. 15 is a top, perspective view of the adapter 700; FIG. 16 is a top, perspective view of an alternate embodiment of the adapter 700; FIG. 17 is a bottom, perspective view of the adapter 700 shown with parts separated; FIG. 18 is a top, perspective view of the adapter 700 shown with parts separated; FIG. 19 is a partial, top, plan view of the adapter 700 shown in an engaged configuration; FIG. 20 is a cross-sectional view taken along line 20-20 in FIG. 15; FIG. 21 is a cross-sectional view taken along line 21-21 in FIG. 15; FIG. 22 is a cross-sectional view taken along line 22-22 in FIG. 15; FIG. 23 is a cross-sectional view taken along line 23-23 in FIG. 15; FIG. 24 is a top, plan view of the adapter 700 shown in the engaged configuration; FIG. 25 is a top, plan view of the adapter 700 shown in a disengaged configuration; FIG. 26 is a partial, cross-sectional view of the image capture apparatus 500 and the adapter 700 with the adapter shown prior to connection; FIG. 27 is a partial, cross-sectional view of the image capture apparatus 500 and the adapter 700 shown during connection; and FIG. 28 is a partial, cross-sectional view of the image capture apparatus 500 and the adapter 700 shown upon connection.

The adapter 700 is configured for use with (i.e., for releasable connection to) the image capture apparatus 500 and an accessory, product, device, etc., in order to (indirectly) connect the accessory, product, device, etc., to the image capture apparatus 500 via the interconnect mechanism 600. Although shown as being configured for releasable connection to the accessory A2 in FIGS. 13 and 14, it is envisioned that the adapter 700 may be configured for connection to a wide variety of accessories, products, devices, etc., as described in further detail below. Additionally, while the adapter 700 and the accessory A2 are shown as separate (discrete) components, embodiments in which the adapter 700 may be fixedly (i.e., non-removably) connected to (e.g., integrated into) the accessory A2 are also envisioned herein and would not be beyond the scope of the present disclosure.

The adapter 700 defines a (first) longitudinal axis La (FIG. 15), which extends in generally parallel relation to the longitudinal axis Li (FIG. 6) of the interconnect mechanism 600 (and the width W (FIG. 5) of the image capture apparatus 500), and a (second) transverse axis Ta, which extends in generally orthogonal (perpendicular) relation to the longitudinal axis La ad in generally parallel relation to the transverse axis Ti of the interconnect mechanism 600 (and the depth D of the image capture apparatus 500). The adapter 700 includes: a body 702; a cover plate 704; latch members 706; biasing members 708 (e.g., springs 710);

tactile members 712 (e.g., grips 714); outer (first) magnetic members 716; and (one or more) at least one inner (second) magnetic member 718.

The body 702 defines a cavity 720 (FIG. 18) and includes: opposite lateral (first and second) ends 722, 724; respective outer and inner walls 726, 728; bosses 730; (vertical) ribs 732; (lateral) ribs 734; (first and second) supports 736i, 736ii; drain holes 738; and a connector 740.

The inner wall 728 (FIG. 18) defines an upper surface 742 that is recessed in relation to the outer wall 726, thereby defining a ledge 744. The ledge 744 is configured to support the cover plate 704 such that the cover plate 704 is recessed into the body 702 upon assembly of the adapter 700, as seen in FIG. 20.

The bosses 730 (FIG. 18) project inwardly from the inner wall 728 and extend into the cavity 720 along (i.e., in generally parallel relation to) the transverse axis Ta. The bosses 730 receive mechanical fasteners 746, which extend through the cover plate 704 to thereby connect (secure) the cover plate 704 to the body 702.

Although shown as including four bosses 730, it should be appreciated that the particular number of bosses 730 (and mechanical fasteners 746) may be altered in various embodiments without departing from the scope of the present disclosure (e.g., depending upon the particular configuration the adapter 700, the material(s) of construction, etc.). As such, embodiments of the adapter 700 including both greater and fewer numbers of bosses 730 (and mechanical fasteners 746) are envisioned herein.

The ribs 732 project inwardly from the inner wall 728 and extend into the cavity 720 along (i.e., in generally parallel relation to) the transverse axis Ta. The ribs 732 are positioned (located) laterally outward of the bosses 730 along the longitudinal axis La and outwardly (externally) of the latch members 706 along the transvers axis Ta, whereby the ribs 732 constrain (i.e., inhibit (if not entirely prevent)) transverse movement of the latch members 706 along (i.e., in generally parallel relation to) the transverse axis Ta.

Although shown as including eight ribs 732i-732viii, it should be appreciated that the particular number of ribs 732 may be altered in various embodiments without departing from the scope of the present disclosure. As such, embodiments of the adapter 700 including both greater and fewer numbers of ribs 732 are envisioned herein. Additionally, although shown as being formed integrally with the body 702 in the illustrated embodiment (i.e., from a single piece of material), embodiments in which the body 702 and the ribs 732 may be formed as separate (discrete) structures are also envisioned herein and would not be beyond the scope of the present disclosure.

The ribs 734 project inwardly (i.e., vertically upward) from a lower (bottom) surface 748 (FIGS. 17, 19, 20) of the body 702 and extend into the cavity 720 along (i.e., in generally parallel relation to) the longitudinal axis La. More specifically, the ribs 734 extend laterally inward from the lateral ends 722, 724 of the body 702 towards (e.g., into engagement (contact) with) the bosses 730 and are positioned below (beneath) the latch members 706.

Although shown as including four ribs 734i-734iv, it should be appreciated that the particular number of ribs 734 may be altered in various embodiments without departing from the scope of the present disclosure. As such, embodiments of the adapter 700 including both greater and fewer numbers of ribs 734 are envisioned herein. Additionally, although shown as being formed integrally with the body 702 in the illustrated embodiment (i.e., from a single piece of material), embodiments in which the body 702 and the ribs 734 may be formed as separate (discrete) structures are also envisioned herein and would not be beyond the scope of the present disclosure.

The supports 736 are generally identical in configuration and project inwardly from the inner wall 728 and extend along (i.e., in generally parallel relation to) the transverse axis Ta. The supports 736 span (i.e., extend across) the cavity 720 and are positioned (located) laterally inward of the bosses 730 along the longitudinal axis La in adjacent (e.g., contacting) relation to the inner magnetic member 718.

As seen in FIGS. 18 and 19, the supports 736 include bearing surfaces 750 and apertures 752.

The bearing surfaces 750 engage (contact) the biasing members 708 to inhibit (if not entirely prevent) relative movement therebetween. More specifically, in the illustrated embodiment, the biasing members 708 are received by (are positioned (located) within) channels 754 that are defined by the bearing surfaces 750. It should be appreciated, however, that the biasing members 708 may (removably or non-removably) engage the supports 736 in any suitable manner. For example, embodiments in which the biasing members 708 and the supports 736 may be connected (secured) together via one or more mechanical fasteners, during manufacturing (e.g., injection molding) of the body 702, etc., are also envisioned herein and would not be beyond the scope of the present disclosure.

The apertures 752 extend (vertically) into the supports 736 and are positioned (located) outwardly (externally) of the bearing surfaces 750. The apertures 752 receive and facilitate connection of the cover plate 704 to the body 702, as described in further detail below.

In the illustrated embodiment, the supports 736 each include a (first) aperture 752*i*, which includes a (first) annular (e.g., circular) configuration, and a (second) aperture 752*ii*, which includes a (second) non-annular (e.g., elliptical) configuration. More specifically, the supports 736 are configured such that aperture 752*i* on the support 736*i* is aligned with the aperture 752*ii* on the support 736*ii* and the aperture 752*ii* on the support 736*i* is aligned with the aperture 752*i* on the support 736*ii*. Embodiments in which the particular number and/or the particular configurations of the apertures 752 may be varied are also envisioned herein, however. For example, the present disclosure envisions embodiments in which the apertures 752 may be uniform (e.g., annular) in configuration as well as embodiments in which each support 736 may include a single aperture 752 only (e.g., the aperture 752*i*).

The drain holes 738 (FIG. 17) extend about an outer periphery 756 of the body 702 and allow for the escape of moisture, water, etc., that may collect within the adapter 700 (e.g., during use in wet or underwater environments). More specifically, the drain holes 738 are formed in the lower surface 748 of the body 702 and extend therethrough into (fluid) communication with the cavity 720.

Although the body 702 is shown as including four drain holes 738*i*-738*iv* that are generally positioned (located) in corner sections thereof, it should be appreciated that the particular number of drain holes 738 and/or the particular locations thereof may be altered in various embodiments without departing from the scope of the present disclosure. As such, embodiments in which the body 702 may include both greater and fewer numbers of drain holes 738 are envisioned herein as are embodiments in which the body 702 may include one or more drain holes 738 that are inset in relation to the outer periphery 756 thereof.

The connector 740 (FIGS. 13, 15) extends outwardly (i.e., vertically downward) from the body 702 and includes a male component 758 that is configured to interface with (i.e., connect to, engage with) a corresponding female component on another product (e.g., the accessory A2) in order to increase usability of the adapter 700. For example, when the adapter 700 is connected to the accessory A2, the adapter 700 and, thus, the accessory A2, can be directly connected to the image capture apparatus 500 via the interconnect mechanism 600, which eliminates any need to disconnect the adapter 700 from the accessory A2 in order to connect the accessory A2 to the image capture apparatus 500, thus improving the overall user experience.

In the illustrated embodiment, the male component 758 includes a pair of protrusions 760 (e.g., fingers 762), which include features that are similar to the aforedescribed protrusions 606 (FIGS. 5-7) on the interconnect mechanism 600 and are reinforced by strengthening members 764 (e.g., ribs 766) that are positioned (located) laterally outward of the protrusions 760 along the longitudinal axis La and/or between the protrusions 760. It should be appreciated, however, that the particular configuration of the connector 740 may be altered in various embodiments in order to facilitate more robust use of the adapter 700 with a wider variety of accessories, products, devices, etc. For example, FIG. 16 illustrates an embodiment of the adapter 700 in which the male component 758 of the connector 740 includes a ball member 768 that is configured for insertion into a corresponding socket.

The cover plate 704 includes: apertures 770; a (first, primary) alignment member 772; (second, secondary) alignment members 774; ribs 776; bosses 778; and (first and second) pedestals 780*i*, 780*ii*.

The apertures 770 (FIG. 18) extend through the cover plate 704 and are generally aligned with the bosses 730 on the body 702. The apertures 770 are configured to receive the mechanical fasteners 746 such that the mechanical fasteners 746 extend therethrough and into the bosses 730 to thereby connect (secure) the cover plate 704 to the body 702.

The alignment member 772 is generally centered on the cover plate 704 along the axes La, Ta (FIG. 15) and provides an initial (rough, macro) alignment function to facilitate proper registration of the adapter 700 and the image capture apparatus 500 (e.g., the interconnect mechanism 600) during connection. The alignment member 772 extends outwardly (i.e., vertically upward) from an outer surface 782 of the cover plate 704 and is configured to interface with the image capture apparatus 500 via insertion into the receptacle 640 (FIG. 13) in the interconnect mechanism 600.

The alignment members 774 are generally centered on the cover plate 704 along the axis La and are positioned (located) outwardly of the alignment member 772 along the transverse axis Ta. More specifically, the alignment members 774 are generally aligned along a (first) reference axis Y1 (FIG. 18), which extends in generally parallel relation to the transverse axis Ta (FIG. 15). The alignment members 774 extend outwardly (i.e., vertically upward) from the outer surface 782 of the cover plate 704 and are configured to interface with the image capture apparatus 500 via insertion into the locating features 646 (FIG. 13) on the mounting platform 626 (i.e., the wings 638) such that the locating features 646 receive the alignment members 774.

The alignment members 774 are generally identical in configuration and provide a subsequent (precision, micro) alignment function to further facilitate proper registration of the adapter 700 and the image capture apparatus 500 (e.g., the interconnect mechanism 600) during connection. Additionally, the alignment members 774 provide an anti-rotation function that inhibits (if not entirely prevents) relative rotation between the adapter 700 and the image capture apparatus 500 upon connection.

As seen in FIGS. 18 and 20, the alignment member 772 and the alignment members 774 are non-identical. More specifically, the alignment member 772 includes a first configuration and define a first (vertical) height H1, and the alignment members 774 each include a second configuration, which is different than the first configuration, and define a second (vertical) height H2, which is less than the first height H1. More specifically, in the illustrated embodiment, the alignment member 772 includes an annular (e.g., circular) transverse cross-sectional configuration, and the alignment members 774 each include a non-annular (e.g., elliptical) transverse cross-sectional configuration. It is envisioned, however, that the particular configurations of the alignment member 772 and/or the alignment members 774 may be varied in alternate embodiments without departing from the scope of the present disclosure (e.g., depending upon the particular configurations of the receptacle 640 and the locating features 646 on the interconnect mechanism 600). For example, embodiments in which the alignment members 772, 774 may include generally identical (annular or non-annular) configurations are also envisioned herein and would not be beyond the scope of the present disclosure.

The ribs 776 (FIGS. 17, 20) project inwardly (i.e., vertically downward) from an inner surface 784 of the cover plate 704 and extend into the cavity 720 along (i.e., in generally parallel relation to) the longitudinal axis La. The ribs 776 cooperate with the ribs 734 (FIGS. 19, 20) to constrain (i.e., inhibit (if not entirely prevent)) vertical movement of the latch members 706 (in opposite directions V1, V2), as seen in FIG. 20, whereby the ribs 732, 734, 776 collectively confine the latch members 706 to movement along (i.e., in generally parallel relation to) the longitudinal axis La.

Although shown as including four ribs 776i-776iv that are generally positioned (located) in corner sections of the cover plate 704, it should be appreciated that the particular number of ribs 776 and/or the particular locations thereof may be altered in various embodiments without departing from the scope of the present disclosure (e.g., depending upon the particular configuration of the body 702). As such, embodiments of the cover plate 704 including both greater and fewer numbers of ribs 776 are envisioned herein. Additionally, although shown as being formed integrally with the cover plate 704 in the illustrated embodiment (i.e., from a single piece of material), embodiments in which the cover plate 704 and the ribs 776 may be formed as separate (discrete) structures are also envisioned herein and would not be beyond the scope of the present disclosure.

The bosses 778 project inwardly (i.e., vertically downward) from the inner surface 784 of the cover plate 704 and extend into the cavity 720 defined by the body 702. The bosses 778 are generally aligned with the ribs 776 and are positioned (located) therebetween (along the axis Ta). More specifically, in the illustrated embodiment, the cover plate 704 includes a (first) boss 778i that is positioned (located) between the ribs 776i, 776ii and a (second) boss 778ii that is positioned (located) between the ribs 776iii, 776iv.

The bosses 778 receive (accommodate) the outer magnetic members 716 in order to connect (secure) the outer magnetic members 716 to the cover plate 704. More specifically, in the illustrated embodiment, the outer magnetic members 716 are adhesively connected to (secured within) the bosses 778. Embodiments in which the outer magnetic members 716 may be mechanically connected to (secured within) the bosses 778, either in addition to or instead of an adhesive connection, are also envisioned herein, however, and would not be beyond the scope of the present disclosure.

As seen in FIG. 17, the bosses 778 each include a generally D-shaped configuration. More specifically, each boss 778 defines an outer wall 786, which includes an arcuate (curved, non-linear) configuration, and an inner wall 788, which includes a generally linear configuration and extends in generally orthogonal (perpendicular) relation to the longitudinal axis La (FIG. 15) and in generally parallel relation to the transverse axis Ta.

The pedestals 780 are positioned (located) laterally between the bosses 778 along the longitudinal axis La on opposite sides of the inner magnetic member 718 and include: opposite (first and second) ends 790, 792; reliefs 794; (first and second) locating members 796i, 796ii (e.g., pins 798); a (first) foot 800i; and a (second) foot 800ii. The pedestals 780 engage (contact) the supports 736 on the body 702, as described in further detail below, and are configured to provide a predetermined clearance between the cover plate 704 (i.e., the ribs 776) and the latch members 706 to allow for repositioning thereof, which is described in further detail below.

The reliefs 794 are configured in correspondence with the bearing surfaces 750 (FIGS. 18, 19) on the supports 736. More specifically, the reliefs 794 define inner, arcuate (curved) profiles (contours) 802 (FIG. 17) that correspond to (mirror, match) outer, arcuate (curved) profiles (contours) 804 (FIG. 18) defined by the bearing surfaces 750. As such, upon connection of the cover plate 704 to the body 702, the bearing surfaces 750 extend into and are received (accommodated) by the reliefs 794, whereby the pedestals 780 overlie the supports 736.

The locating members 796 extend outwardly (i.e., vertically downward) from the pedestals 780 and are configured for insertion into the apertures 752 (FIGS. 18, 19) in the supports 736, whereby the locating members 796 and the apertures 752 collectively facilitate proper location (alignment, registration) of the cover plate 704 in relation to the body 702. More specifically, in the illustrated embodiment, the locating member 796 on the pedestal 780i is positioned (located) at (adjacent to) the end 790 thereof, and the locating member 796 on the pedestal 780ii is positioned (located) at (adjacent to) the end 792 thereof. Positioning the locating members 796 at the respective ends 790, 792 of the pedestals 780i, 780ii allows for flexibility during assembly of the adapter 700 by supporting connection of the cover plate 704 in the orientation shown or in an orientation that is rotated 180 degrees (about the alignment member 772).

In the illustrated embodiment, each pedestal 780 includes a single locating member 796. Embodiments in which the particular number of locating members 796 included on the cover plate 704 may be varied are also envisioned herein, however (e.g., depending upon the particular configuration of the body 702). For example, embodiments in which the pedestals 780 may each include a pair of locating members 796 would not be beyond the scope of the present disclosure.

The foot 800i and the foot 800ii are configured for engagement (contact) with the supports 736 and define ends 806 that include generally planar configurations, which increases the stability of the cover plate 704 in relation to the body 702 and inhibits (if not entirely prevents) unintended relative movement therebetween (e.g., rattle). More specifically, in the illustrated embodiment, the foot 800i is positioned (located) at (adjacent to) the end 792 of the pedestal 780i (i.e., opposite to the locating member 796i), and the foot 800ii is positioned (located) at (adjacent to) the end 790 of the pedestal 780i (i.e., opposite to the locating member

796*ii*), whereby the foot 800*i* and the foot 800*ii* are positioned in general alignment with the locating members 796*ii*, 796*i* along the longitudinal axis La, respectively.

The latch members 706 (FIGS. 18, 19) extend laterally inward into the body 702 along the longitudinal axis La and include body portions 808; latches 810; and extensions 812. The latch members 706 are configured to for releasable engagement with (connection to) the interconnect mechanism 600 when the interconnect mechanism 600 is in the collapsed configuration (FIGS. 5, 6, 13). More specifically, as described in further detail below, the latch members 706 are repositionable in relation to the body 702 along an axis of movement M (FIG. 19) such that the adapter 700 is reconfigurable between an engaged (normal) configuration (FIG. 25), in which the latch members 706 are positioned for engagement (contact) with the latching features 628 (FIGS. 8, 10) on the base plate 602 to thereby releasably connect the adapter 700 to the image capture apparatus 500, and a disengaged (subsequent) configuration (FIG. 25), in which the latch members 706 are disengaged from the latching features 628 and are positioned to permit disconnection of the adapter 700 from the image capture apparatus 500. More specifically, the adapter 700 is configured such that the axis of movement LM extends in generally parallel relation to the longitudinal axis La (FIG. 15) and in generally orthogonal relation to the transverse axis Ta and the alignment members 772, 774.

The body portions 808 support the latches 810 and the extensions 812 and define chambers 814, which are positioned (located) between the latches 810 and the extensions 812. As seen in FIG. 22, upon assembly of the adapter 700, the chambers 814 receive (accommodate) the bosses 778 and the outer magnetic members 716 such that the bosses 778 and the outer magnetic members 716 extend into the chambers 814.

When the adapter 700 is in the engaged configuration, the latch members 706 are positioned such that inner (vertical) walls 816 (FIG. 22) thereof, which are oriented towards (face into) the chambers 814, engage (contact) the inner walls 788 defined by the bosses 778, as seen in FIGS. 22, 26, and 28. The inner walls 788, 816 thus collectively define hard stops 818 (FIG. 22) that limit travel of the latch members 706 laterally outward. When the adapter 700 is in the disengaged configuration, however, the inner walls 788, 816 are separated (spaced apart) along the longitudinal axis La, as seen in FIG. 27.

The latches 810 extend outwardly from the body portions 808 along the longitudinal axis La in opposite directions. The latches 810 interface with (engage, contact) the interconnect mechanism 600 and are configured for removable insertion into the receiving spaces 660 (FIGS. 26, 27) during connection and disconnection of the adapter 700 and corresponding reconfiguration between the engaged and disengaged configurations. More specifically, when the adapter 700 is connected to the image capture apparatus 500 (i.e., when the adapter is in the engaged configuration), the latches 810 are positioned (located) within (are received by) the receiving spaces 660 and engage the hook members 658 to thereby secure the adapter 700 in relation to the interconnect mechanism 600, as seen in FIG. 28. Conversely, when the adapter 700 is disconnected from the image capture apparatus 500 (i.e., when the adapter 700 in the disengaged configuration), the latches 810 are removed from the receiving spaces 660 and are disengaged from the hook members 658 to thereby permit separation of the adapter 700 from the interconnect mechanism 600, as seen in FIG. 27.

Although shown as extending laterally outward (i.e., away from the alignment member 772), embodiments in which the latches 810 may extend laterally inward (i.e., towards the alignment member 772) are also envisioned herein (e.g., depending upon the particular configuration of the interconnect mechanism 600) and would not be beyond the scope of the present disclosure.

As seen in FIGS. 22 and 26-28, the latches 810 define bearing surfaces 820 and engagement surfaces 822, which correspond in configuration to the bearings surfaces 662 and the engagement surfaces 664 defined by the hook members 658, respectively. More specifically, the bearing surfaces 820 and the engagement surfaces 822 are each tapered (angled, chamfered, beveled) in configuration, which facilitates engagement (contact) with the bearings surfaces 662 and the engagement surfaces 664, respectively, during connection and disconnection of the adapter 700, as described in further detail below.

The extensions 812 (FIGS. 18, 19) extend laterally inward from the body portions 808 along the longitudinal axis La. More specifically, the extensions 812 extend towards the supports 736 on the body 702 (and each other) in opposite directions. The extensions 812 are configured for insertion into the biasing members 708, which facilitates engagement (contact) therebetween.

In the illustrated embodiment, the extensions 812 include annular (e.g., circular) transverse cross-sectional configurations. It should be appreciated, however, that the particular configurations of the extensions 812 may be varied in alternate embodiments without departing from the scope of the present disclosure (e.g., depending upon the particular configuration of the biasing members 708). As such, embodiments in which the extensions 812 may include non-annular (e.g., polygonal) or irregular transverse cross-sectional configurations are also envisioned herein.

The biasing members 708 are generally aligned along the longitudinal axis La and are positioned (located) between the latch members 706 and the supports 736. More specifically, the biasing members 708 include (first) ends 824, which engage (contact) the supports 736 via positioning within the channels 754, and opposite (second) ends 826, which receive the extensions 812 on the latch members 706.

It is envisioned that the biasing members 708 may be connected (secured) to (or otherwise supported by) the latch members 706 and/or the supports 736 in any manner suitable for the intended purpose of inhibiting (if not entirely preventing) relative movement therebetween. For example, embodiments in which the biasing members 708 may be connected (secured) to the supports 736 and/or the extensions 812 via one or more mechanical fasteners, during manufacturing (e.g., injection molding) of the body 702, etc., are envisioned herein and would not be beyond the scope of the present disclosure.

The biasing members 706 are subject to preloaded biasing forces B (FIG. 19), which act upon the latch members 706 and the supports 736. The biasing forces B are directed laterally outward along the longitudinal axis La (i.e., towards the latches 810) and not only facilitate reconfiguration of the adapter 700 between the engaged and disengaged configurations, but bias the adapter 700 towards the engaged configuration, as described in further detail below.

The tactile members 712 are secured (connected) to the latch members 706 and facilitate the (manual) application of force thereto that is directly laterally inward along the longitudinal axis La (i.e., towards the supports 736) in order to reconfigure the adapter 700 from the engaged configuration into the disengaged configuration.

In the illustrated embodiment, the latch members 706 and the tactile members 712 are configured as separate (discrete) components of the adapter 700. More specifically, the latch members 706 include (i.e., are formed from) a first material of construction (e.g., a metallic material, such as steel), and the tactile members 712 include (i.e., are formed from) a second material of construction (e.g., a non-metallic material, such as a plastic, a polymer, a composite, etc.), which reduces the overall weight of the adapter 700. Embodiments in which the latch members 706 and the tactile members 712 may be integral (e.g., unitarily, monolithically) formed (i.e., from a single piece of metallic or non-metallic material) are also envisioned herein, however, and would not be beyond the scope of the present disclosure.

The outer magnetic members 716 are generally identical and are positioned (located) within the bosses 778, as indicated above, whereby the outer magnetic members 716 are positioned (located) laterally outward of the inner magnetic member 718 and the pedestals 780 along the longitudinal axis La.

The outer magnetic members 716 each define opposite first (e.g., North) and second (e.g., South) poles N2, S2 (FIGS. 17, 26-28) and are oriented to define a second polarity, which is opposite to the first polarity defined by the magnetic members 604 on the interconnect mechanism 600. More specifically, the outer magnetic members 716 are oriented such that the poles S2 face outwardly (i.e., towards the image capture apparatus 500). The opposite polarities of the magnetic members 604, 716 facilitates a magnetic connection between the interconnect mechanism 600 and the adapter 700, which not only provides an interface between the image capture apparatus 500 and the adapter 700 but facilitates proper registration of the image capture apparatus 500 and the adapter 700 during connection. Additionally, the shared (common) polarities of the outer magnetic members 716 further supports connection of the cover plate 704 in the orientation shown or in an orientation that is rotated 180 degrees (about the alignment member 772).

In the illustrated embodiment, the adapter 700 includes a pair of (first and second) outer magnetic members 716*i*, 716*ii*. Embodiments in which the particular number of outer magnetic members 716 may be varied are also envisioned herein, however (e.g., depending upon the particular configuration of the interconnect mechanism 600, the body 702 of the adapter 700, etc.).

The inner magnetic member(s) 718 are connected (secured) to the cover plate 704, which may be achieved in any suitable manner. For example, it is envisioned that the inner magnetic member(s) 718 may be connected (secured) to the inner surface 784 of the cover plate 704 and/or to the pedestals 780 via an adhesive, via double-sided tape, via one or more mechanical fasteners, etc.

The inner magnetic members 718 are positioned (located) between the pedestals 780 and the outer magnetic members 716. More specifically, the inner magnetic member(s) 718 and the outer magnetic members 716 are generally aligned along a (second) reference axis Y2 (FIG. 17), which extends in generally parallel relation to the longitudinal axis La (FIG. 15) and in generally orthogonal (perpendicular) relation to the (first) reference axis Y1 (FIG. 18).

The inner magnetic member(s) 718 define opposite first (e.g., North) and second (e.g., South) poles N3, S3 and are oriented to define a third polarity, which mirrors the first polarity defined by the magnetic members 604 on the interconnect mechanism 600 and is opposite to the second polarity defined by the outer magnetic members 716. More specifically, the inner magnetic member 718 is oriented such that the poles N3 face outwardly (i.e., towards the image capture apparatus 500), which provides an interface and a magnetic connection between the adapter 700 (i.e., the inner magnetic member(s) 718) and the interconnect mechanism 600 (i.e., the base plate 602).

Additionally, the orientation of the North poles N1, N3 in facing relation imparts a self-centering function to the adapter 700 that further facilitates proper registration with the image capture apparatus 500. More specifically, upon approximation of the image capture apparatus 500 and the adapter 700, the magnetic members 604*i*, 604*ii* on the interconnect mechanism 600 interact with the inner magnetic member(s) 718 so as to generate generally equivalent repelling magnetic forces M1, M2 (FIG. 26), respectively. As seen in FIG. 26, the repelling magnetic forces M1, M2 are directed in generally opposite lateral directions, thereby balancing each other and centering the adapter 700 in relation to the interconnect mechanism 600.

In the illustrated embodiment, the adapter 700 includes a single inner magnetic member 718. Embodiments in which the particular number of inner magnetic members 718 may be varied are also envisioned herein, however (e.g., depending upon the particular configuration of the interconnect mechanism 600, the body 702 of the adapter 700, etc.). For example, embodiments in which the adapter 700 may each include two or more inner magnetic members 718 would not be beyond the scope of the present disclosure.

As seen in FIG. 17, the outer magnetic members 716 and the inner magnetic member 718 are non-identical. More specifically, the outer magnetic members 716 each includes a first configuration, and the inner magnetic member 718 includes a second configuration that is different than the first configuration.

In the illustrated embodiment, the outer magnetic members 716 include annular (e.g., circular) transverse cross-sectional configurations defining a first surface area, and the inner magnetic member 718 includes a non-annular (e.g., polygonal) transverse cross-sectional configuration defining a second surface area that is larger than the first surface area. More specifically, the inner magnetic member 718 defines a generally rectangular transverse cross-sectional configuration, which approximates an outer periphery 692 (FIG. 8) defined by the generally cruciform configuration of the mounting platform 626, which increases contact therewith in order to further supporting magnetic connection of the adapter 700 to the interconnect mechanism 600. It is envisioned, however, that the particular configurations of the outer magnetic members 716 and/or the inner magnetic member 718 may be varied in alternate embodiments without departing from the scope of the present disclosure (e.g., depending upon the necessary or desired magnetic forces, the particular configurations of the magnetic members 604 on the interconnect mechanism 600, the particular configuration of the body 702, etc.). For example, embodiments in which the outer magnetic members 716 and the inner magnetic member 718 may include identical annular or non-annular configurations are also envisioned herein and would not be beyond the scope of the present disclosure.

With general reference now to FIGS. 26-28, connection of the adapter 700 to the image capture apparatus 500 and disconnection of the adapter 700 from the image capture apparatus 500 will be discussed.

As seen in FIG. 26, during connection, the adapter 700 is advanced towards the image capture apparatus 500 along a direction of connection Dc with the adapter 700 in the engaged configuration, and the alignment member 772 is inserted into the receptacle 640 on the interconnect mechanism 600, which provides an initial (rough, macro) alignment between the adapter 700 and the image capture apparatus 500, as indicated above.

Continued advancement of the adapter 700, causes engagement of (contact between) the bearing surfaces 662, 820 respectively included on the hook members 658 and the latches 810, whereby the latch members 706 are deflected laterally inward (i.e., towards each other) along the longitudinal axis La (FIG. 15) and the adapter 700 is reconfigured from the engaged configuration towards the disengaged configuration. During reconfiguration of the adapter 700 from the engaged configuration towards the disengaged configuration, the bearing surfaces 820 traverse the bearing surfaces 662, and the biasing members 708 are compressed between the latch members 706 and the supports 736, thereby increasing the biasing forces B (FIG. 19).

As the latches 810 are advanced beyond the hook members 658 in the direction of connection Dc, the inner magnetic member 718 is brought into general alignment and adjacency with the mounting platform 626, the outer magnetic members 716 are brought into general alignment and adjacency with the magnetic members 604, the alignment members 774 (FIG. 18) are brought into general alignment with the locating features 646 (FIG. 13), and the latches 810 are brought into general alignment with the receiving spaces 660, which is facilitated by the self-centering function of the adapter 700.

As seen in FIG. 27, upon alignment of the latches 810 with the receiving spaces 660, the latch members 706 are deflected laterally outward as the adapter 700 is automatically reconfigured into the engaged configuration under the influence of the biasing forces B (FIG. 19), whereby the latches 810 are inserted into the receiving spaces 660. Insertion of the latches 810 into the receiving spaces 660 results in alignment and of and engagement (contact) between the engagement surfaces 664, 822 and connection of the adapter 700 to the image capture apparatus 500. Connection of the adapter 700 to the image capture apparatus 500 is further supported and supplemented by the magnetic attraction between the outer magnetic members 716 and the magnetic members 604 and the magnetic attraction between the inner magnetic member 718 and the base plate 602 (i.e., the mounting platform 626), which inhibits (if not entirely prevents) inadvertent disconnection of the adapter 700 from the image capture apparatus 500 (e.g., in the event of accidental or unwanted deflection of the latch members 706 resulting from a drop, contact with an external object, etc.).

During disconnection of the adapter 700, force is (manually) applied to the latch members 706 (i.e., via the tactile members 712) to thereby deflect the latch members 706 laterally inward and reconfigure the adapter 700 from the engaged configuration into the disengaged configuration. As the adapter 700 is reconfigured from the engaged configuration into the disengaged configuration, the engagement surfaces 664, 822 are disengaged (separated) and the biasing members 708 are compressed between the latch members 706 and the supports 736, thereby increasing restoring the biasing forces B.

A (vertically downward) force can then be applied to the adapter 700 (e.g., via the tactile members 712), which separates the inner magnetic member 718 from the base plate 602 (i.e., the mounting platform 626), separates the outer magnetic members 716 from the magnetic members 604, and removes the alignment members 772, 774 from the receptacle 640 and the locating features 646, respectively.

Upon separation of the adapter 700 from the image capture apparatus 500, the latch members 706 are deflected laterally outward as the adapter 700 is automatically reconfigured into the engaged configuration under the influence of the biasing forces B.

Figures 29, 30:
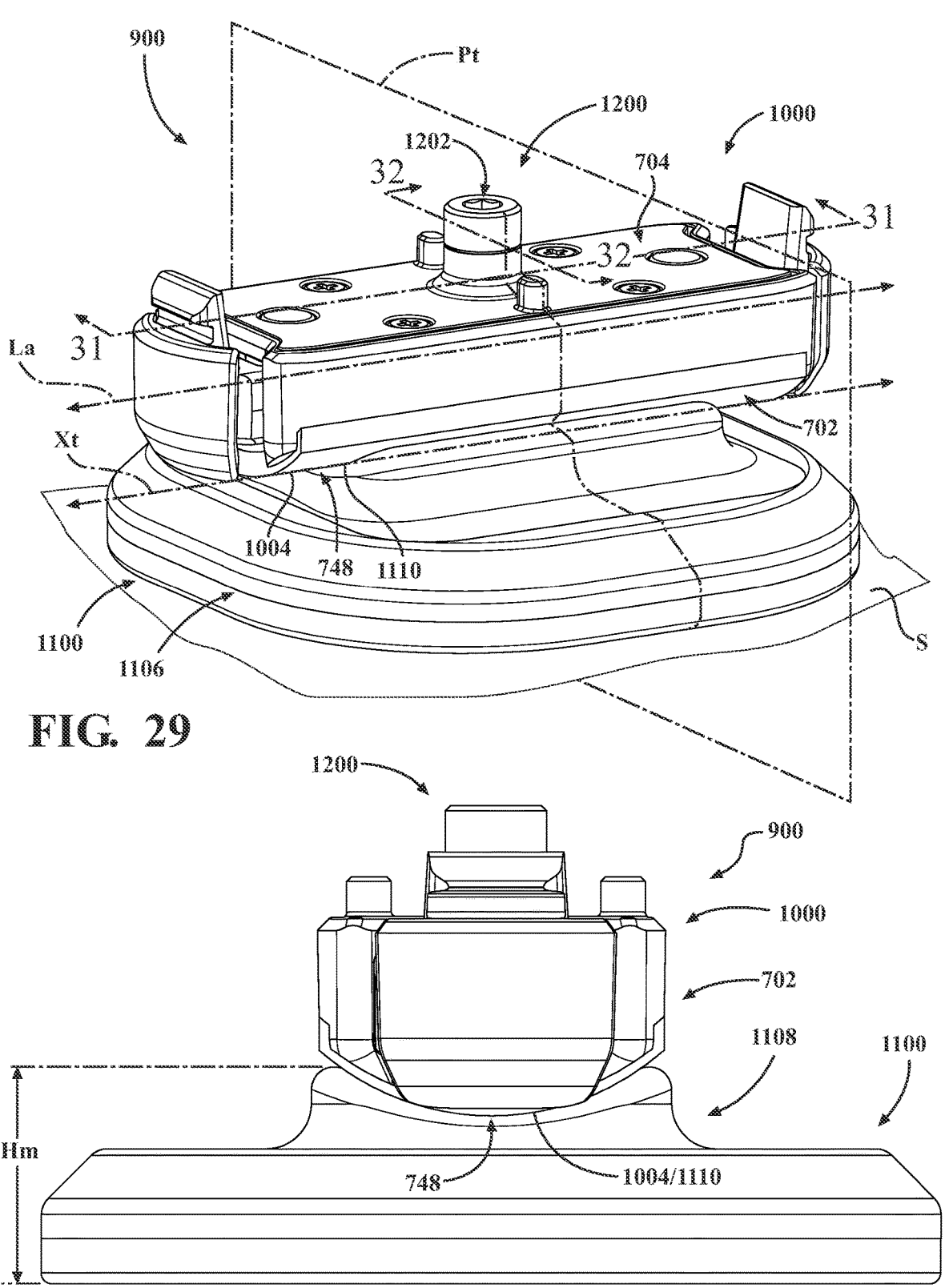
FIG. 29 is a top, perspective view of a mounting system according to the principles of the present disclosure, which includes: another example of the adapter; a mount; and a fastener.
FIG. 30 is a side, plan view of the mounting system.
Figure 31:
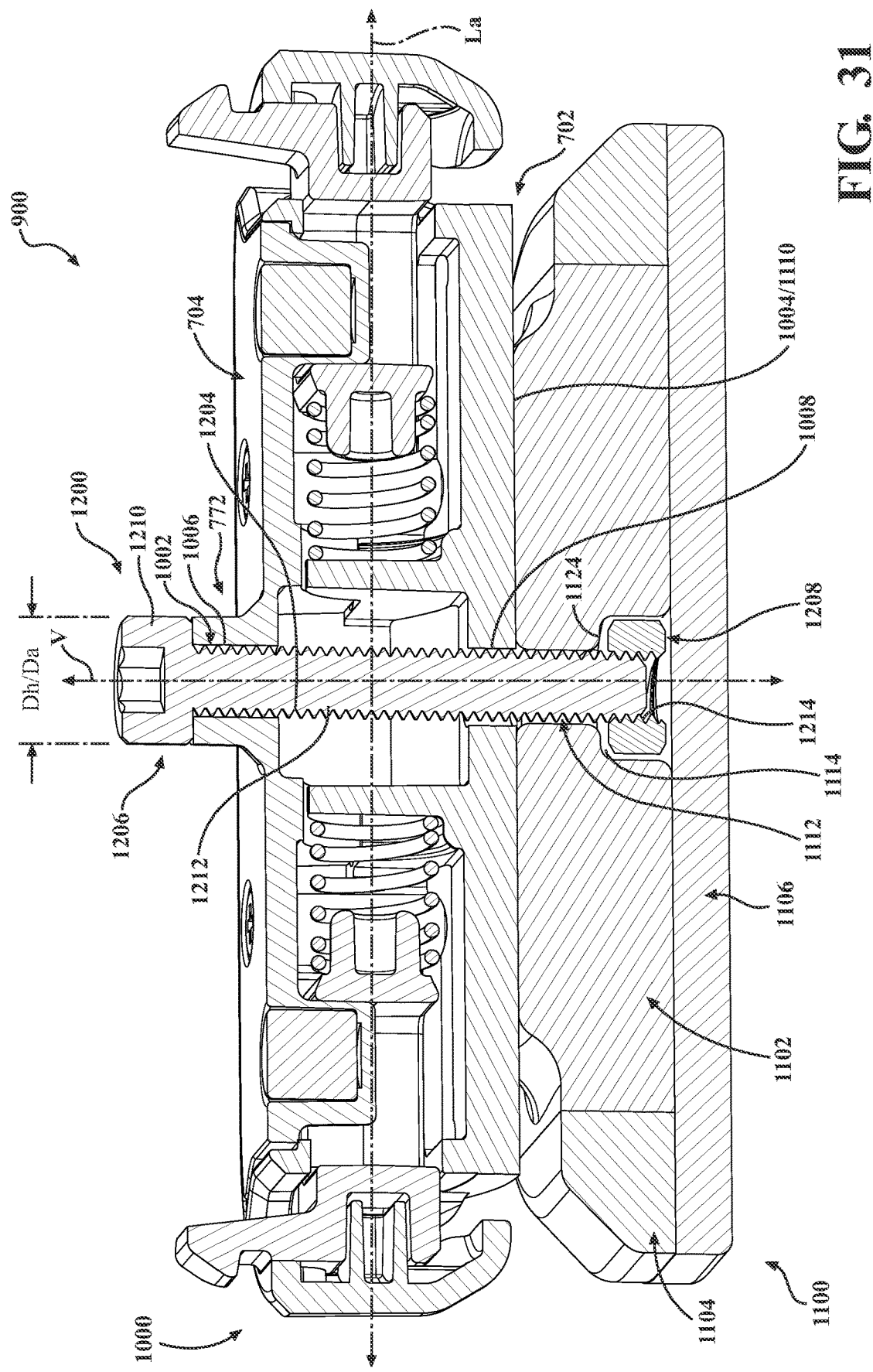
FIG. 31 is a cross-sectional view taken along line 31-31 in FIG. 29.
Figure 32:
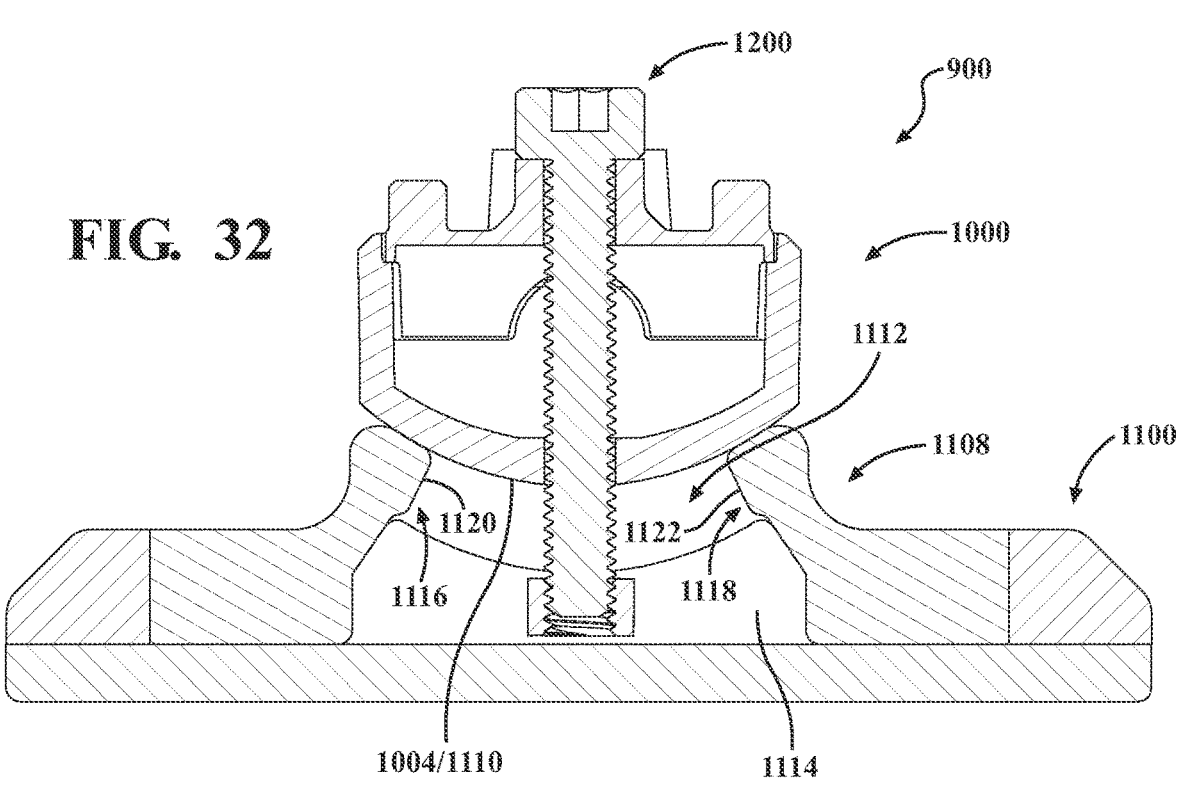
FIG. 32 is a cross-sectional view taken along line 32-32 in FIG. 29.
Figure 33:
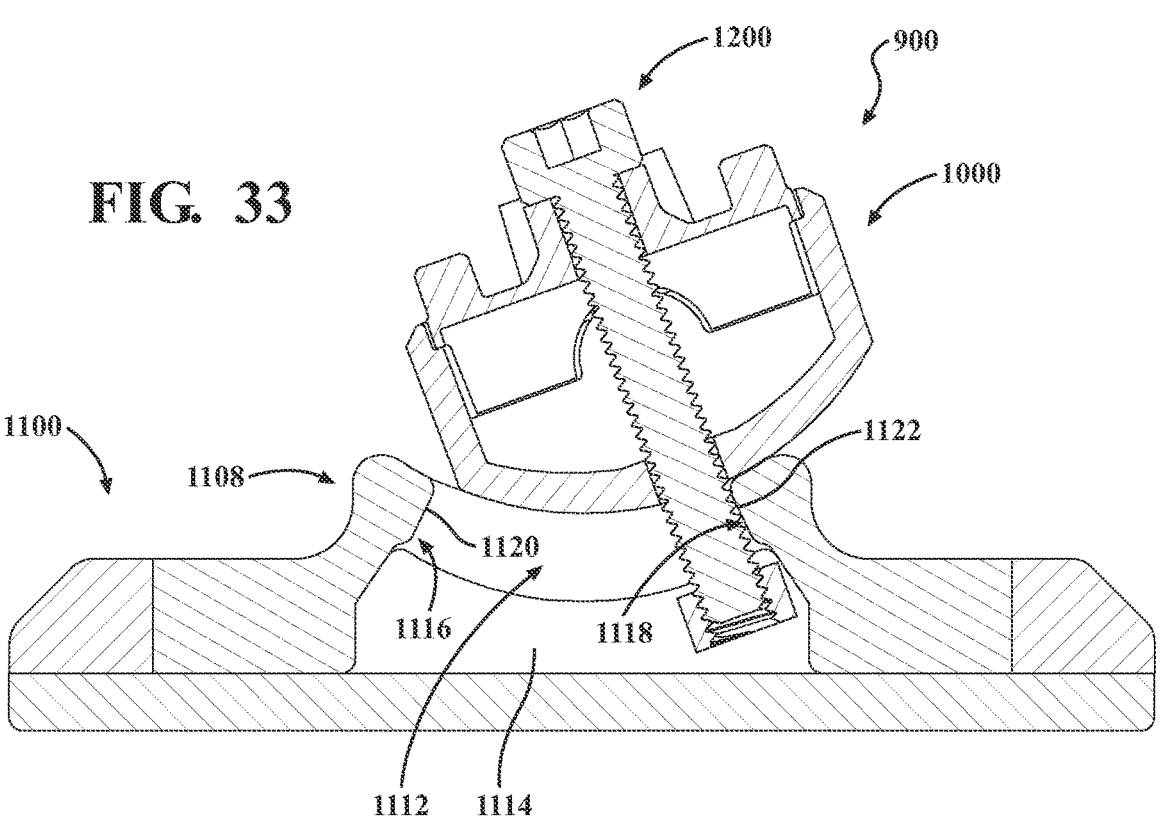
FIGS. 33 and 34 are cross-sectional views of the mounting system illustrating repositioning (e.g., tilting) of the adapter seen in FIG. 29 in relation to the mount.
Figures 34, 35:
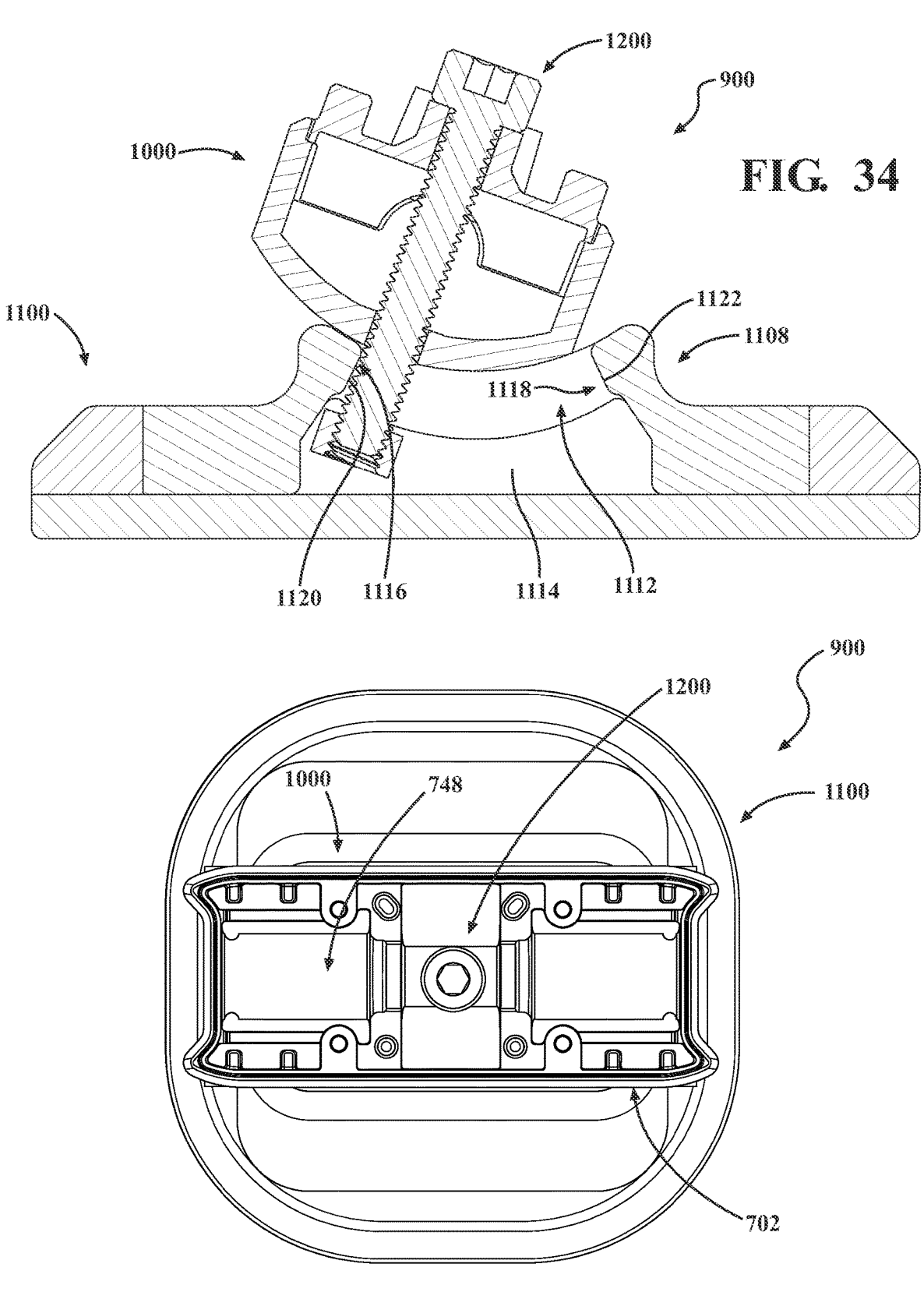
FIG. 35 is a partial, top, plan view of the mounting system.
Figure 36:
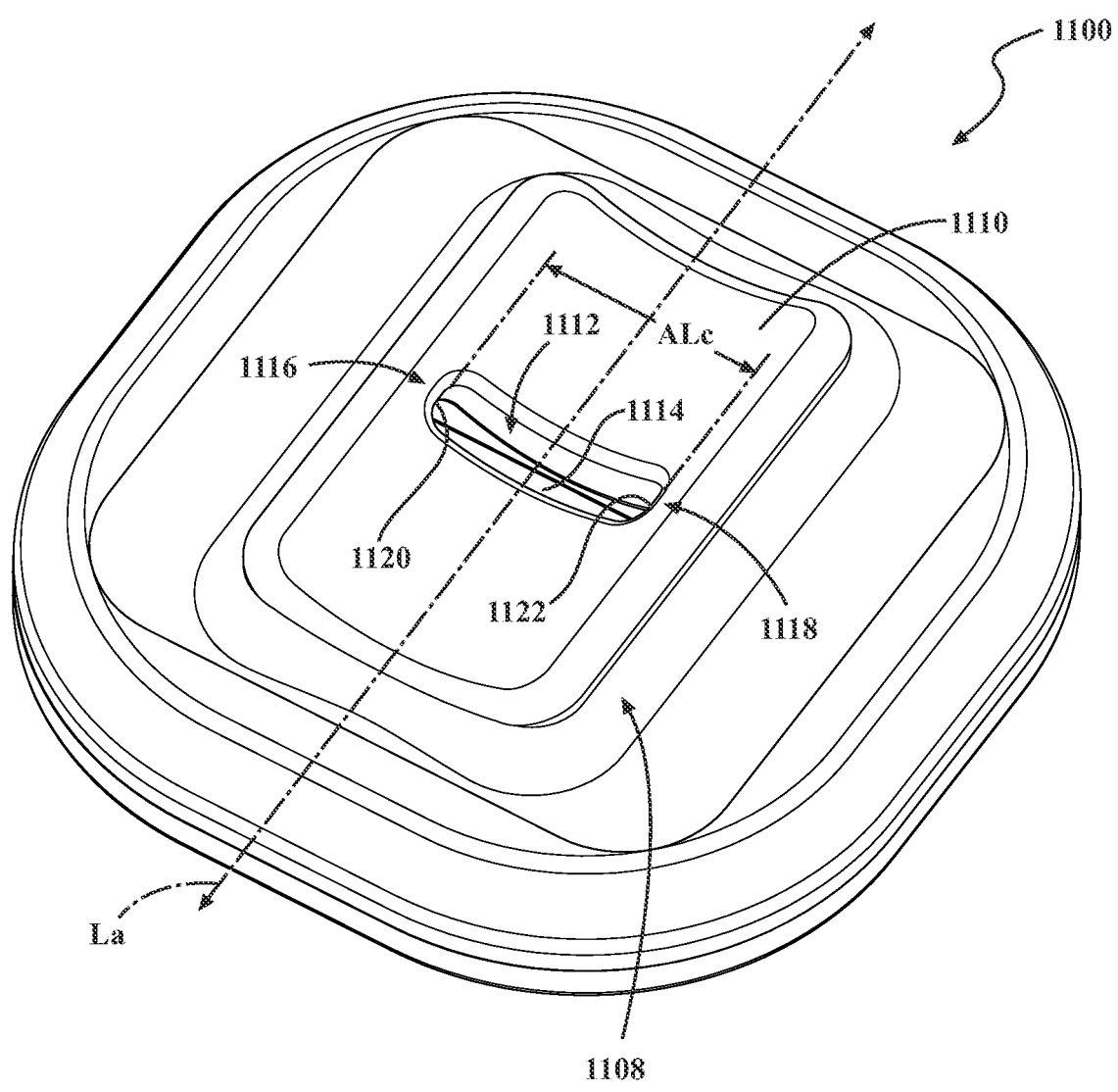
FIG. 36 is a top, perspective view of the mount.

With reference now to FIGS. 29-36, a mounting system 900 will be discussed, which includes: an adapter 1000; a mount 1100; and a fastener 1200 (e.g., an Allen screw 1202), which extends through the adapter 1000 and into the mount 1100. More specifically, FIG. 29 is a top, perspective view of the mounting system 900; FIG. 30 is a side, plan view of the mounting system 900; FIG. 31 is a cross-sectional view taken along line 31-31 in FIG. 29; FIG. 32 is a cross-sectional view taken along line 32-32 in FIG. 29; FIGS. 33 and 34 are cross-sectional views of the mounting system illustrating repositioning (e.g., tilting) of the adapter 1000 in relation to the mount 1100; FIG. 35 is a partial, top, plan view of the mounting system 900; and FIG. 36 is a top, perspective view of the mount 1100.

Although the mounting system 900 is generally illustrated as being configured for use with the image capture apparatus 500 (FIGS. 5-7), it is envisioned that the mounting system 900 may be configured for use with a wide variety of image capture apparatuses including, for example, the image capture apparatus 200 (FIGS. 2A, 2B), the image capture apparatus 300 (FIG. 3), the image capture apparatus 400 (FIG. 4), etc.

The adapter 1000 includes features that are similar to the adapter 700 (FIGS. 13-28) discussed above and, accordingly, will only be discussed with respect to differences therefrom in the interest of brevity. As such, identical reference characters will be utilized to refer to elements, structures, features, etc., common to the adapters 1000, 700.

The adapter 1000 includes a passageway 1002 (FIG. 31) and a (first, lower) mating surface 1004 (FIGS. 29-31).

The passageway 1002 is configured to receive the fastener 1200 and extends (vertically) through the cover plate 704 and the body 702. More specifically, the passageway 1002 extends through the alignment member 772 along an axis V (FIG. 31) that is oriented in generally orthogonal relation to the longitudinal axis La.

Although configured as an unthreaded through-bore 1006 in the illustrated embodiment, embodiments are also envisioned in which the passageway 1002 may include internal threading that corresponds to external threading 1204 on the fastener 1200 in order to facilitate threaded engagement of (contact between) the fastener 1200 and the adapter 1000.

The mating surface 1004 is defined by the lower surface 748 (FIGS. 17, 20, 29, 30) of the body 702 and includes an arcuate (curved) configuration with a generally U-shaped transverse cross-sectional configuration that extends about the longitudinal axis La. As seen in FIG. 31, the mating surface 1004 defines an aperture 1008 that is configured to receive the fastener 1200, as described in further detail below.

The mount 1100 is configured for releasable connection to the adapter 1000 (i.e., via the fastener 1200) and includes: a (first) inner body portion 1102 (FIG. 31); a (second) outer body portion 1104, which extends about (circumscribes) and receives the inner body portion 1102 (i.e., such that the inner body portion 1102 is embedded within the outer body portion 1104); and a base 1106, which is secured to the outer body portion 1104. As described in further detail below, the mount 1100 is configured for connection to a variety of attachment surfaces S (FIG. 29) including, for example, a vehicle, a surfboard, a wearable accessor (e.g., a helmet), etc.

The mount 1100 defines a height Hm (FIG. 30) and includes a multi-material construction. More specifically, the inner body portion 1102 includes (i.e., is formed from) one or more rigid (first) materials, the outer body portion 1104 includes (i.e., is formed form) one or more flexible (second) materials, and the base 1106 includes (i.e., is formed from) one or more (third) adhesive (sticky, tacky) materials, which releasably secures the mount to the attachment surface S. Forming the inner body portion 1102 from one or more rigid materials increases the strength (stability) of the mount 1100, and forming the outer body portion 1104 from one or more flexible materials allows the mount 1100 to contour (conform) to (mirror) the configuration of both linear and non-linear (e.g., curved) attachment surfaces S.

It is envisioned that the mount 1100 may be manufactured using any suitable method or process. For example, in one particular embodiment, it is envisioned that the inner body portion 1102 and the outer body portion 1104 may be co-molded, and that the base 1106 may be adhesively secured to the outer body portion 1104.

In the illustrated embodiment, the mount 1100 is configured such that the height Hm lies substantially within the range of approximately 10 mm to approximately 30 mm (e.g., approximately 15 mm). Additionally, the mount 1100 is configured such that the inner body portion 1102 includes a rigid plastic, the outer body portion includes nylon, and the base 1106 include an acrylic polymer (e.g., VHB tape). Embodiments in which the height Hm and/or the particular materials utilized in construction of the mount 1100 may be varied would not be beyond the scope of the present disclosure. For example, embodiments in which the inner body portion 1102 and the outer body portion 1104 may include the same material(s) are also envisioned herein as are embodiments in which the base 1106 may be configured to form a vacuum with the attachment surface S (i.e., via suction).

The inner body portion 1102 includes a column 1108, which extends vertically therefrom (i.e., towards the adapter 1000) along the height Hm of the mount 1100 and receives and supports the adapter 1000 such that the adapter 1000 is repositionable (movable, tiltable) in relation to the mount 1100, as described in further detail below. The column 1108 defines: a (second, upper) mating surface 1110 (FIGS. 29, 30, 32, 36); a channel 1112, which is formed in the mating surface 1110; and an interior chamber 1114.

The mating surface 1110 is configured in correspondence with the mating surface 1004 defined by the adapter 1000. More specifically, the mating surface 1110 includes an arcuate (curved) configuration with a generally U-shaped transverse cross-sectional configuration that extends about the longitudinal axis La and mirrors that defined by the mating surface 1004. As such, upon connection of the adapter 1000 and the mount 1100, the mating surfaces 1004, 1110 are positioned in adjacent, contacting relation, which facilitates reconfiguration of the mounting system 900 via repositioning (movement) of the adapter 1000 in relation to the mount 1100 through an arcuate range of motion. As described in further detail below, during reconfiguration of the mounting system 900, the adapter 1000 and, thus, the image capture apparatus 500, are tiltable (articulable) about a single (tilt) axis Xt (FIG. 29), which extends in generally parallel relation to the longitudinal axis La, and through a single (tilt) plane Pt, which extends in generally orthogonal relation to the longitudinal axis La, to thereby vary the orientation of the image capture apparatus 500.

In certain embodiments, it is envisioned that the mounting system 900 may be configured to secure the adapter 1000 in a variety of discrete angular positions. For example, it is envisioned that the adapter 1000 and the mount 1100 may include corresponding recesses that are configured to receive indexing members (e.g., rollers or the like).

The channel 1112 is generally aligned with the aperture 1008 in the mating surface 1004 along the longitudinal axis La, as seen in FIG. 31, and extends in generally orthogonal relation to the longitudinal axis La, as seen in FIG. 36. The channel 1112 is configured to receive the fastener 1200 such that the fastener 1200 is movable therethrough during repositioning of the adapter 1000 (i.e., tilting of the adapter 1000 and the image capture apparatus 500 in relation to the mount 1100).

The channel 1112 includes respective (first and second) ends 1116, 1118 (FIGS. 32-34, 36), which define respective (first and second) stops 1120, 1122. As seen in FIGS. 33 and 34, each of the stops 1120, 1122 is configured for engagement (contact) with the fastener 1200 in order to limit travel of the fastener 1200 and, thus, the adapter 1000 and the image capture apparatus 500, in relation to the mount 1100. The channel 1112 (i.e., the stops 1120, 1122) thus define the range of relative motion between the adapter 1000 and the mount 1100, which corresponds to an arc length ALc (FIG. 36) of the channel 1112.

In the illustrated embodiment, the mount 1100 is configured such that the arc length ALc lies substantially within the range of approximately 45 degrees to approximately 135 degrees. Embodiments in which the mount 1100 may be configured such that the arc length ALc lies outside of the disclosed range are also envisioned herein, however, and would not be beyond the scope of the present disclosure.

The interior chamber 1114 is generally aligned with the aperture 1008 and the channel 1112 along the longitudinal axis La, as seen in FIG. 31, and extends in generally orthogonal relation to the longitudinal axis La, as seen in FIG. 36. The interior chamber 1114 extends vertically into the inner body portion 1102 (i.e., away from the base 1106) along the axis V and is in communication with the channel 1112 such that fastener 1200 extends into the interior chamber 1114 through the channel 1112.

As seen in FIG. 31, the mount 1100 defines a shoulder 1124 at the interface between the channel 1112 and the interior chamber 1114 that is configured for engagement (contact) with the fastener 1200 in order to secure the adapter 1000 in relation to the mount 1100, as described in further detail below.

The fastener 1200 releasably connects the adapter 1000 to the mount 1100 and includes a fastener body 1206 (FIG. 31) and a nut 1208.

The fastener body 1206 includes a head 1210 and a shank 1212.

As seen in FIG. 31, the head 1210 is positioned externally of the adapter 1000 and is configured for insertion into the receptacle 640 (FIG. 13) defined by the mounting platform 626 on the interconnect mechanism 600 of the image capture apparatus 500 upon connection of the image capture apparatus 500 to the mounting system 900. More specifically, the head 1210 defines an outer transverse cross-sectional dimension Dh (e.g., a diameter) (FIG. 31), which is less than an inner transverse cross-sectional dimension Dr (e.g., a diameter) (FIG. 13) defined by the receptacle 640 and generally equivalent to an outer transverse cross-sectional dimension Da (e.g., a diameter) defined by the alignment member 772.

The shank 1212 extends from the head 1210 through the adapter 1000 and into the mount 1100. More specifically, the shank 1212 extends thought the cover plate 704 via the passageway 1002, through the body 702 of the adapter 1000 via the aperture 1008 in the mating surface 1004, through the channel 1112, and into the interior chamber 1114.

The nut 1208 is positioned (located) within the mount 1100 and is configured to receive the fastener body 1206. More specifically, the nut 1208 is positioned (located) within the interior chamber 1114 and includes internal threading 1214 that is configured in correspondence with the external threading 1204 on the shank 1212 such that the fastener body 1206 and the nut 1208 are threadably engageable.

In the illustrated embodiment, whereas the fastener body 1206 is configured for removable insertion into the adapter 1000 and the mount 1100, the nut 1208 is captive to the mount 1100 (i.e., such that the nut 1208 is non-removable therefrom). Embodiments in which the fastener body 1206 may be captive to the adapter 1000 and/or the mount 1100 are also envisioned herein, however, as are embodiments in which the fastener body 1206 may be captive to the nut 1208, and would not be beyond the scope of the present disclosure.

With reference now to FIGS. 29, 33, and 34 in particular, use of the mounting system 900 and methods of connecting the image capture apparatus 500 (FIGS. 5-7) to the attachment surface S via the mounting system 900 will be discussed.

Initially, the mount 1100 is secured to the attachment surface S via the base 1106.

Either prior or subsequent thereto, the adapter 1000 and the mount 1100 (i.e., the respective mating surfaces 1004, 1110) are positioned in adjacent, contacting relation, and the adapter 1000 is connected to the mount 1100 via the fastener 1200. More specifically, the fastener body 1206 is inserted through the adapter 1000, into the mount 1100, and into (threaded) engagement with the nut 1208.

Thereafter, the mounting system 900 is reconfigured via repositioning of the adapter 1000 in relation to the mount 1100, during which, the mating surface 1004 traverses (travels across, moves in relation to) the mating surface 1110 and the shank 1212 and the nut 1208 move through the channel 1112 and the interior chamber 1114, respectively.

Upon reaching a desired orientation, the adapter 1000 is secured in relation to the mount 1100 via adjustment (i.e., tightening) of the fastener 1200. More specifically, as the fastener 1200 is tightened, the nut 1208 is brought into engagement (contact) with and bears against the shoulder 1124 (FIG. 31). Continued tightening of the fastener 1200 applies force to the adapter 1000 and the mount 1100, which compression locks the adapter 1000 and, thus, the image capture apparatus 500, in a desired orientation (position).

Thereafter, the image capture apparatus 500 can be connected to the adapter 1000 in the manner discussed above, during which, the fastener 1200 (i.e., the head 1210) is inserted into the receptacle 640 (FIG. 13) defined by the mounting platform 626 on the interconnect mechanism 600.

In order to vary the orientation of the image capture apparatus 500, the image capture apparatus 500 is disconnected from the adapter 1000 in the manner discussed above, during which, the fastener 1200 (i.e., the head 1210) is removed from the receptacle 640. Thereafter, the fastener 1200 can be adjusted (i.e., loosened), which allows for disengagement (separation) of the nut 1208 from the shoulder 1124 and relative movement between the adapter 1000 and the mount 1100. After reorienting the image capture apparatus 500 (i.e., via repositioning of the adapter 1000 in relation to the mount 1100), the fastener 1200 can again be tightened to lock the angular position of the adapter 1000 and, thus, the image capture apparatus 500.

In certain methods of use, it is envisioned that the orientation of the image capture apparatus 500 may be adjusted via the (manual) application of force sufficient to overcome the compressive force applied to the adapter 1000 and the mount 1100 by the fastener 1200, thereby obviating any need to remove the image capture apparatus 500 from the mounting system 900 in order to vary the orientation thereof.

Following use of the image capture apparatus 500, the image capture apparatus 500 is disconnected from the adapter 1000, and the base 1106 is separated from the attachment surface S (i.e., via the (manual) application of force thereto). If necessary or desired, the fastener 1200 may again be adjusted (i.e., loosened) in order to remove the fastener body 1206 from the nut 1208.

While the present disclosure has been described in connection with certain embodiments, it is to be understood that the present disclosure is not to be limited to the disclosed embodiments, but, on the contrary, is intended to cover various modifications and equivalent arrangements included within the scope of the appended claims, which scope is to be accorded the broadest interpretation to encompass all such modifications and equivalent structures as is permitted under the law.

Persons skilled in the art will understand that the various embodiments of the present disclosure and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the present disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "generally," "approximately," "substantially," and the like should be understood to include the numerical range, concept, or base term with which they are associated as well as variations in the numerical range, concept, or base term on the order of up to 25% (e.g., to allow for manufacturing tolerances and/or deviations in design). For example, the term "generally parallel" should be understood as referring to an arrangement in which the pertinent components (structures, elements) subtend an angle therebetween that is equal to 180° as well as an arrangement in which the pertinent components (structures, elements) subtend an angle therebetween that is greater than or less than 180° (e.g., ±10%, ±15%, ±25%). The term "generally parallel" should thus be understood as encompassing configurations in which the pertinent components are arranged in parallel relation. Similarly, the term "generally identical" should be understood as encompassing configurations in which the pertinent components are identical in configuration as well as configurations in which there may be insubstantial variations between the pertinent components that do not influence the substantive construction or performance thereof.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure, etc.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. An image capture apparatus comprising:
a body; and
an interconnect mechanism connected to the body, wherein the interconnect mechanism includes:
a base plate, wherein the base plate includes:
a receptacle configured to engage an accessory such that the accessory is directly connectable to the image capture apparatus via the interconnect mechanism;
indentations configured to receive alignment members on an adapter to facilitate proper registration of the adapter and the interconnect mechanism; and
latching features configured for engagement with latch members on the adapter to thereby connect the adapter to the interconnect mechanism;
protrusions including apertures extending therethrough and pivotably connected to the base plate such that the interconnect mechanism is reconfigurable between a collapsed configuration, in which the protrusions are nested within the body, and an extended configuration, in which the protrusions extend outwardly from the body, wherein the latching features are positioned laterally outward of the protrusions; and
magnetic members connected to the base plate such that the magnetic members extend into the apertures when the interconnect mechanism is in the collapsed configuration.

2. The image capture apparatus of claim 1, wherein the base plate includes a magnetic material.

3. The image capture apparatus of claim 1, wherein the base plate includes grille portions extending therethrough.

4. The image capture apparatus of claim 3, wherein the grille portions are integrally formed in the base plate.

5. The image capture apparatus of claim 3, wherein the grille portions are concealed by the protrusions when the interconnect mechanism is in the collapsed configuration and exposed from the protrusions when the interconnect mechanism is in the extended configuration.

6. The image capture apparatus of claim 1, wherein the receptacle is configured to threadably engage the accessory.

7. The image capture apparatus of claim 1, wherein the latching features define hook members extending laterally inward.

8. The image capture apparatus of claim 1, wherein the indentations and the receptacle are generally aligned along a transverse axis of the interconnect mechanism.

9. The image capture apparatus of claim 8, wherein the magnetic members are positioned laterally outward of the indentations and the receptacle.

10. The image capture apparatus of claim 9, wherein the latching features are positioned laterally outward of the magnetic members.

11. An image capture apparatus comprising:
a body; and
an interconnect mechanism connected to the body, wherein the interconnect mechanism includes:
a base plate including a first grille portion and a second grille portion extending therethrough;
a first protrusion and a second protrusion pivotably connected to the base plate such that the interconnect mechanism is reconfigurable between a collapsed configuration, in which the first grille portion and the second grille portion are concealed by the first protrusion and second protrusion, respectively, and an extended configuration, in which the first grille portion and the second grille portion are exposed from the first protrusion and the second protrusion, respectively;
a first magnetic member and a second magnetic member connected to the base plate such that the first magnetic member and the second magnetic member extend into the first protrusion and the second protrusion, respectively, when the interconnect mechanism is in the collapsed configuration; and
latching features configured for engagement with an adapter to thereby connect the adapter to the interconnect mechanism, wherein the latching features are positioned laterally outward of the first protrusion and the second protrusion.

12. The image capture apparatus of claim 11, wherein the base plate includes a magnetic material.

13. The image capture apparatus of claim 11, wherein the first grille portion and the second grille portion are integrally formed with the base plate.

14. The image capture apparatus of claim 11, wherein the first grille portion extends laterally outward of the first magnetic member, and the second grille portion extends laterally outward of the second magnetic member.

15. The image capture apparatus of claim 11, wherein the first grille portion overlies a speaker, and the second grille portion overlies an air vent configured to facilitate pressure equalization within the image capture apparatus.

16. An image capture apparatus comprising:

a body; and an interconnect mechanism connected to the body, wherein the interconnect mechanism includes:

a base plate, wherein the base plate includes:

indentations configured to receive alignment members on an adapter to facilitate proper registration of the adapter and the interconnect mechanism; and latching features configured to receive latch members on the adapter to thereby connect the adapter to the interconnect mechanism; and protrusions pivotably connected to the base plate such that the interconnect mechanism is reconfigurable between a collapsed configuration and an extended configuration.

17. The image capture apparatus of claim 16, wherein the indentations are generally aligned along a transverse axis of the interconnect mechanism.

18. The image capture apparatus of claim 16, wherein the latching features define hook members.

19. The image capture apparatus of claim 18, wherein the hook members extend laterally inward.

20. The image capture apparatus of claim 16, wherein the base plate includes strengthening ribs extending outwardly therefrom and laterally inward from the latching features, and the protrusions include reliefs configured to receive the strengthening ribs.

* * * * *